United States Patent
Miyaoku et al.

(10) Patent No.: US 7,761,326 B2
(45) Date of Patent: Jul. 20, 2010

(54) TOKEN TYPE CONTENT PROVIDING SYSTEM AND TOKEN TYPE CONTENT PROVIDING METHOD AND PORTABLE USER TERMINAL

(75) Inventors: Kento Miyaoku, Yokosuka (JP); Akihito Akutsu, Yokosuka (JP); Yoshinobu Tonomura, Yokohama (JP); Hiroki Shigeyoshi, Yokohama (JP); Kiyoshi Tanaka, Yokosuka (JP); Takahisa Taura, Yokohama (JP); Hisako Shiohara, Yokohama (JP); Syunsuke Doi, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1757 days.

(21) Appl. No.: 10/124,871

(22) Filed: Apr. 18, 2002

(65) Prior Publication Data

US 2002/0169892 A1   Nov. 14, 2002

(30) Foreign Application Priority Data

Apr. 20, 2001 (JP) ............................. 2001-122803
Sep. 27, 2001 (JP) ............................. 2001-298438
Nov. 7, 2001 (JP) ............................. 2001-342471

(51) Int. Cl.
*G06Q 30/00* (2006.01)
*G06K 9/72* (2006.01)
*H04W 4/00* (2009.01)
*G06F 15/16* (2006.01)

(52) U.S. Cl. ................... 705/14.39; 382/214; 382/219; 455/414.4; 455/466; 709/203

(58) Field of Classification Search .............. 705/14.39; 415/414.4, 466; 382/214, 229; 709/203

See application file for complete search history.

(56) References Cited

U.S. PATENT DOCUMENTS 6,014,634 A * 1/2000 Scroggie et al. ............... 705/14
6,020,891 A    2/2000 Rekimoto (Continued)

FOREIGN PATENT DOCUMENTS

EP    0 987 868    3/2000

(Continued)

OTHER PUBLICATIONS

Pountain, Dick, "The X Window System", reprint from Byte, Jan. 1989, pp. 353-360.*

(Continued)

*Primary Examiner*—Donald L Champagne
(74) *Attorney, Agent, or Firm*—Kenyon & Kenyon LLP

(57) ABSTRACT

A token type content providing system is provided, in which the system includes a portable user terminal and a linkup server, the portable user terminal includes: a part for obtaining a token from an information notification medium; a part for sending the token to a linkup server; and a part for receiving content information; the linkup server includes: a part for determining one or more content identifier corresponding to the token by using a token table database; a part for obtaining one or more items of content information corresponding to the one or more content identifier; a part for selecting one or more items of content information by referring to the attribute information, and sending a part or the whole of selected content information to the portable user terminal.

16 Claims, 29 Drawing Sheets

U.S. PATENT DOCUMENTS

| | | | |
|---|---|---|---|
| 6,148,331 | A | 11/2000 | Parry |
| 6,198,511 | B1 | 3/2001 | Matz et al. |
| 6,282,713 | B1* | 8/2001 | Kitsukawa et al. ............ 725/36 |
| 2002/0169892 | A1* | 11/2002 | Miyaoku et al. ............ 709/246 |

FOREIGN PATENT DOCUMENTS

| | | |
|---|---|---|
| EP | 1 077 437 | 2/2001 |
| JP | 9-81099 | 3/1997 |
| JP | 10-51711 | 2/1998 |
| JP | 10-105889 | 4/1998 |
| JP | 11-65434 | 3/1999 |
| JP | 2001-76058 | 3/2001 |
| WO | WO 98/08056 | 2/1998 |
| WO | WO 99/66441 | 12/1999 |
| WO | WO 01/24051 | 4/2001 |

OTHER PUBLICATIONS

Rekimoto, Jun., "Augmented Reality Using the 2D Matrix Code", *WISS'96* (1996), 10 pages and English translation.

Miyaoku, Kento., "A Media Linking Method for Personal Content Access Management System Among Difference Media", *Technical Report of IEICE* (2001), 8 pages and English translation.

Miyaoku, Kento., "A Media Linking Method for Personal Content Access Management System", *Proceedings of the 2001 Engineering Sciences Society Conference of IEICE* (2001), 1 page and English translation.

European search report from corresponding European Application No. 02252779.0, dated Dec. 19, 2005.

European Office Action dated Mar. 5, 2010 issued in corresponding European Application No. 02 252 779.0.

Toshifumi Arai, et al., "Paperlink: A technique for hyperlink from real paper to electronic content", In Proceedings of the ACM Conference o Human Factors in Computing Systems (CHI'97), pp. 327-334, Addison-Wesley, 1997.

"The world through computer", Proceedings of the ACN Symposium on User Interface Software and Technology (uist'95), pp. 29-36, ACM Press, Nov. 1995.

* cited by examiner

FIG.2

| CONTENT IDENTIFIER cID9900400363A | | |
|---|---|---|
| CONTENT INFORMATION | | |
| RESOURCE LOCATION (URL) | | http://www.ieice.or.jp/paper/1998-2-3.12.html |
| ATTRIBUTE INFORMATION | OUTLINE | CONTENT ON A SYSTEM AND A METHOD FOR EASILY USING CONTENT RELATED TO INFORMATION IN WHICH THE USER IS INTERESTED VIA THE NETWORK WHEN CONTENT RELATED TO INFORMATION TRANSMITTED TO THE USER BY VARIOUS MEDIUMS IS PROVIDED VIA THE NETWORK |
| | KEYWORD | INVENTION, NETWORK, CONTENT, TEXT |
| | Data Size | 10.5kbyte |
| | Format | pdf |
| | ⋮ | ⋮ |
| ICON INFORMATION | | www.icon.com/0001/0001/0001.png |

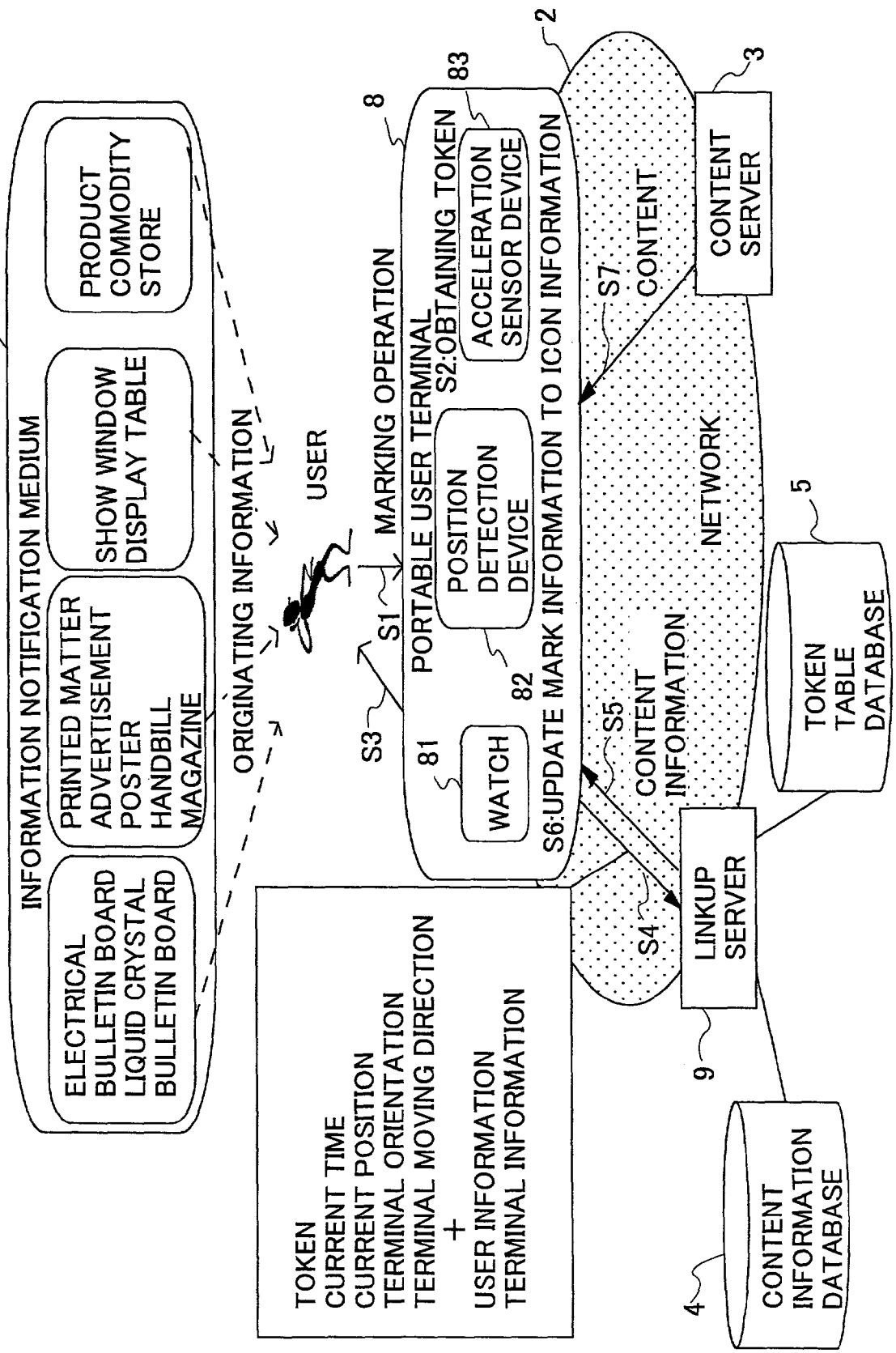

FIG.4

| INFORMATION FOR IDENTIFYING CONTENT FROM TOKEN ||||| CONTENT IDENTIFIER |
| POSITION INFORMATION || ORIENTATION | TIME INFORMATION ||
| LATITUDE (°) | LONGITUDE (°) | HEIGHT (m) | N (°) | yy/mm/dd hh:mm:ss ||
| 45.34 | 135.34 | 10.03 | 15.99 | 01/03/23 \*\*:\*\*:\*\* | cID99004003363A |
| 45.33 | 135.37 | 9.98 | 12.45 | \*\*/\*\*/\*\* \*\*:\*\*:\*\* | cID99019990163B |
| 45.32 | 135.38 | 9.87 | 50.45 | \*\*/\*\*/\*\* \*\*:\*\*:\*\* | cID99003390563P |
| 45.32 | 135.40 | 9.99 | 36.45 | \*\*/\*\*/\*\* \*\*:\*\*:\*\* | cID99004000777A |
| . . . | . . . | . . . | . . . | . . . | . . . |

FIG.7

| INFORMATION FOR IDENTIFYING CONTENT FROM TOKEN (OR TOKEN) NUMERIC INFORMATION DESCRIBED AS BARCODE INFORMATION | CONTENT IDENTIFIER |
|---|---|
| 19230355031074 | cID99004400363A |
| 29230355031074 | cID99019990163B |
| 39230355031074 | cID99003390563P |
| 49230355031074 | cID99004400777A |
| ... | ... |

FIG.9

| INFORMATION FOR IDENTIFYING CONTENT FROM TOKEN (OR TOKEN) | CONTENT IDENTIFIER |
|---|---|
| RADIO WAVE SIGNAL INFORMATION | |
| 0110001011110011010100110111011100010001011101111110 | cID99004400363A |
| 0110001011110011010100110111011100010001011101111111 | cID990199901163B |
| 0110001011110011010100110111011100010001011101111100 | cID99003905563P |
| 0110001011110011010100110111011100010001011101111101 | cID99004400777A |
| ... | ... |

FIG.10

| INFORMATION FOR IDENTIFYING CONTENT FROM TOKEN (OR TOKEN) | CONTENT IDENTIFIER |
|---|---|
| TELEPHONE NUMBER | |
| 0774-93-2100 | cID99004000363A |
| 0468-59-1111 | cID99019990163B |
| 0422-59-7777 | cID99003905563P |
| 03-1111-2222 | cID99004000777A |
| ... | ... |

FIG.19

| CONTENT IDENTIFIER cID9900400363A |||
|---|---|---|
| CONTENT INFORMATION |||
| RESOURCE LOCATION (URL) || http://www.ieice.or.jp/paper/1998-2-3.12.html |
| ATTRIBUTE INFORMATION | OUTLINE | CONTENT ON A SYSTEM AND A METHOD FOR EASILY USING CONTENT RELATED TO INFORMATION IN WHICH THE USER IS INTERESTED VIA THE NETWORK WHEN CONTENT RELATED TO INFORMATION TRANSMITTED TO THE USER BY VARIOUS MEDIUMS IS PROVIDED VIA THE NETWORK |
| | KEYWORD | INVENTION, NETWORK, CONTENT, TEXT |
| | Data Size | 10.5kbyte |
| | Format | pdf |
| | ⋮ | ⋮ |
| ICON INFORMATION ||  www.icon.com/0001/0001/0001.png |
| COUPON INFORMATION ||  |

TOKEN TYPE CONTENT PROVIDING SYSTEM AND TOKEN TYPE CONTENT PROVIDING METHOD AND PORTABLE USER TERMINAL

BACKGROUND OF THE INVENTION

1. Field of the Invention

The present invention relates to a token type content providing system, a token type content providing system and a potable user terminal for easily using content related to information which a user is interested in via a network when content related to information transferred to the user by various mediums is provided via the network 2. Description of the Related Art Regardless of indoor or outdoor, various information is originated from various information notification mediums such as television/radio broadcast, bulletin boards, advertisement, magazine, show window and the like. Thus, the user has various opportunities for viewing various information from the various information notification mediums in various circumstances in daily life. In addition, the Internet has been remarkably developed recently and the WWW system which provides various digital content has been widespread. Thus, an enormous amount of contents can be used via the WWW. In addition, when the WWW provides digital content including detailed information which relates to information which the user directly views or hears from the various information notification medium such as television/radio broadcast, bulletin boards, advertisement, magazine, show window and the like, the user can refer to and use the content via the network.

When the WWW provides digital content related to information conveyed by the various information notification mediums such as broadcast, bulletin boards, advertisement, magazine, show window and the like, and when the user becomes interested in the content and wants to use it, the user thinks of a keyword and the like for specifying desired content among information appeared in the advertisement and magazine and the like and the user can searches for the content by using the keyword by using a server service for searching content on the WWW such as www.goo.ne.jp and the like. As a result, the user can access the content.

In addition, by including a resource location "URL" of WWW content related to information notified by the various information notification mediums, the user can refer to and use the content directly by using the URL.

However, operation load for the user is large and convenience is bad when the user predicts a keyword from the information conveyed by the various information notification mediums such as broadcast, bulletin boards, advertisement, magazine, show window and the like and searches for the content by using the keyword. Thus, a method for accessing related content on the WWW more efficiently is required.

As for a method in which the information notification medium transmits the URL itself, the user needs to memorize the viewed URL. However, in a circumstance where an enormous amount of advertising information is viewed or heard in the outside, it is very difficult that the user memorizes every URL since the amount of information which the user is interested in is very large. Thus, it is necessary to record the URLs by using some means. In addition, the user needs to input the recorded URLs by using a WWW browser.

In the case where only the URLs are recorded by using some means, when the user uses the content by using the URLs, it is difficult for the user to determine content which a URL provides. To determine content corresponding to a URL, the user needs to record information describing the URL in addition to the URL. As mentioned above, when a method is adopted in which the URL and the accompanied information are conveyed, load for the user is large when the user accesses the related content on the WWW.

Further, as for the URL, since the corresponding content is decided uniquely, there is a problem in that the URL only provides the same information to users even when the user have different points on which the users are interested in the information conveyed by the information notification medium.

In addition, it is desirable for the user to provide means for automatically marking information in which the user is interested according to a predetermined condition.

Printed matter such as a paper, a magazine and a street advertisement is included in the various information notification mediums which transmit information. However, since the space of the printed matter is limited and the amount of information which can be printed is limited, there is a case in which only main information can be described. The document of the WWW which has been widespread recently solves the above-mentioned problem of the printed document by introducing hyper text/hyper media in which a text or an image in the document is associated with other documents. In the hyper text, as for information which can not be described in the document for reasons of document layout, a hyper link corresponding to the information is provided in the document, so that the user can access, as necessary, the information which is not described in the document via the hyperlink.

In order to apply the merit of the hypertext not only to the document on the WWW but also to the conventional printed document, an technology is developed for embedding the hyperlink in the printed document. In T. Wakita et al., "attempt to merging WWW and paper media by using two dimensional code", IPSJ Human Interface 98-HI-76,Vol.98, pp.1-6, Jan., 1988, a method is disclosed to handle the printed document like the Web page by configuring the printed document by embedding QR (Quick Response) code which is a Kind of two dimensional barcode in the position of the link.

In Toshifumi Arai, at.el., "Paperlink: A technique for hyperlink from real paper to electronic content", In Proceedings of the ACM Conference o Human Factors in Computing Systems (CHI'97), pp. 327-334, Addison-Wesley, 1997, a method is disclosed for handling the printed document as a hypertext by defining action in the paper document by using VideoPen which is formed by combining a pen type small camera and a highlighter.

These technologies have been incorporated as an actual service. For example, in Internet barcode of Digit Inc. and Cue of Digital:Convergence Co. Inc., one can access a Web page by reading a barcode on the paper by using a special-purpose barcode reader and connecting to the Internet.

According to these services, labor for inputting a URL in the WWW browser on the PC can be saved when referring to information related to the printed information on the paper. However, since the medium is changed to the printed paper to the PC, it is difficult to use this system when the two mediums can be used. Especially, when trying to access information related to an advertisement in a train or a poster in the outside in which it is difficult to use the PC, the related information can not be referred to speedily. In recent years, the computer has been downsized and development of Wearable Computer is going on.

In addition, mobile communication infrastructure has become widespread, so that the environment is ripe for connecting the Internet irrespective of whether one is in the inside or in the outside. Against this backdrop, an information using system has been developed in which information on the network is allocated to a body of the real world such as a printed matter and the information is presented. In Jun Rekimoto and Katashi Nagao, "The world through computer", Proceedings of the ACN Symposium on User Interface Software and Technology(uist '95), pp. 29-36, ACM Press, November 1995, a system is disclosed in which two dimensional barcode is attached to a body of the real world, and related information is provided in real-time by using the barcode.

By using the technology for configuring the small computer terminal, it is considered that a system for providing information of hypertext or hypermedia related to information printed, described or presented on a paper or other mediums which is transferred to the user can be realized as a service system which is more practical and usable.

However, there are some problems in the conventional system in the aspect of practicality. For example, various headlines of articles are arranged in a strap advertisement of a weekly magazine. If the approach using the barcode is adopted for realizing a system in which a user accesses information related to an article selected from among the articles, it is necessary to embed barcode for each headline, so that there is a problem that appearance quality of the advertisement is lost. Instead, when an approach of providing one barcode in the corner of the advertisement is adopted, the barcode should identify a plurality of items of information, so that it is necessary to decide an order by which a plurality of items of information are presented to the user. However, there is no conventional system which can perform this process.

In addition, there is a problem in that information unnecessary for the user is provided, and it is necessary to improve this problem.

By using the information providing system, a business attaching an advertisement to related information which is provided can be considered. For example, assuming that a picture of a fine play in a yesterday's baseball game is appeared in a sports section in a newspaper, and that a link is established for the picture and one can access images of scenes of the fine play by following the link, a business can be considered in which the image is provided to a user at no charge by inserting a CM in the last image of the scene and advertisement rates are obtained from the sponsor of the inserted CM. However, there is no conventional system for inserting attached advertisement content.

In addition, there is no means for providing image and sound, especially image and sound in a live, and other information in association with the printed matter. Therefore, for example, it is impossible to obtain image and sound indicating current state of a point and weather information at the point by selecting the point on a road map printed on a paper.

In addition, there is no mechanism for playing back the obtained image and sound from a desired position. Generally, a video image of a baseball game is stored as a video image from the start of the game to the end of the game. Thus, it is necessary to specify an address of the video content and a playback start position to view a scene of a fine play.

In addition, according to the conventional systems, it is impossible that printed matter is provided after translation, content is played back after converted to voice, and when an article is a quiz, the user answers it, obtains the answer and a program relating to the article is provided, or, by selecting an article, a server in the network performs a necessary setting.

In addition, a mechanism is not provided in which a predetermined setting is performed in the network side by selecting the printed article. The mechanism is, for example, for setting for recording reservation in the network side by selecting TV information in the outside.

In addition, there is more important problem in connections between the printed matter and the medium used for accessing the related information such as PC and the like according to the conventional system. It is necessary to improve this problem and realize a method for presenting information closely related to information on the printed matter. In addition, the user terminal should be compact and lightweight, and portable.

SUMMARY OF THE INVENTION

A first object of the present invention is to provide a system and a portable user terminal which allows to seamlessly provide content related to information on mediums by introducing a concept of a token which indicates connection between information transmitted by the various information notification mediums and content provided on the network such as WWW and the like in a user environment system of the user, in which the token can be also defined as a symbol of connection relationship in which each can refer to each.

A second object of the present invention is to provide a system to which the configuration of the above system is applied, more specifically, to provide a system and a portable user terminal for providing a coupon service. More concretely, the object is to provide a mechanism for correctly applying a coupon provided as a token to a corresponding coupon service, and a mechanism for grasping whether the coupon is applied to the corresponding coupon service. In addition, a mechanism for exchanging coupon information provided as a token among users in the same way as a normal paper coupon is provided.

A third object of the present invention is to provide a system and a portable user terminal for providing expandability of information like hypertext and ability of bidirectional communication for a static information notification medium represented by the printed matter.

The first object can be achieved by a token type content providing system comprising a portable user terminal and a linkup server, the portable user terminal comprising:
a part for connecting to a network by radio;
a part for obtaining a token, from an information notification medium, which is information which may be used for specifying content;
a part for sending the token to a linkup server via a network; and
a part for receiving content information which is obtained by the linkup server by using the token via a network;
the linkup server comprising:
a part for receiving the token via a network;
a part for determining one or more content identifier corresponding to the token by using a token table database which manages a token table which has information on correspondence relationship between the token and the content identifier;
a part for obtaining one or more items of content information corresponding to the one or more content identifier by using a content information database which manages content information including attribute information of content for each content identifier;
a part for selecting one or more items of content information by referring to the attribute information, and sending a part or the whole of selected content information to the portable user terminal.

According to this invention, the user can easily use content on the network related to the information obtained from the information notification medium.

The first object is also achieved by a token type content providing system comprising a portable user terminal and a linkup server, the portable user terminal comprising:

a part for connecting to a network by radio;

a user information management part for managing user information on users;

a terminal information management part for managing terminal information on portable user terminals;

a part for obtaining a token, from an information notification medium, which is information which may be used for specifying content;

a part for sending the token, the user information and the terminal information to a linkup server via a network; and a part for receiving content information which is obtained by the linkup server by using the token, the user information and the terminal information via a network;

the linkup server comprising:

a part for receiving the token, the user information and the terminal information via a network;

a part for determining one or more content identifier corresponding to the token by using a token table database which manages a token table which has information on correspondence relationship between the token and the content identifier;

a part for obtaining one or more items of content information corresponding to the one or more content identifier by using a content information database which manages content information including attribute information of content for each content identifier; and a part for selecting one or more items of content information by referring to the user information, the terminal information and the attribute information included in the content information, and sending a part or the whole of selected content information to the portable user terminal.

According to this invention, since the user information and terminal information in addition to the token are used, content information suitable for the user information and terminal information can be provided.

In the token type content providing system, the content information may include a resource location, and the portable user terminal may further include a content obtaining part for obtaining content from a content server by using the resource location.

In addition, the content information may include a resource location, and the linkup server further includes:

a content obtaining part for obtaining content from a content server by using the resource location; and a sending part for sending the content to the portable user terminal.

According to the token type content providing system, an environment can be realized in which the user can easily access contents on WWW related to information transmitted by various information notification mediums.

In addition, a system can be realized in which content information interested by the user or suitable for the user attributes can be provided in consideration of difference of points of interest for each user when obtaining WWW contents by using the token. In addition, a system can be realized for providing contents applicable for use by a portable user terminal in consideration of terminal information such as display ability, processing ability and the like of the portable user terminal.

In order to achieve the second object, in the token type content providing system, the content information includes coupon information.

In addition, the token type content providing system may further include a service terminal and a coupon authentication server, the portable user terminal may further include a part for sending the coupon information to the service terminal;

the service terminal may include:

a part for receiving the coupon information from the portable user terminal;

a part for sending the coupon information to a coupon authentication server, and receiving result of authentication of the coupon information from the coupon authentication server; and a part for determining whether a coupon service can be provided;

the coupon authentication server comprising:

a part for authenticating the coupon information; and a part for sending result of authentication to the service terminal.

In addition, the portable user terminal may further include an automatic marking part for obtaining the token automatically at a timing based on a condition set beforehand.

According to this invention, the problem that the user need to mark interested information in daily life can be solved.

In addition, the content information may include graphics information indicating content corresponding the content information and icon information on pictures;

the portable user terminal may further include:

a memory part for storing the content information; and a user interface part for displaying icon information included in the content information;

wherein the portable user terminal displays the icon information for notifying the user of existence of the content information in the memory part when the content information is stored in the memory part.

In addition, in the token type content providing system, the portable user terminal may further include a part for allowing the user to select the icon information;

wherein the portable user terminal accesses a network address indicated by a resource location included in the content information, obtains content of the network address and displays the content when the user selects the icon information.

According to above invention, the user can manage content information of content provided on the network by using an intuitive user interface.

In the token type content providing system, the portable user terminal may further include:

a part for sending content information stored in a memory part to another portable user terminal connected to the token type content providing system; and a part for receiving content information sent from another portable user terminal connected to the token type content providing system.

According to this invention, a user who obtained information of network content can send the information of network content to another user in the same way in which information on a paper is sent to another user as a mail.

In the token type content providing system, the portable user terminal may include:

a part for obtaining a user identifier on starting;

a part for sending the user identifier to a user management server which manages users;

a part for obtaining user content information and user information corresponding to the user identifier from the user management server, and storing the user content information and the user information in a memory part;

a part for displaying icon information included in content information in the user content information for notifying the user of existence of content information in the memory part.

According to this invention, by managing the user content information by a server, the same user always holds and manages the same user content information even when the terminal used by the user changes.

In the token type content providing system, the token may include one or more items of time information, position information of the portable user terminal, orientation information of the portable user terminal, and moving direction information of the portable user terminal at the time when the portable user terminal obtains the token;

the portable user terminal may include a part for obtaining one or more items of time information, position information of the portable user terminal, orientation information of the portable user terminal, and moving direction information of the portable user terminal;

the token table database may include a part for managing correspondence relationship between the token and the content identifier.

According to this invention, a token type content providing system in which the content provider does not necessarily transmit the token by using the information notification medium can be provided.

In the token type content providing system, the token is barcode information or character string information;

the information notification medium presents barcode information or character string information;

the portable user terminal may include a laser scanner part for reading the barcode information or the character string information;

the token table database manages information indicating correspondence relationship between the barcode information or the character string information and the content identifier.

According to this invention, in the token type content providing system, as for various mediums or various product packages such as a book on which barcode is printed, content related to the medium and the product can be provided by using the barcode.

In the token type content providing system, the token is radio wave signal information transmitted by radio;

the information notification medium transmits the radio wave signal information;

the portable user terminal may include a radio wave signal receiving part for obtaining radio wave signal information;

the token table database manages information indicating correspondence relationship between the radio wave signal information and the content identifier.

According to this invention, a token type content providing system can be realized in which it is not necessary to modify visible part of already existing various information notification mediums since a token which is invisible to the user can be used.

In the token type content providing system, the token is a telephone number;

the information notification medium presents the telephone number;

the portable user terminal may include a part for inputting the telephone number or a camera device, and a character recognition part for recognizing and reading a telephone number character string from an input image;

the token table database manages information indicating correspondence relationship between the telephone number and the content identifier.

According to this invention, in the token type content providing system, as for various mediums or various product packages such as a book on which telephone number is printed, content related to the medium and the product can be provided by using the telephone number.

The token type content providing system for achieving the second object, the service terminal may include a part for sending a coupon information use notification to the coupon authentication server when the service terminal provides the coupon service.

In addition, the portable user terminal may further include:

a part for sending received coupon information to another portable user terminal connected to the token type content providing system; and a part for receiving coupon information sent from another portable user terminal connected to the token type content providing system.

According to the present invention, since the linkup server is provided on the network, the basic function of the system which can use the token as the coupon can be realized.

In addition, the coupon providing service and the content providing service provided by the token type content providing system can be provided simultaneously. That is, the coupon information and information of content explaining details of the coupon service can be provided simultaneously.

In addition, in the token type coupon providing system, the portable user terminal sends coupon information to the service terminal. The service terminal sends the coupon information to the coupon authentication server, and the coupon authentication server authenticates the coupon information and sends the result of authentication to the service terminal. The service terminal 700 judges whether the coupon service can be provided based on the result of authentication. Accordingly, it is ensured that the provided coupon information corresponding the token is applied to a target coupon service.

In addition, in the token type coupon providing system, since the service terminal may include a part which sends a coupon information use notification to the coupon authentication server when it provides the coupon service, the system can grasp that the coupon was used.

In addition, it becomes possible to exchange the coupon information provided as the token between users like a coupon of a paper.

The third object can be achieved by the token type content providing system, wherein the content information may include presentation control information;

the portable user terminal may include a content presentation part for presenting the content by using a method specified by the presentation control information.

In the token type content providing system, the presentation control information may include information on order of presenting content;

the content presentation part in the portable user terminal presents one or more contents in order determined by using information on presentation order included in the presentation control information.

In addition, the presentation control information may include a keyword or a genre identifier indicating corresponding content;

the portable user terminal may include a part for determining presentation order of contents and whether the content should be presented by using the keyword or the genre identifier indicating corresponding content.

In the token type content providing system, the token obtaining part in the portable user terminal may include a part for obtaining terminal environment information in addition to the token;

the linkup server may include a conversion part for converting the content on the basis of the presentation control information and the terminal environment information.

The terminal environment information may include relationship between position of information related to content which is printed, described or displayed on the information notification medium and position of a display part of the portable user terminal.

The conversion part may include a geometrical conversion part for adjusting position relationship between the image of information related to content printed, described or displayed on the information notification medium and the image of content displayed on the display part of the portable user terminal used by being overlaid on the information of the image.

The token obtaining part in the portable user terminal may include:

a part for obtaining terminal environment information in addition to the token; and a conversion part for converting the content by using the terminal environment information.

In the token type content providing system, the terminal environment information may include relationship between position of information related to content which is printed, described or displayed on the information notification medium and position of a display part of the portable user terminal.

The conversion part may include a geometrical conversion part for adjusting position relationship between the image of information related to content printed, described or displayed on the information notification medium and the image of content displayed on the display part of the portable user terminal used by being overlaid on the information of the image.

According to the token type content providing system for achieving the third object, it becomes possible to present obtained content by using a method specified by the presentation control information included in the content information. In addition, in a case where a plurality of items of information are identified by a token, by including presentation order of contents, keywords indicating contents in the presentation control information, how the plurality of items of information are presented to the user can be determined. In addition, contents to be presented can be selected on the basis of desired genre setting by the user in the portable user terminal.

In addition, by providing an attached advertisement content server, the attached advertisement content can be obtained from the attached advertisement content server by using the attached advertisement information included in the content information, and the content and the attached advertisement content can be presented by a method specified by the presentation control information. As a result, it becomes possible to insert the attached advertisement content into the content, and present the content.

In addition, in order to determine whether the content and the attached advertisement content should be presented, the presentation control information including the keywords or genre identifiers indicating content is utilized. Thus, in a case where a plurality of contents and attached advertisement contents are obtained by the user, it becomes possible to determine how the plurality of items of information are presented to the user. In addition, content and attached advertisement content to be presented can be selected according to genre set by the user.

In addition, a printed article can be translated and presented, the user can answer for a quiz in an article and obtain the result, necessary settings can be established in the server in the network by providing a program related to an article or by selecting an article.

In addition, the portable user terminal is configured such that a display function part including the token obtaining part, the display part and the voice origination part, and a network gateway part including a network communication part are separated, in which the display function part and the network gateway part communicate with each other by using wireless communication parts. As a result, weight reduction of the information display part can be achieved.

In addition, in order to realize a presentation method of information closely related to information on a printed matter, a permeable display is used as the display part of the portable user terminal, the content presented on the display part can be used by being overlaid on the originating information printed, described or displayed on the information notification medium. In addition, conversion process is performed on the content for adjusting position as necessary. Accordingly, information liaison of media extension type which is different from both of hyperlink and hypermedia in WWW can be realized, and totally new information providing environment and information operation feeling can be provided to the user.

In addition, it becomes possible that barcode information, character numeral string information, watermark information embedded in an image on the information notification medium, or signal stored in the electromagnetic storing medium or IC chip can be used as the token, and the token can be sent to the linkup server.

In addition, according to the present invention, information closely related to information on printed matter can be presented.

The portable user terminal may include:

a display part including a display of a thin card shape for displaying the content;

a voice originating part for outputting voice; and a network communication part for performing communication over a network;

wherein the portable user terminal is formed as a thin shape.

In addition, the portable user terminal may include:

a display function part including the token obtaining part, the display part displaying content, the voice originating part for outputting voice and a first wireless communication part for performing wireless s communication; and a network gateway part including the network communication part and a second wireless communication part for performing wireless communication;

wherein communication is performed between the first wireless communication part and the second wireless communication part.

The display part may include a permeable display and a part for overlaying the content on originating information printed, described or displayed on the information notification medium.

In addition, the present invention can be configured as a program and a recording medium storing the program which causes the portable user terminal to obtain content information.

BRIEF DESCRIPTION OF THE DRAWINGS

Other objects, features and advantages of the present invention will become more apparent from the following detailed description when read in conjunction with the accompanying drawings, in which:

FIG. 2 shows an example of the content identifier and the content information associated with the content identifier;

FIG. 3 is a figure for explaining an example 1-1;

FIG. 4 shows an example of the token table of the example 1-1;

FIG. 7 shows an example of the token table of the example 1-2;

FIG. 9 shows an example of the token table of the example 1-3;

FIG. 10 shows an example of the token table of the example 1-4;

FIG. 19 shows an example of the content identifier and the content information associated with the content identifier of the second example of the present invention;

DETAILED DESCRIPTION OF THE PREFERRED EMBODIMENTS

In the following, first to third embodiments of the present invention will be described. The first embodiment is a basic embodiment of the present invention, and for achieving the first object. The second embodiment is an example to which the first embodiment is applied to a coupon service, and for achieving the second object. The third embodiment allows the portable user terminal to present content in various ways in the first embodiment, and is for achieving the third object.

(First Embodiment)

[Basic Configuration Example of the First Embodiment]

Figure 1:
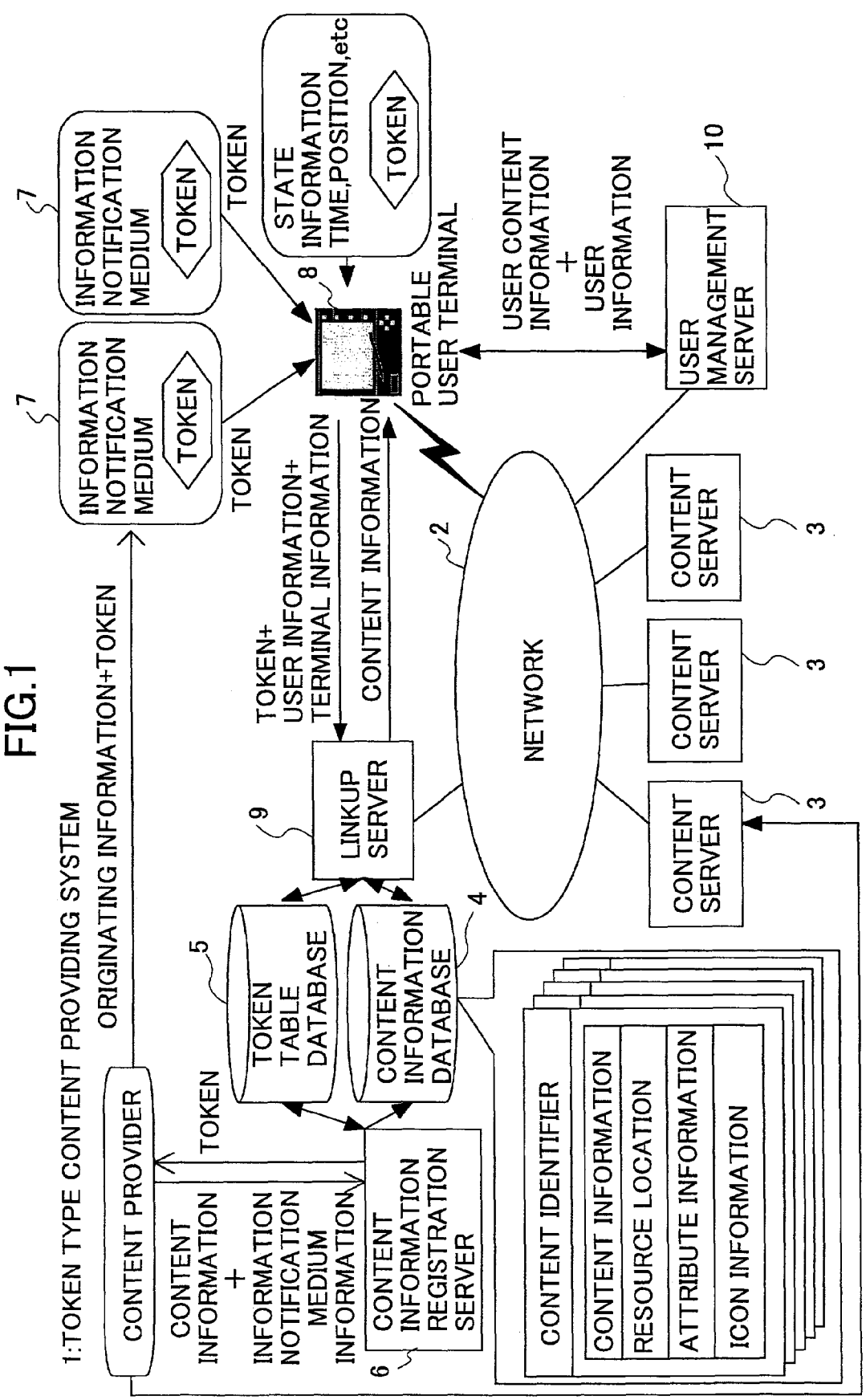
FIG. 1 is a system block diagram of a first embodiment of the present invention.

A basic configuration example of a system of the first embodiment of the present invention will be described with reference to FIG. 1.

The token type content providing system 1 of the present invention is a system for providing content to a user via a network. As shown in FIG. 1, the token type content providing system 1 includes a content serve 3, an information database 4, a token table database 5, a content information registration server 6, an information notification medium 7, a portable user terminal 8, a linkup server 9 and a user management server 10.

The content server 3 provides various contents such as data, text information, images, video, voice, multimedia data and application software via a network 2. The content information database 4 manages content information including information (which will be called resource location hereinafter) necessary for obtaining content. The token table database 5 manages information (which will be called token table hereinafter) related to correspondence between information (which will be called token hereinafter) which may become a factor for specifying content server and a content identifier. The content information registration server 6 provides a token associated with a content identifier of content information to a content provider which registers the content information of content provided by the content server 3. The information notification medium 7 transmits originating information related to content. The portable user terminal 8 obtains and sends the token, obtains, stores and manages content information, obtains and uses content. The linkup server 9 sends content information on the basis of the token received from the portable user terminal 8 to the portable user terminal 8. The user management server 10 collects and manages user content information managed by each user in the portable user terminal 8.

Next, each apparatus which constitutes the above system will be described.

The content server 3 is configured by one or more computer. When the network 2 is the Internet, the content server 3 can be implemented as a WWW server.

The content information registration server 6 also includes one or more computers. When the network 2 is the Internet, the content information registration server 6 can be implemented as a server for providing a service on the Internet.

Each of the token table database 5 and the content information database also includes one or more computers. Each of the token table database 5 and the content information database 4 is a server implementing a database application such as Oracle for example, and provides an interface for using database by using SQL and the like.

The content identifier is a number or a numeric character string assigned to the content uniquely. As for the internet content, since the resource location of the content, that is, URL can be regarded as the character string assigned to the content uniquely, there is a case where the URL is used for the content identifier.

The content information includes a resource location, attribute information and icon information of the content corresponding to the content information. The attribute information may be a set of keywords indicating description of the content or a text describing the content. The icon information is pictorial or graphics information indicating the content. When the network is the Internet, generally, the resource location of the content is the URL.

FIG. 2 shows an example of the content identifier and the content information associated with the content identifier. This corresponds to one record of the content information database 4.

The information notification medium 7 is broadcast, street advertisement, strap advertisement, a signboard, an electric signboard, a liquid crystal signboard, an outdoor display for advertisement, a show window, a display table or the like, and transmits information via various mediums such as a paper, a signboard, an electronic wave and the like. Or, the information notification medium 7 is an apparatus which transmits information by displaying an object such as a commodity product.

Information related to the content is, for example, advertising information for the commodity when the content is product detail information.

The portable user terminal 8 is a computer apparatus which has a function of connecting to the network for performing communication all the time or at the appropriate times, and a display function. The portable user terminal 8 can be an apparatus having a function of a PC, a portable PC, a wearable PC, a PDA, an Internet Appliance, a high-performance telephone, a high-performance mobile phone, an STB for receiving television broadcast and the like, and an audiovisual apparatus to which the STB is integrated, a high-performance radio receiver, a digital still camera, or a digital Cam. The portable user terminal 8 has a function for connecting to and communicating with the network all the time or at appropriate times. In addition, the portable user terminal 8 can obtain a current time, current position information, terminal posture information, and terminal information such as information obtained by devices such as a microphone and a camera equipped in the portable user terminal. In addition, the portable user terminal 8 may have a function for executing various application software.

The token can be obtained by the before-mentioned various sensing devices included in the portable user terminal, and the token is one of items of information or a combination of some of the items of information. The items of information include a current time, a current position, direction of the terminal, moving direction of the terminal, barcode information, character string information, image information, sound information, radio wave origination signals, which are state of the portable user terminal and surrounding state.

The linkup sever 9 includes one or more computers. When the network 2 is the Internet, the linkup server 9 can be implemented as a server system for providing a data service on the Internet.

In the same way, the user management server 10 includes one or more computers. When the network 2 is the Internet, the user management server 10 can be implemented as a server system for providing a data service on the Internet. Like the token table database 5 and the content information database 4, the user management server 10 is also a server implementing a database application such as Oracle for example, and provides an interface for using database by using SQL and the like.

[Basic Operation Example in the First Embodiment]

Next, basic operation example of the token type content providing system 1 having the above configuration will be described. In the following, it will be described with reference to FIG. 1.

In the following description of the basic operation example, the network 2 is the Internet and the content server 3 is a WWW server.

First, a content provider providing content by the content server 3 via WWW sends content information corresponding to the content and information of the information notification medium 7 which transmits information related to the content to the content information registration server 6, registers the content information in the content information database 4 and obtains a token corresponding to the content.

When the token is information on surrounding state of the portable user terminal such as time information, position information of the portable user terminal, orientation information of the terminal, moving direction information of the terminal and the like, the content provider is not necessarily obtains the token at the time of registering the content information. In this case, the content provider receives, instead of the token, information indicating that registration of the content information is completed.

When the content information registration server 6 receives the content information and information of the information notification medium which transmits information related to the content from the content provider, the content information registration server 6 assigns a content identifier to the content information, and registers them in the content information database, and associates the content identifier with a token, and adds the content identifier to the token table.

After that, when the content provider obtains information related to the content and corresponding token from the information notification medium 7, the content provider originates the token.

The portable user terminal 8 sends user content information which is a plurality of items of content information and user information which are stored in a storing means to the user management server 10 one after another at the time when the portable user terminal 8 is used or after the portable user terminal 8 is used. The user management server 10 manages user content information and user information for each user identifier.

In addition, the portable user terminal 8 obtains a user identifier from the user when starting. This function can be realized, for example, by a method in which login screen is displayed on starting so that the user logs in. After obtaining the user identifier, the portable user terminal 8 sends the user identifier to the user management server 10, obtains user content information and user information corresponding to the user identification, stores these information in a storing means, displays icon information included in each content information in the user content information, and presents existence of each content information in the storing means to the user.

In addition, the portable user terminal 8 obtains a token at a timing when an instruction is generated by the user who views or hears originating information of the various information notification medium such as television/radio broadcast, advertising, magazine, show window and the like, that is, at the timing when the marking operation occurs. Then, the portable user terminal 8 sends the token to the linkup server 9 via the network. The linkup server 9 determines one or more content identifier by referring to the token table database 5, obtains content information corresponding to one or more content identifiers, and sends the content information to the portable user terminal 8.

The portable user terminal 8 has a storing means for storing received content information. The content information includes pictorial information indicating content description and icon information on a picture. The portable user terminal 8 includes a user interface function displaying the icon information included in the content information stored in the storing means. The portable user terminal 8 displays the icon information included in the content information so that it presents existence of each content information in the storing means when the content information is received from the linkup server 9 according to the above-mentioned processes.

In addition, the portable user terminal 8 includes a user interface function used for the user to select icon information which is displayed. When the icon information is selected by the user, the portable user terminal 8 displays content obtained by using the resource location included in the received contests information including the icon information received.

In addition, the portable user terminal 8 includes a user interface function used by the user for deleting the displayed icon information. When the icon information is deleted by the user, the received content information including the icon information is deleted from the storing meas.

[An Example for Providing Content Information Applicable to the Portable User Terminal]

In the above-mentioned example, an embodiment has been described in which content information or content information group is provided irrespective of user attribute or terminal attribute. In the following, an embodiment in which content information applicable to each user or each terminal is provided. In the following, this embodiment will be described with reference to FIG. 1.

In this case, the portable user terminal 8 includes a storing means for managing user information on the user and terminal information on the portable user terminal, and the content information includes attribute information on the content. When sending an obtained token to the linkup server 9, the portable user terminal 8 sends the token, user terminal and the terminal information to the linkup server 9 via the network 2.

The linkup server 9 determines one or more content identifier corresponding to the received token by referring to the token table database 5, obtains content information corresponding to the one or more content identifier from the content information database 4, and selects one or more items of content information by referring to the user information, terminal information and the attribute information of the content information, and sends the selected content information to the portable user terminal 8.

The portable user terminal 8 obtains content from the content server 3 by using the resource location included in the received content information.

A concrete example in the above configuration will be described in the following.

The user information is information on the user including one or more of items of information which are name, sex, age, occupation, address, ZIP code, family structure, information on residence (condominium, stand-alone house and the like), hobby, information genre which the user interested in (politics, economy, news, computer, book, sports, travel and the like), annual income, information whether the user is a member of each service and membership number or credit card ID, existence of various qualification (drivers license and the like), information on body form (weight, height, size of clothes and the like), information on ability (eyesight, hearing and the like) and the like.

The terminal information is information including resolution of the display device of the portable user terminal 8, the number of colors which can be displayed, performance of WWW information browsing means (availability of Java function, existence of video and voice content play back function, coding format information which can be played back as the video sound content) and the like.

The portable user terminal 8 includes a memory part for storing the user information and the terminal information, and an input part for providing a function for inputting user information to the user. The user inputs various user information via the input part, and the input user information is held in the memory part. In addition, the terminal information is held in the memory part when the terminal is manufactured, or, the terminal information is sent to the memory part from the display playback part and held when the display part is connected.

In addition, as described before, the content information held in the content information database 4 includes URL which is the resource location and the attribute information. The attribute information in this example is characteristics of a user to which the content information can be provided, that is, sex, age, body shape characteristic, ability characteristic, occupation, district, Zip code group, family structure characteristic, residence characteristic, annual income, information genre to which the content information belongs, service use right necessary for using the content information, terminal characteristics of the terminal to which the service is provided, that is, resolution characteristics of display apparatus, the number of colors which can be displayed, and performance of WWW information browsing part.

Examples of the content information including the resource location (URL) and the attribute information are as follows. The content information may include icon information in addition to the above-mentioned information, however, it is not included in the following example.

Content information example 1: "URL1 (for woman), (target age is equal to or more than 20 (equal to or more than 1024×800), (equal to or more than 256 colors)"

Content information example 2: "URL2 (clothing size M), (Java function is necessary)" Content information example 3: "URL3, (occupation: housewife), (Tokyo)"

Content information example 4: "URL4, (for woman), (eyesight equal to of below 0.8)"

Content information example 5: "URL5, (genre sports).

For example, the content for the content information example 1 are advertising information of tobacco for woman, and are not for applicable for one under 20 or a man. The content information example 2 corresponds to advertising information of closing, the content information example 3 corresponds to commodity information in a supermarket in Tokyo, the content information example 4 corresponds to advertising information for eyeglass for a woman. In addition, the content information example 5 corresponds to advertisement for sports goods and the like.

The linkup server 9 specifies the content identifier from the token according to the before mentioned procedure, and specifies the corresponding content information. After that, the linkup server 9 refers to attribute information included in the corresponding content information, the user information and the terminal information, selects the content information according to them, and sends the content information to the portable user terminal 8.

For example, in the case that content information associated with the content identifier specified from the token received by the linkup server 9 from the portable user terminal 8 is the content information examples 1-5, when the user information is (female) and the terminal information is (resolution 800×600), (Java is not available) the content information providing part excludes the content information example 1 and the content information example 2 in which the condition for the content information example 1 is that resolution needs to be equal to more than 1024×800 and the condition for the content information example 2 is that Java is available. Then, the content information providing part sends the remaining URL3, URL4, URL5 to the portable user terminal.

When the user information is (female), (Kyoto), (eyesight 1.5), (interested genre:book), and the terminal information is (resolution 1024×800), (Java is available), the content information providing part excludes the content information example 3 of which the subject area is Tokyo, the content information example 4 which requires that eyesight of the user is equal to or less than 0.8, and the content information example 5 in which a genre is specified but the genre is other than book. Then, the content information providing part sends the remaining URL1 and URL2 to the portable user terminal 8.

Other than the above-mentioned example, when (only A service member can use) is provided to the content information as attribute information and the user information includes the A service member number, the content information is sent to the portable user terminal. In addition, when information of (driver's license is necessary) is provided to the content information and the user information includes (have driver's license), the content information is sent to the portable user terminal.

In addition, there is a case in that, when information of (mpeg2 format) is added to the content information as the attribute information and the terminal information includes (reproducible coding method :mpeg2), the content information is sent to the portable user terminal.

In the above-mentioned examples, by using the user information and the terminal information, content information which can not be used by a portable user terminal used by the user is not sent, and only information necessary for the user or usable for the user can be sent.

A case in which content information different for each user and the portable user terminal is provided according to the user information or the terminal information of the portable user terminal was described.

[Example of Obtaining Token Automatically]

Next, an example in which the portable user terminal 8 automatically obtain the token in the first embodiment.

In this case, the portable user terminal 8 includes an automatic marking part for obtaining a token at a timing based on a condition set beforehand. The portable user terminal 8 obtains the token automatically by an instruction of the automatic marking part. Operations after that are the same as the above-mentioned embodiment.

In the following, more concrete embodiments of the token type content providing system 1 described so far will be described as examples 1-1-1-6.

EXAMPLE 1-1

First, an example 1-1 will be described with reference to FIG. 3. In the following description and figures, operations and functions of parts which are not described in detail are the same as those of the token type content providing system described so far.

In this example, the information notification medium 7 can be an street advertisement placed in an arbitrary position, a strap advertisement, a sign advertisement, a sign, an electrical bulletin board, a liquid crystal bulletin board, an outdoor display for advertisement, show window, and a display table and the like.

The token in this embodiment is information including one or more items of time information, position information of the portable user terminal 8, orientation information of the terminal, moving direction information of the terminal at the time when the portable user terminal 8 obtains the token. The portable user terminal 8 has means for obtaining time information, position information of the portable user terminal 8, orientation information of the terminal, moving direction information of the terminal.

The token table database 5 manages information indicating relationship between information including one or more of time information at the time when the portable user terminal 8 obtains the token, position information of the portable user terminal 8, orientation information of the terminal, moving direction information of the terminal, and the content identifier.

More concretely, the portable user terminal 8 includes one or more of a watch 81, a position detection device 82 such as a GPS and the like, an acceleration sensor device 83 which extracts moving direction and the like. The token table database 5 has a function corresponding to a map information database. More precisely, the token table database 5 stores positions of the information notification mediums (an street advertisement placed in an arbitrary position, a strap advertisement, a sign advertisement, a sign, an electrical bulletin board, a liquid crystal bulletin board, an outdoor display for advertisement, show window, and a display table and the like) placed in various places, area range to which information can be reached, and content identifiers of content information on content related to information transmitted by each information notification medium at each time.

FIG. 4 shows an example of the token table of this example. The token table shown in the figure includes position information (latitude, longitude, height) of the information notification medium 7, information origination direction (direction of sign) and time information. These items of information are used for identifying a content identifier of content which becomes a subject of marking of the user and within the visual field of the user from the token received from the portable user terminal 8, that is, terminal position information, direction information, and time information.

The part indicated by asterisks in the time information in the figure means that the parts include all values. For example, when the time information is indicated by \*\*/\*\*/\*\* \*\*:\*\*:\*\*, it means that the information notification medium transmits information every time. In addition, when the time information is 01/03/23\*\*:\*\*:\*\*, information is transmitted every time on Mar. 23, 2001.

In the following, the operation of the system of this example will be described with reference to FIG. 3.

(STEP1) When the user is interested in information transmitted by an information notification medium such as a signboard advertisement which comes in sight at a place and at a time, the user performs marking operation of the portable user terminal 8, for example, pushes a marking button.

(STEP2) The portable user terminal 8 obtains one or more items of information of current time, current position, terminal direction and terminal moving direction as a token at the time when the user performs the marking operation. Then, the portable user terminal 8 stores the token with the user information and the terminal information.

(STEP3) When storing the token, the portable user terminal instantly presents information (which will be called mark information hereinafter) indicating that the token is stored. Or, the portable user terminal 8 notifies the user that a process accompanied by the marking operation by the user was performed by presenting the user mark information on the token. Presentation of the mark information is to present a character string such as "Mark", or a predetermined figure such as a stamp mark and the time when the marking operation is performed and the token is obtained.

(STEP4) The portable user terminal accesses the linkup sever 9 via the network, and sends the token formed by one or more items of information of current time, current position, terminal direction and terminal moving direction and the user information and the terminal information to the linkup server 9.

(STEP5) The linkup server 9 specifies the content identifier by referring to the token which was obtained from the portable user terminal and the token table database 5. Next, the linkup server 9 extracts every content information of content related to information transmitted to the user by referring to the content information database 4. After selecting content information by using the user information, terminal information, and the attribute information of the content information, the linkup server 9 sends the selected content information to the portable user terminal.

An example of a procedure for specifying the content identifier of the content on the information transmitted to the user is shown below.

When a token including time, position information and terminal moving direction is obtained, the token table database 5 extracts information notification mediums placed at positions included in a semicircle area of terminal moving direction side in which the position corresponding to the position information is the center of the semicircle and the radius is a predetermined value. In addition, among the extracted information notification mediums, the token table database 5 extracts information notification mediums in which there is no obstacle between the information notification medium and the portable user terminal, and which transmits information to a range including the position of the portable user terminal. Then, it is estimated that the information originated by the selected information notification medium is transmitted to the user.

The above-mentioned procedure is an example for predicting the information transmitted to the user. Thus, other procedures such as a simplified procedure of this example can be used.

(STEP6) Next, the portable user terminal 8 stores one or more items of content information received from the linkup server 9, and updates the mark information to icon information included in corresponding content information.

(STEP7) Then, when the user selects icon information, the potable user terminal performs a process for obtaining and utilizing content on the basis of a resource location of the corresponding content information.

In the above example, the portable user terminal can be configured such that it automatically obtains the token at a timing determined by the portable user terminal 8 on the basis of information determined by the user beforehand or operation history information of the user. In the following, this case will be described with reference to FIG. 5.

In this case, the portable user terminal 8 further includes a camera device 84, and a character recognition part 85 for analyzing an image received from the camera device 84 and extracting character string information in the image.

In addition, a keyword database 86 including one or more keywords for identifying desired information is registered beforehand by the user in the portable user terminal 8. The keywords are newly registered manually by the user, or, selected from the keywords database 86 provided in the portable user terminal 8. In addition, there is a case where the portable user terminal 8 refers to the keywords register by the user and registers keywords having similar meaning automatically.

The keywords set beforehand are, for example, specific genre names (car, music, movie, travel, restaurant and the like) interested by the user.

Figure 5:
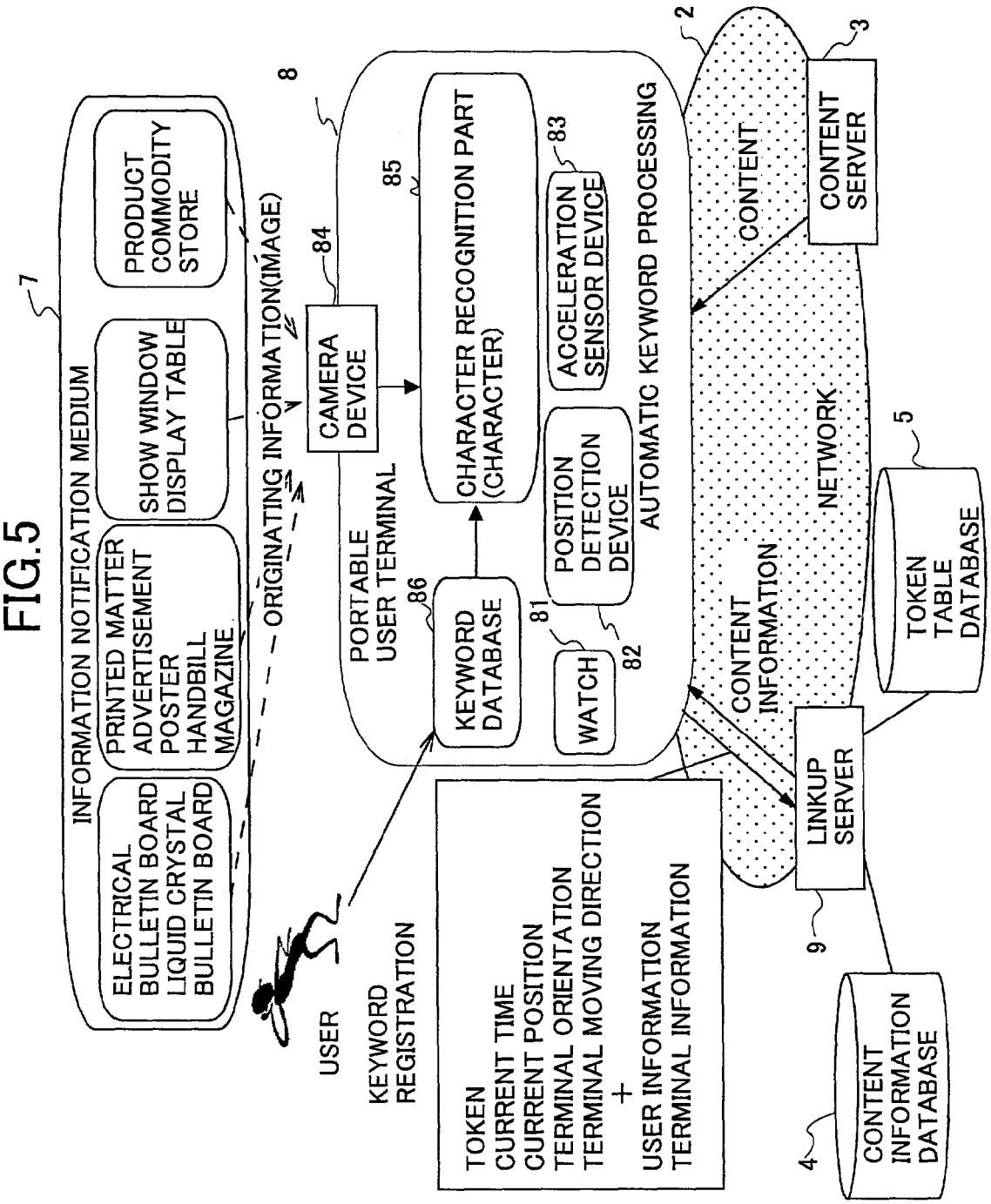
FIG. 5 is a figure fir explaining an example for obtaining the token automatically.

The operation in the configuration shown in FIG. 5 is as follows.

(STEP1) The portable user terminal 8 analyzes image information input by the camera device 84 successively and extracts character string information included in the image by using the character recognition part 85. Then, when the extracted character string information includes the keyword in the keyword database 86, the portable user terminal automatically performed the marking process and obtains the token. Operations after (STEP2) are the same as those of the above-mentioned example.

In addition, an example for obtaining the token automatically by using voice information will be described in the following.

In this example, the portable user terminal 8 includes a microphone device and a voice recognition part for recognizing the voice input from the microphone device and extracting character string information.

In addition, the portable user terminal 8 registers a keyword database including one or more keyword for identifying desired information beforehand. The keywords are newly registered manually by the user, or, selected from the keywords database provided in the portable user terminal 8. In addition, there is a case where the portable user terminal 8 refers to the keywords registered by the user and registers keywords having similar meaning automatically.

The keywords set beforehand are, for example, specific genre names (car, music, movie, travel, restaurant and the like) interested by the user. When the information notification medium is a TV and information which is transmitted is a baseball game, a specific event name such as hit, home run corresponds to the keyword.

In this case, (STEP1) the portable user terminal 8 analyzes voice information input by the microphone device successively and extracts character string information included in the voice by using the voice recognition part. Then, when the extracted character string information includes the keyword in the keyword database, the portable user terminal automatically performed the marking process and obtains the token. Operations after (STEP2) are the same as those of the above-mentioned example.

EXAMPLE 1-2

Figure 6:
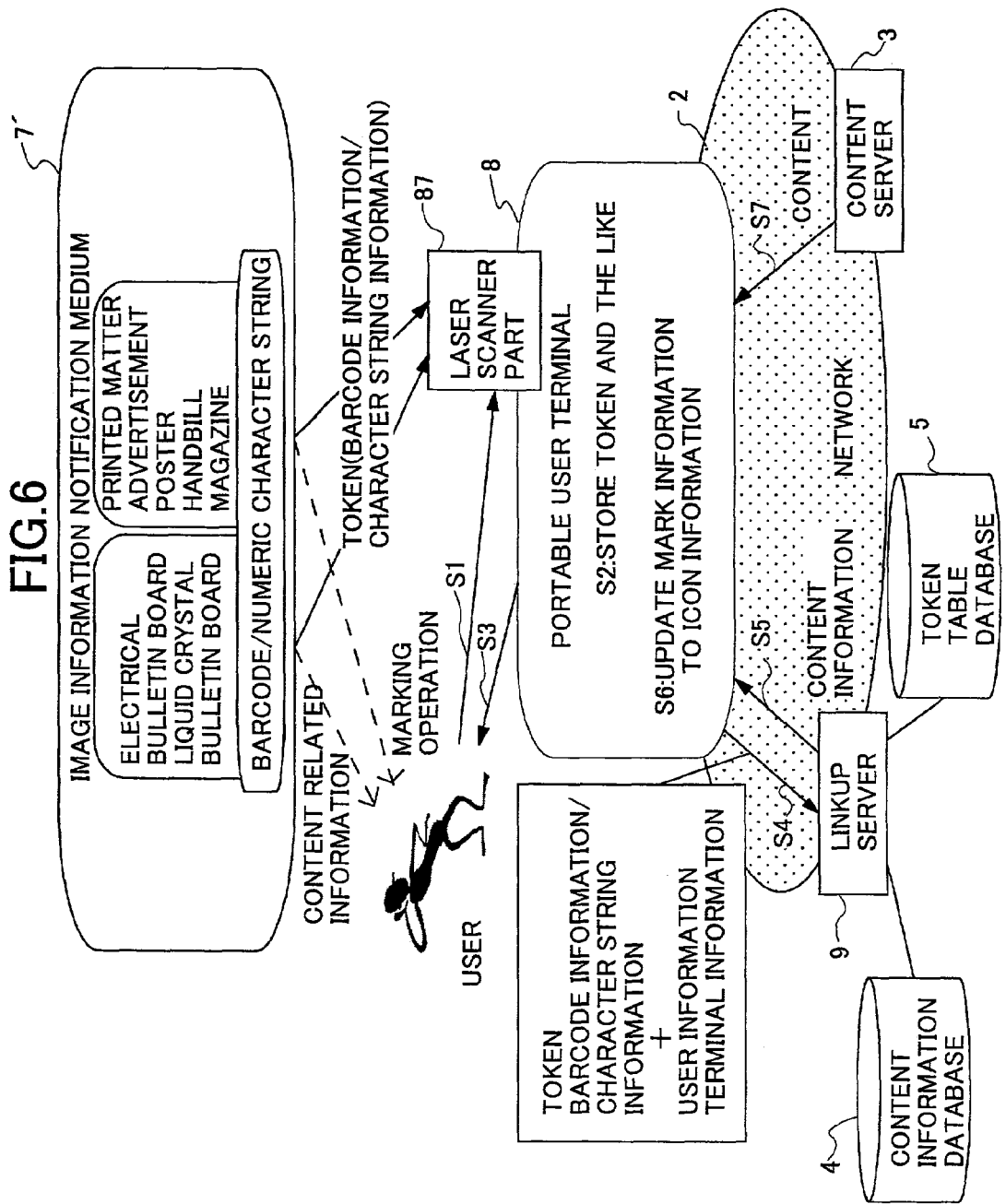
FIG. 6 is a figure for explaining an example 1-2.

Next, an example 1-2 will be described with reference to FIG. 6. In the following example, description and figures, operations and functions of parts which are not described in detail are the same as those of the token type content providing system described so far.

In this example, the example of the token type content providing system 1 in a case where the information notification medium 7 is a system transmitting image information via a medium such as paper and liquid crystal display and the like, for example, an street advertisement, a strap advertisement, a sign advertisement, an electrical bulletin board, a liquid crystal bulletin board, an outdoor display for advertisement and the like.

In the following, the system will be called an image information notification medium 7', in which the system transmits image information such as an street advertisement, a strap advertisement, a sign advertisement, an electrical bulletin board, a liquid crystal bulletin board, an outdoor display for advertisement and the like.

In this example, the token is image information or barcode information or character string information. The information notification medium 7 presents image information or barcode information or character string information. The portable user terminal 8 includes a camera or a laser scanner means 87. The token table database 5 manages information indicating correspondence relationship between the image information or barcode information or character string information and the content identifier.

More specifically, the image itself transmitted by the image information notification medium 7 is used as the token. Or, one-dimensional or two dimensional barcode information is provided. The barcode information may be either monochrome or color. Or, any character string information can be used as the token. When the image information notification medium 7' has a function of displaying different images successively in time series, that is, when the image information notification medium 7' is an electrical bulletin board, a liquid crystal bulletin board, an outdoor display for advertisement and the like, the token is provided on every image which is displayed.

In the following, it is assumed that barcode information or character string information is used as the token. In this case, the portable user terminal 8 includes a laser scanner part 87 for reading the barcode infuriation of the character string information.

FIG. 7 shows an example of the token table according to the example. The example shown in the figure corresponds to a case in which the barcode information is provided on the image information notification medium 7'. In the token table shown in FIG. 7, a content identifier is provided for each numeral described as the token received from the portable user terminal 8, that is, as the barcode information.

In the following, operation in this example will be described.

(STEP1) When the user is interested in image information transmitted by the image information notification medium, the user performs marking operation of the portable user terminal 8 by obtaining barcode information or character string information described on the image information by using the laser scanner part 87 provided in the portable user terminal 8.

(STEP2) The portable user terminal 8 stores the token (barcode information or character string information) obtained from the image information notification medium 7' by the laser scanner part 87 with the user information and the terminal information a token at the time when the user performs the marking operation.

(STEP3) When storing the token, the portable user terminal instantly presents information (which will be called mark information hereinafter) indicating that the token is stored. Or, the portable user terminal 8 presents the mark information on the token which has been stored at the time when the user specified to the user.

(STEP4) The portable user terminal accesses the linkup sever 9 via the network, and sends the token, the user information and the terminal information to the linkup server 9.

(STEP5) The linkup server 9 specifies the content identifier by referring to the token which was obtained from the portable user terminal 8 and the token table database 5. Next, the linkup server 9 extracts every content information of content related to information transmitted to the user by referring to the content information database 4. After selecting content information by using the user information, terminal information, and the attribute information of the content information, the linkup server 9 sends the selected content information to the portable user terminal.

(STEP6) Next, the portable user terminal 8 stores one or more items of content information received from the linkup server 9, and updates the mark information to icon information included in corresponding content information.

(STEP7) Then, when the user selects icon information, the potable user terminal performs a process for obtaining and utilizing content on the basis of a resource location of the corresponding content information.

EXAMPLE 1-3

Figure 8:
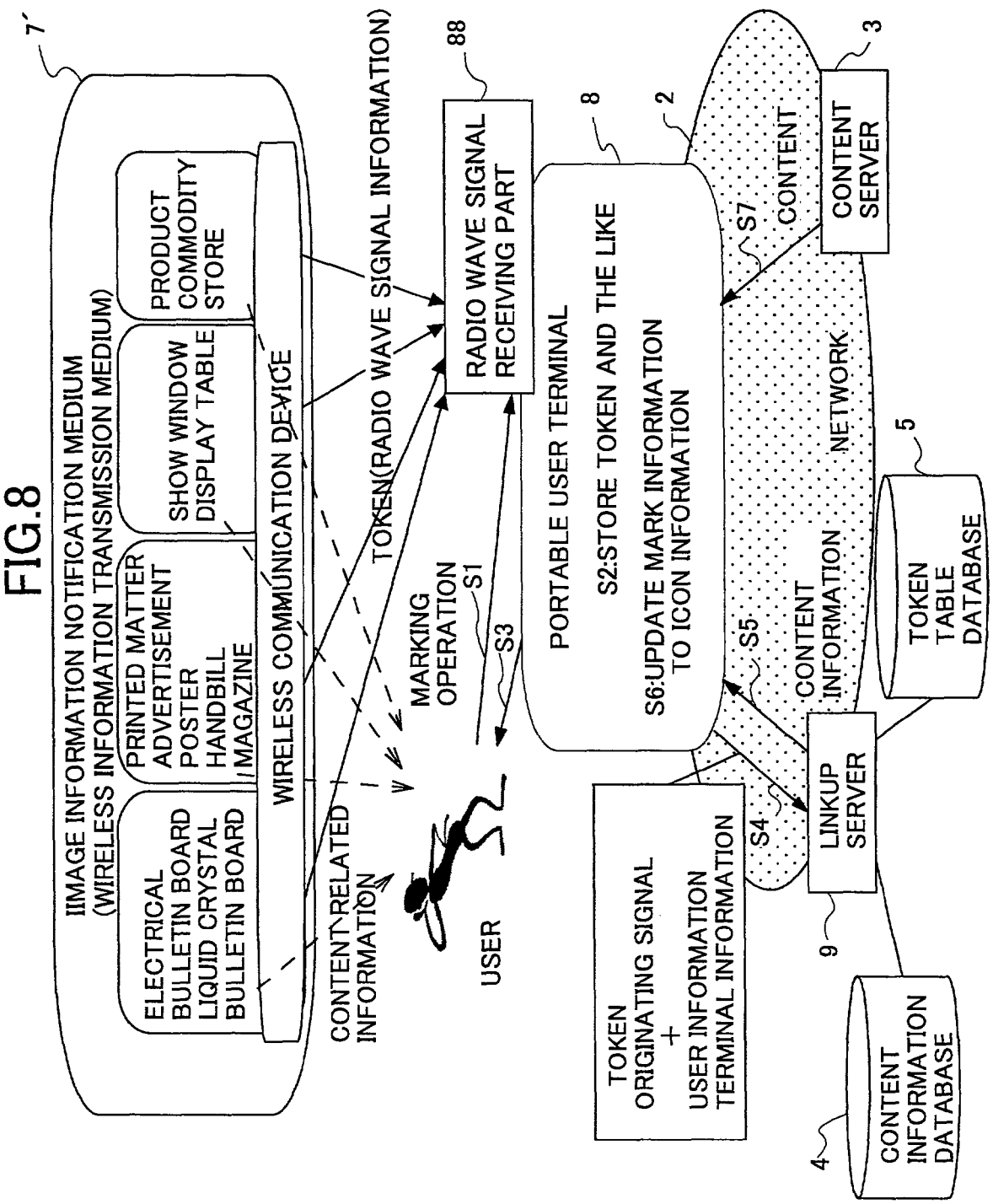
FIG. 8 is a figure for explaining an example 1-3.

Next, an example 1-3 will be described with reference to FIG. 8. In the following example, description and figures, operations and functions of parts which are not described in detail are the same as those of the token type content providing system described so far.

In this example, the token is radio wave signal information transmitted by a radio wave. The information notification medium 7 transmits radio wave signal information. The portable user terminal 8 includes a radio wave signal receiving part 88 for obtaining the radio wave signal information. The token table database 5 manages information indicating relationship between the radio wave signal information and the content identifier.

More specifically, the information notification medium 7 may include an electrical bulletin board, a liquid crystal bulletin board, an outdoor display for advertisement, a show window, a display table, a wireless device such as an infrared device and Bluetooth and the like in a store. In the following description, a system which includes an electrical bulletin board, a liquid crystal bulletin board, an outdoor display for advertisement, a show window, a display table, or a wireless device such as an infrared device and Bluetooth and the like in a store may be called a wireless information notification medium 7'. In this example, the wireless information notification medium 7' transmits the token by the wireless communication device such as the infrared device or the Bluetooth or the like. The token is radio wave signal information used for identifying content, and may be a data packet of a predetermined length or a variable length having corresponding number of bytes.

The portable user terminal 8 includes a radio wave signal receiving part 88 for obtaining the radio wave signal information transmitted by the wireless communication device such as the infrared device or the Bluetooth or the like.

FIG. 9 shows an example of the token table according to the example. In the token table shown in the figure, the content identifier is associated with the token, that is the radio wave signal information, received from the portable user terminal 8.

In the following, operation in this example will be described.

(STEP1) When the user is interested in an electrical bulletin board, a liquid crystal bulletin board, an outdoor display for advertisement, a show window, a display table, a store or the like, the user performs marking operation of the portable user terminal, for example, by pushing a predetermined button.

(STEP2) The portable user terminal 8 obtains the token received by the radio wave signal receiving part 88 at the time when the user performs the marking operation, and stores the token with the user information and the terminal information.

(STEP3) When storing the token, the portable user terminal instantly presents information (which will be called mark information hereinafter) indicating that the token is stored. Or, the portable user terminal 8 presents the mark information on the token which has been stored at the time when the user specified to the user.

(STEP4) The portable user terminal accesses the linkup sever 9 via the network, and sends the token, the user information and the terminal information to the linkup server 9.

(STEP5) The linkup server 9 specifies the content identifier by referring to the token which was obtained from the portable user terminal 8 and the token table database 5. Next, the linkup server 9 extracts every content information of content related to information transmitted to the user by referring to the content information database 4. After selecting content information by using the user information, terminal information, and the attribute information of the content information, the linkup server 9 sends the selected content information to the portable user terminal.

(STEP6) Next, the portable user terminal 8 stores one or more items of content information received from the linkup server 9, and updates the mark information to icon information included in corresponding content information.

(STEP7) Then, when the user selects icon information, the potable user terminal performs a process for obtaining and utilizing content on the basis of a resource location of the corresponding content information.

In the same way as the example 1-1, in the examples 1-2 and 1-3, the portable user terminal can be configured such that it automatically obtains the token at a timing determined by the portable user terminal 8 on the basis of information determined by the user beforehand or operation history information of the user. In the following, this case will be described. The configuration for obtaining the token automatically is the same as that of FIG. 5.

That is, the portable user terminal 8 further includes a camera device, and a character recognition part for analyzing an image received from the camera device and extracting character string information in the image.

In addition, a keyword database including one or more keywords for identifying desired information is registered beforehand in the portable user terminal 8. The keywords are newly registered manually by the user, or, selected from the keywords database 86 provided in the portable user terminal 8. In addition, there is a case where the portable user terminal 8 refers to the keywords registered by the user and registers keywords having similar meaning automatically.

The keywords set beforehand are, for example, specific genre names (car, music, movie, travel, restaurant and the like) interested by the user.

The operation is as follows.

(STEP1) The portable user terminal 8 analyzes image information input by the camera device 84 successively and extracts character string information included in the image by using the character recognition part 85. Then, when the extracted character string information includes the keyword in the keyword database 86, the portable user terminal automatically performs the marking process and obtains the token. Operations after (STEP2) are the same as those of the above-mentioned example.

In addition, an example for obtaining the token automatically by using music information will be described in the following.

In this example, the portable user terminal 8 includes a microphone device and a voice recognition part for recognizing the voice input from the microphone device and extracting character string information.

In addition, the portable user terminal 8 registers a keyword database including one or more keyword for identifying desired information beforehand. The keywords are newly registered manually by the user, or, selected from the keywords database provided in the portable user terminal 8. In addition, there is a case where the portable user terminal 8 refers to the keywords registered by the user and registers keywords having similar meaning automatically.

The keywords set beforehand are, for example, specific genre names (car, music, movie, travel, restaurant and the like) interested by the user. When the information notification medium is a TV and information which is transmitted is a baseball game, a specific event name such as hit, home run corresponds to the keyword.

In this case, (STEP1) the portable user terminal 8 analyzes voice information input by the microphone device successively and extracts character string information included in the voice by using the voice recognition part. Then, when the extracted character string information includes the keyword in the keyword database, the portable user terminal automatically performed the marking process and obtains the token. Operations after (STEP2) are the same as those of the above-mentioned example.

In addition, the portable user terminal can be configured such that it obtains the content information successively, and performs marking operation automatically by referring to the content information. In the following, this example will be described.

In this case, the content information includes either one or both of a text and a keyword for explaining the corresponding content as the attribute information.

In addition, the portable user terminal 8 registers a keyword database including one or more keyword for identifying desired information beforehand. The keywords are newly registered manually by the user, or, selected from the keywords database provided in the portable user terminal 8. In addition, there is a case where the portable user terminal 8 refers to the keywords registered by the user and registers keywords having similar meaning automatically.

The keywords set beforehand are, for example, specific genre names (car, music, movie, travel, restaurant and the like) interested by the user. When the information notification medium is a TV and information which is transmitted is a baseball game, the keyword corresponds to a specific event name such as hit, home run.

(STEP1) The portable user terminal 8 is always connected to the network, obtains the token one by one, and sends the token to the linkup server 9 one by one, and obtains content information. When the text of the keywords included in the obtained content information includes the keyword in the keyword database, the portable user terminal automatically performs the marking process by storing the corresponding token with the content information and obtains the token. Operations after (STEP2) are the same as those of the above-mentioned example.

EXAMPLE 1-4

Next, an example 1-4 will be described. In the following example, operations and functions of parts which are not described in detail are the same as those of the above-mentioned examples. In addition, the whole system configuration is the same as those of the above-mentioned examples.

In this example, an example of the token type content providing system will be described when the information notification medium is a system transmitting image information via a medium such as paper and liquid crystal display and the like, for example, the information notification medium is a street advertisement, a strap advertisement, a sign advertisement, an electrical bulletin board, a liquid crystal bulletin board, an outdoor display for advertisement and the like.

In the following, the system which transmits image information will be called an image information notification medium, in which the system is an street advertisement, a strap advertisement, a sign advertisement, an electrical bulletin board, a liquid crystal bulletin board, an outdoor display for advertisement or the like.

In this example, the token is a telephone number. The information notification medium presents a telephone number. The portable user terminal 8 includes a camera device and a part for inputting a telephone number or a character recognition part for recognizing and reading a telephone number character string from an image input from the camera device. The token table database 5 manages information indicating relationship between the telephone number and the content identifier.

FIG. 10 shows an example of the token table according to this example. The example shown in the figure corresponds to a case in which the telephone number is provided on the image information notification medium. In the token table shown in the figure, a content identifier is provided for each telephone number, that is, the token received from the portable user terminal.

In the following, operation in this example will be described.

(STEP1) When the user is interested in image information transmitted by the image information notification medium, the user inputs the telephone number in the portable user terminal by using the input part. Or, the user take a picture of then telephone number part in the image information notification medium by using the camera device provided in the portable user terminal. After that, the character recognition part for recognizing and reading the telephone number character string from the image input from the camera in the portable user terminal extracts the telephone number character string. As a result, the telephone number is obtained.

(STEP2) The portable user terminal 8 stores the telephone number which is input by the user or obtained by the character recognition part as the token.

(STEP3) When storing the token, the portable user terminal instantly presents information (which will be called mark information hereinafter) indicating that the token is stored. Or, the portable user terminal 8 presents the mark information on the token which has been stored at the time when the user specified to the user.

(STEP4) The portable user terminal accesses the linkup sever 9 via the network, and sends the token, the user information and the terminal information to the linkup server 9.

(STEP5) The linkup server 9 specifies the content identifier by referring to the token which was obtained from the portable user terminal 8 and the token table database 5. Next, the linkup server 9 extracts every content information of content related to information transmitted to the user by referring to the content information database 4. After selecting content information by using the user information, terminal information, and the attribute information of the content information, the linkup server 9 sends the selected content information to the portable user terminal.

(STEP6) Next, the portable user terminal 8 stores one or more items of content information received from the linkup server 9, and updates the mark information to icon information included in corresponding content information.

(STEP7) Then, when the user selects icon information, the potable user terminal performs a process for obtaining and utilizing content on the basis of a resource location of the corresponding content information.

EXAMPLE 1-5

Next, an user interface and the function of the portable user terminal 8 in the above-mentioned token type content providing system as an example 1-5.

The portable user terminal 8 has a function for displaying a list of icon information included in the content information stored in a storing part, for moving a display position of the icon information, and for deleting the icon information. The user interface of the portable user terminal 8 can be provided as a GUI using a Desktop metaphor equivalent to that provided by Windows or MacOS. In the following, a concrete example of a GUI system of the portable user terminal will be described concretely.

The portable user terminal 8 includes a GUI in which a plurality of items of icon information are placed like a matrix, and includes functions for moving, deleting the icon information, and executing a process corresponding to icon information which is clicked. Information of the types of icon information, icon images corresponding to icon information, positions of icon information objects and the like are manages by using a text file of XML format, The GUI may be formed by using the managed information. In this case, the GUI is a browser of XML file. In addition, HTML browser components are included so that the GUI functions as a normal HTML browser. Therefore, the GUI can presents various content such as HTML content handled by the HTML browser, JavaApplet, various images, video images and the like.

Figure 11:
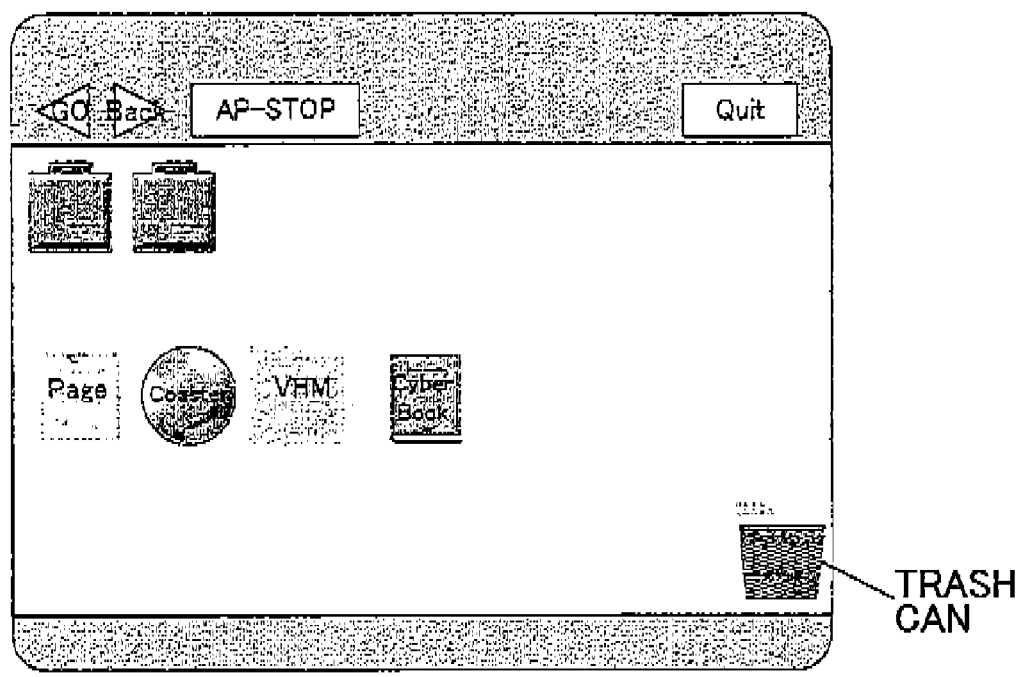
FIG. 11 shows an example of a GUI basic screen in a user terminal.

FIG. 11 shows an example of a GUI basic screen. For example, there are bottoms of Go, Back, Stop, Quit on the GUI screen like a normal browser.

Figure 12:
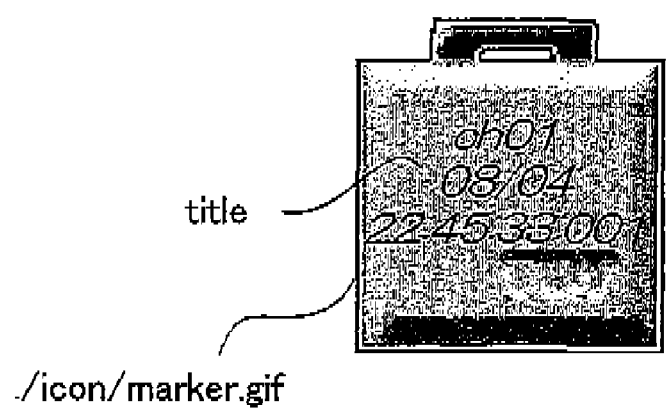
FIG. 12 shows an example of icon information.

FIG. 12 shows an example of icon information. When the size of an icon information matrix defined by XML is larger than a frame, a scroll bar appears so that the object icon matrix can be scrolled.

Following operations are available in the GUI screen.

(A) Arrangement of icons can be changed by dragging the icon information.

Figure 13:
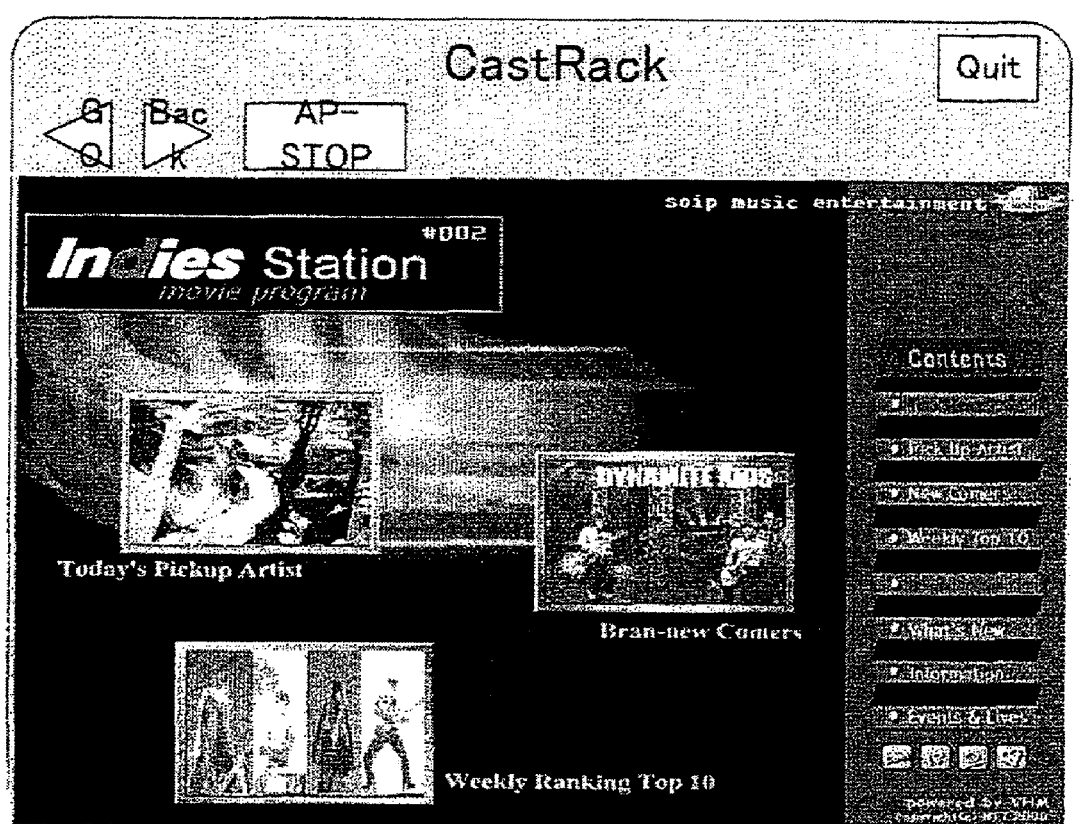
FIG. 13 shows a screen example when content is used.

(B) By clicking icon information, a process of content associated with the icon information is executed. FIG. 13 shows a screen example when content is used.

(C) When displaying XML or content, if the Go button is pushed, the displayed screen is moved to a screen of XML/HTML which opens next in a history.

(D) When displaying XML or content, if the Go button is pushed, the displayed screen is moved to a screen of XML/HTML which opened previously in a history.

(E) Start reading process of content and HTML is stopped.

(F) When an application is executed, the application is ended.

(G) The screen can be scrolled by using a scroll bar. In addition, when moving the icon, the screen is scrolled when the icon is dragged to the upper end or the lower end.

(H) The icon information can be deleted. By this operation, corresponding icon information is deleted from the storing part of the portable user terminal.

The GUI of the portable user terminal may not necessarily perform every above-mentioned operation.

EXAMPLE 1-6

Figure 14:
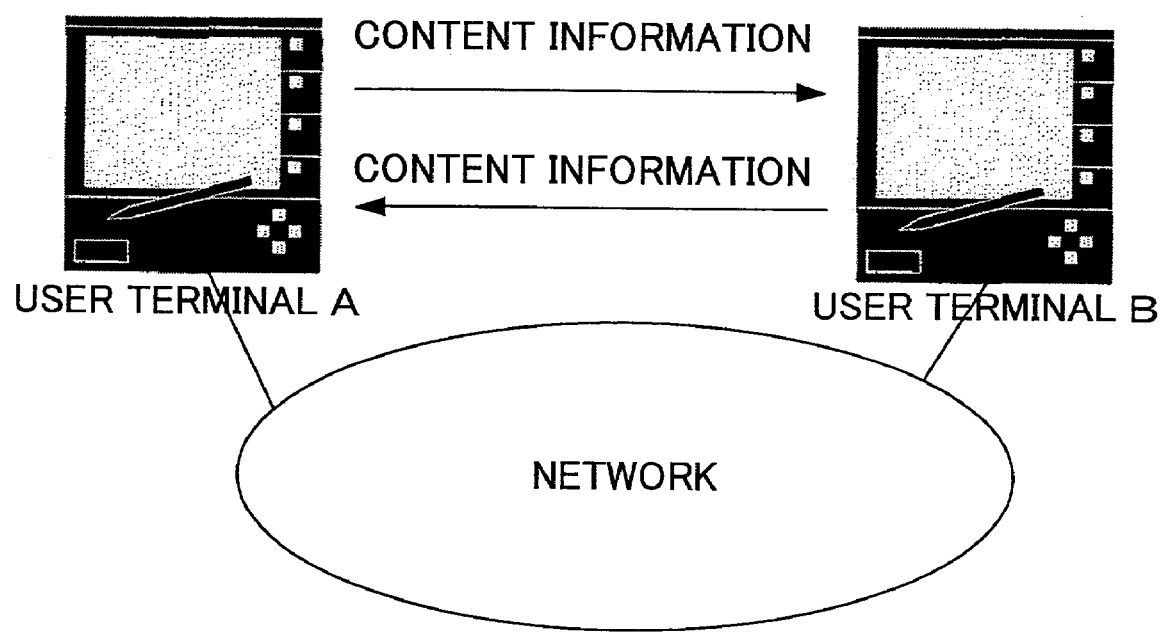
FIG. 14 is a figure for explaining a function of transmitting/receiving content information between the portable user terminals.

Next, a function of transmitting/receiving content information between the portable user terminal will be described as the example 1-6 with reference to FIG. 14.

When a plurality of portable user terminal are connected to the network, a portable user terminal A of the token type content providing system includes functions for transmitting content information to another portable user terminal B, receiving content information sent from another portable user terminal B, and storing and utilizing the content information.

The user specifies an address of an portable user terminal to which the content is sent by a predetermined operation, specifies content information to be sent, and performs a sending process, so that the content information can be sent to the portable user terminal via a predetermined network. When the network is an IP network, for example, the portable user terminal can be configured such that the content information can be sent and received as an attached file of an e-mail.

In addition, when the content information is received by another portable user terminal, the portable user terminal presents an event for notifying the user of it, and presents icon information included in the token information which is newly received. The user can access content corresponding to the icon information and can use the information by selecting the icon information.

As mentioned above, according to the present invention, an environment can be realized in which the user can easily access content on WWW related to information transmitted by various information notification mediums.

In addition, a system can be realized in which content information interested by the user or suitable for the user attributes can be provided in consideration of difference of points of interest for each user when obtaining WWW content by using the token. In addition, a system can be realized for providing content applicable for use by a portable user terminal in consideration of terminal information such as display ability, processing ability and the like of the portable user terminal. In addition, a part for automatically marking information not manually by the user is provided. Thus, the problem that the user needs to mark interested object at all times in daily life can be solved.

In addition, in the above-mentioned network content use environment, the user can effectively and efficiently manage and use content information of content on WWW related to information transmitted by the various information notification medium. In addition, user content information is managed by the server. Thus, the user can always manage and use the same user content information even when the terminal used by the user is different.

In addition, a use environment can be realized in which a user who obtained information of network content can send the information of network content to another user in the same way in which information on a paper is sent to another user as a mail.

Second Embodiment

Next, an example in which the token type content providing system described in the first embodiment is applied to a coupon service will be described as the second embodiment.

Before describing the second embodiment, a conventional technologies and the problems on the coupon service will be described first.

In a conventional coupon service, a coupon is provided to the user by distributing as a leaflet inserted in a newspaper or distributing on the street. Then, the user can receive a special service such as discount and the like by taking the coupon to a store.

As the Internet becomes widespread, and a high performance portable phone (for example, i-mode of NTT DoCoMo) which is connected to the Internet and can receive data such as image and the like becomes widespread, the coupon service has become diversified.

In addition, there is a coupon service in which a PC terminal which can use the Internet accesses a predetermined home page, displays coupon information on a screen, prints out it on a paper, and the user use the paper as a coupon.

In addition, there is a coupon service in which an e-mail including coupon information is sent to a mobile phone which has an e-mail function, and the user presents the received e-mail in a store, so that a coupon service is provided. In addition, a coupon service using a mobile phone having a function of browsing a home page, is provided in which coupon information is sent by e-mail when performing coupon request operation on an accessed home page, and the user uses it as a coupon. In addition, there is a coupon service in which the coupon information sent by e-mail is a barcode image, and the coupon service is provided by authenticating the barcode image in a store.

However, in the above-mentioned conventional technology, sending the coupon information mail to the users randomly is a problem because the mail is sent to users who does not want to use the service and pulling power is weak. However, the method of accessing the predetermined home page and printing it out and using it is inconvenient since the user needs to access the hope page. The inconvenience is the same as the method of sending coupon information mail request and using the received mail.

In the second embodiment, to solve the above-mentioned problems, a system to which the token type content providing system described in the first embodiment is applied will be described. According to this system, the token can be used as the coupon. In addition, in the second embodiment, a mechanism that the coupon provided as a token is correctly used as a corresponding coupon service is provided. In addition, a mechanism for grasping that the coupon is used for the corresponding coupon service. In addition, a mechanism for exchanging coupon information provided as a coupon between users like a normal paper coupon is provided.

Figure 15:
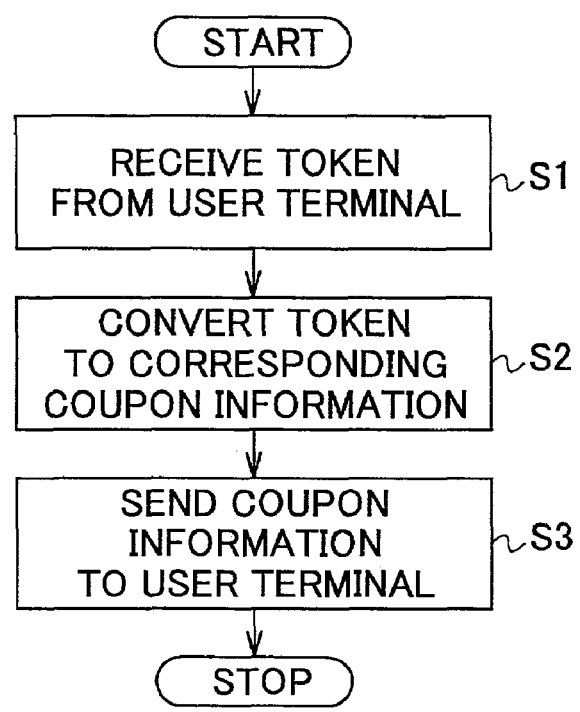
FIG. 15 is a figure for explaining an outline of the second embodiment.

FIG. 15 is a figure for explaining an overview of the second embodiment.

In a token/coupon information conversion method used for providing a coupon service of the second embodiment, a linkup server which manages the coupon information receives, from the portable user terminal, the token including information used for specifying originating information on a service transmitted from the information notification medium (step 1). Then, the linkup server converts the token to a corresponding coupon information in step 2, and sends the coupon information to the portable user terminal in step 3.

Figure 16:
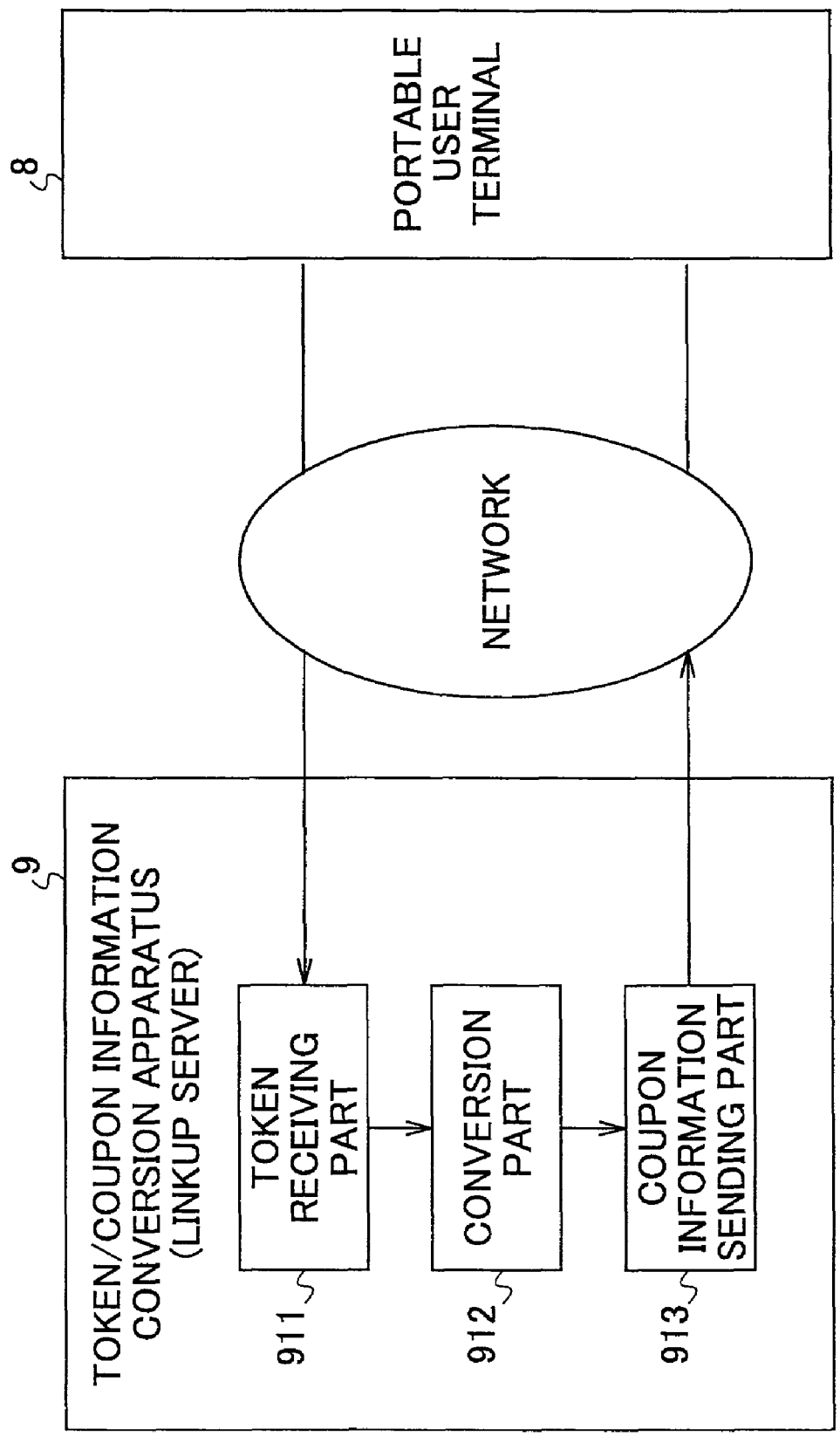
FIG. 16 is a figure for explaining an overview of the second embodiment.

FIG. 16 is a schematic block diagram of the token/coupon information conversion apparatus of the second embodiment.

The token/coupon information conversion apparatus for providing the coupon service of the second embodiment corresponds to the linkup server of the first embodiment. The token/coupon information conversion apparatus includes a token receiving part 911 for receiving a token from the portable user terminal 8, in which the token includes information for specifying originating information on the service transmitted from the information notification medium, a conversion part 912 for converting the token into corresponding coupon information, and a coupon information sending part 913 for sending the coupon information to the portable user terminal 8.

In the following, the system of this embodiment will be described as the token type coupon providing system.

Figure 17:
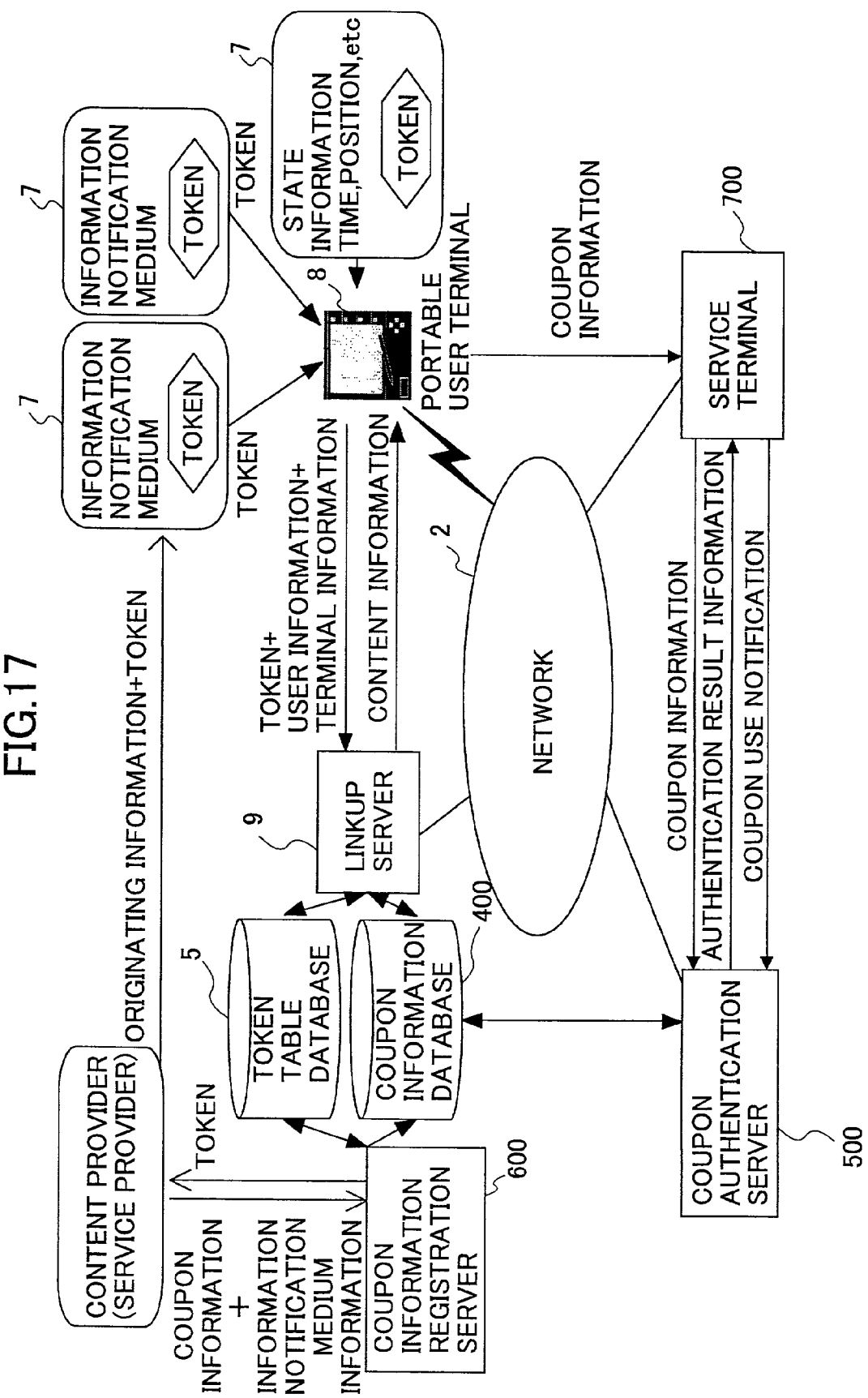
FIG. 17 is a block diagram of the token/coupon information conversion system of the second embodiment of the present invention.

FIG. 17 is a block diagram of the token/coupon information conversion system of the second embodiment of the present invention.

The token/coupon information conversion system of the present invention includes an information notification medium 7 for transmitting originating information on a service, a portable user terminal 8 for obtaining the token including information for specifying the transmitted originating information, a linkup server 9 for providing coupon information, a service terminal 700 for providing a service, a coupon authentication server for authenticating coupon information, a coupon information registration server 600 which obtains coupon information and information notification medium information from the content provider, and returns a token, a token table database 5, and a coupon information database 400.

Next, basic operation of the above system will be described.

The portable user terminal 8 obtains a token, sends the token to the linkup server 9 via a predetermined network 2. The linkup server 9 sends coupon information corresponding to the received token to the portable user terminal 8. The portable user terminal 8 sends the received coupon information to the service terminal 700. The service terminal 700 sends the coupon information to the coupon authentication server 500, and the coupon authentication server 500 authenticates the coupon information and sends the result of authentication to the service terminal 700. The service terminal 700 judges whether the coupon service can be provided based on the result of authentication, and provides the coupon service according to the judgment. In addition, the service terminal 700 sends a coupon information use notification to the coupon authentication server 500 when it provides the coupon service.

In the present invention, the information notification medium 7 is broadcast such as TV and radio and the like, street advertisement, strap advertisement, a signboard, an electric signboard, a liquid crystal signboard, an outdoor display for advertisement, a show window, a display table or the like. The information notification medium 7 is an medium which originates information via various mediums such as a paper, a signboard, an electronic wave and the like. Or, the information notification medium 7 is an apparatus medium which originates information by displaying an object such as a commodity product.

The token is information for specifying the information notification medium 7 and information obtained form the information notification medium. For example, the token is an ID multiplexed in originating information, an information obtaining place, and information obtaining time, or channel number and viewing time when viewing TV.

The coupon information is information used for specifying a corresponding coupon service. For example, the coupon information is a signal code, a numeric character sequence, a ciphered numeric character sequence information, barcode information, an image, an image in which numeric character information is embedded by electronic watermarking and the like.

The coupon service is a service in which the user can obtain and use a predetermined commodity or service at a reduced price or at no charge by presenting coupon information by using the portable user terminal 8, or a service in which the user can enter an event place by presenting coupon information, or a service in which the user can obtain a present by presenting coupon information. That is, the coupon service corresponds to services generally realized by distributing a coupon.

The present invention is a system which allows the user to use the token as a coupon. Generally, a coupon of a paper is distributed, or the user take the coupon which is placed in a store as necessary, and the user uses the coupon. On the other hand, according to the system of the present invention, the user can use the coupon service by performing marking operation (an operation for obtaining a coupon) by using the portable user terminal 8 when the user views or hears information on the coupon service from the information notification medium 7. Accordingly, the provider of the coupon service can easily distribute the coupon via various information notification mediums.

Figure 18:
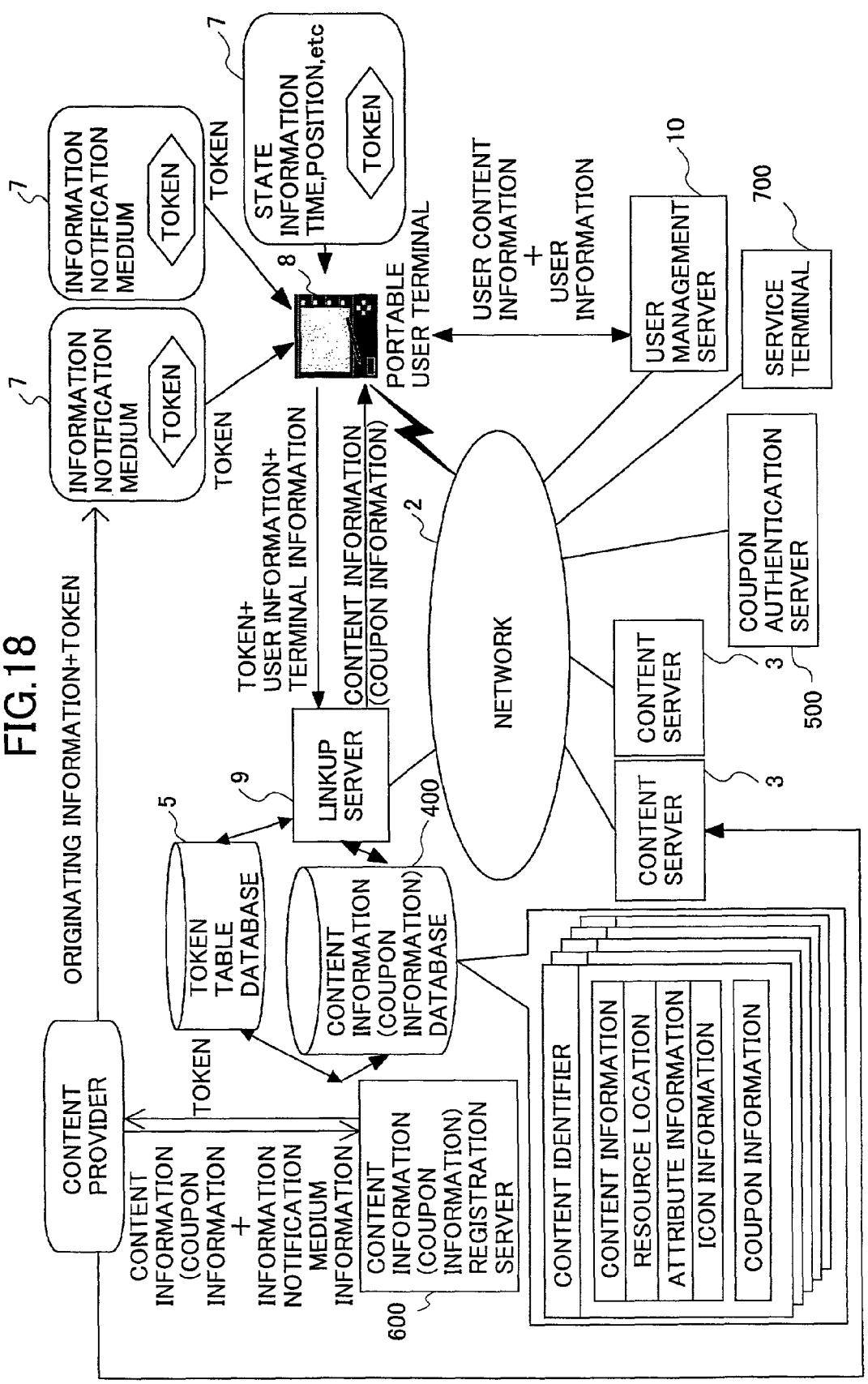
FIG. 18 is a block diagram of another token/coupon information conversion system of the second embodiment of the present invention.

FIG. 18 shows a configuration in which a user management server 10 and a content server 3 are added to the above-mentioned system. The system shown in FIG. 18 is for realizing token/coupon information conversion of the second embodiment in the token type content providing system of the first embodiment.

In this system, content information is configured such that it includes coupon information When the coupon information is used, in the same way described by using FIG. 17, the portable user terminal 8 sends coupon information included in the received content information to the service terminal 700. The service terminal 700 sends the coupon information to the coupon authentication server 500, and the coupon authentication server 500 authenticates the coupon information and sends the result of authentication to the service terminal 700. The service terminal 700 judges whether the coupon service can be provided based on the result of authentication, and provides the coupon service according to the judgment. In addition, the service terminal 700 sends a coupon information use notification to the coupon authentication server 500 when it provides the coupon service.

As for the system shown in FIG. 18, various configurations same as those in the first embodiment are available for the configuration in which the portable user terminal obtains content information including coupon information via the token.

EXAMPLE

In the following, an example of the token type coupon providing system will be described. FIG. 19 shows an example of the content information of this example.

When the coupon information is used, in the same way described by using FIG. 17, the portable user terminal 8 sends coupon information included in the received content information to the service terminal 700. The service terminal 700 sends the coupon information to the coupon authentication server 500, and the coupon authentication server 500 authenticates the coupon information and sends the result of authentication to the service terminal 700. The service terminal 700 judges whether the coupon service can be provided based on the result of authentication, and provides the coupon service according to the judgment. In addition, the service terminal 700 sends a coupon information use notification to the coupon authentication server 500 when it provides the coupon service.

As another example of the token type coupon providing system, a system in Japanese patent application 2001-115997 "method, system and apparatus for obtaining information related to broadcast information" can be used. More specifically, the related information content providing server (which corresponds to the linkup server of the present invention) is configured such that service information which can be provided by the related information content providing server or related information includes the coupon information. A viewer apparatus (which corresponds to the portable user terminal of the present invention) receives the service information including the coupon information or the related information, and the user uses a coupon service by using the coupon information.

In this case, when the coupon information is used, the viewer terminal (corresponding to the portable user terminal 8) sends coupon information included in the received content information to the service terminal 700. The service terminal 700 sends the coupon information to the coupon authentication server 500, and the coupon authentication server 500 authenticates the coupon information and sends the result of authentication to the service terminal 700. The service terminal 700 judges whether the coupon service can be provided based on the result of authentication, and provides the coupon service according to the judgment. In addition, the service terminal 700 sends a coupon information use notification to the coupon authentication server 500 when it provides the coupon service.

The function of the linkup server can be constructed as a program, and the program can be installed in a computer used as the linkup server, or can be distributed via the network.

In addition, the program can be stored in a hard disk connected to the computer used as the linkup server, or a transportable recording medium such as a floppy disk and a CD-ROM and the like. By installing the program from the medium to the computer, the present invention can be easily realized.

As mentioned above, according to the present invention, an environment in which the user can easily use a coupon service related to information transmitted by the information notification medium can be realized.

According to the present invention, since the linkup server is provided on the network, the basic function of the system which can use the token as the coupon can be realized.

In addition, since the token type coupon providing system of the present invention is formed such that parts for providing coupon service is added to the token type content providing system of the first embodiment, the coupon providing service and the content providing service provided by the token type content providing system can be provided simultaneously. That is, the coupon information and information of content explaining details of the coupon service can be provided simultaneously.

In addition, in the token type coupon providing system, the portable user terminal sends coupon information to the service terminal. The service terminal sends the coupon information to the coupon authentication server, and the coupon authentication server authenticates the coupon information and sends the result of authentication to the service terminal. The service terminal 700 judges whether the coupon service can be provided based on the result of authentication. Accordingly, it is ensured that the provided coupon information corresponding the token is applied to a target coupon service.

In addition, in the token type coupon providing system, since the service terminal includes a part which sends a coupon information use notification to the coupon authentication server when it provides the coupon service, the system can grasp that the coupon was used.

In addition, in order to exchange the coupon information provided as the token between users like a coupon of a paper, the portable user terminal includes a function of sending received coupon information to another portable user terminal connected to the token type coupon providing system, and a function of receiving coupon information from another portable user terminal.

Generally, a coupon of a paper is distributed, or the user takes the coupon which is placed in a store as necessary, and the user uses the coupon. On the other hand, according to the system of the present invention, the user can use the coupon service by performing marking operation (an operation for obtaining a coupon) by using the portable user terminal when the user views or hears information on the coupons service from the information notification medium. By using this system, the provider of the coupon service can easily distribute a coupon via various information notification mediums. In addition, the system (coupon provider) can grasp using state of the coupon. In addition, like the paper coupon, the coupon can be exchanged between the users.

(Third Embodiment)

Next, the third embodiment of the present invention will be described.

In this embodiment, a plurality of content obtained by the portable user terminal are presented to the user according to a method specified by presentation control information.

Figure 20:
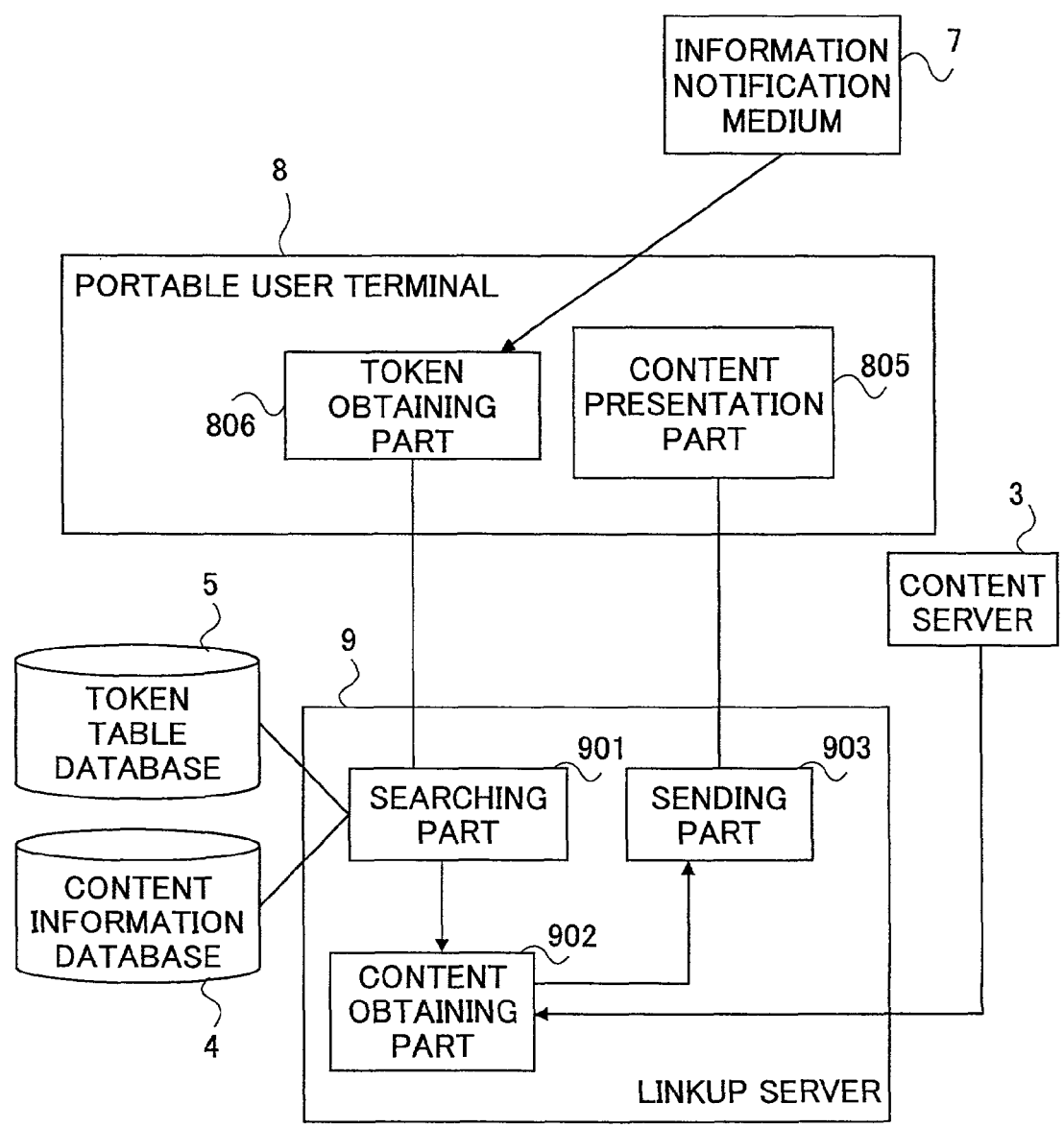
FIG. 20 is a schematic block diagram of the token type content providing system of the third embodiment.

In the following, the third embodiment of the present invention will be described with reference to FIG. 20. FIG. 20 is a schematic block diagram of the third embodiment in which the linkup server performs a process for obtaining content from the content server.

The third embodiment is a content providing system for providing the user with content related to originating information which is printed, described or displayed on the various information notification medium 7 and which is notified to the user. The content providing system includes a plurality of portable user terminals 8, one or more content servers 3 for providing the content via the network, a linkup server 9, a content information database 4 for managing content information for each content identifier which is uniquely set for each content, and a token table management database 5 for managing a token table including information on relationship between the token which is information which can specify content and the content identifier.

The portable user terminal 8 includes a token obtaining part 806 for obtaining the token from the information notification medium and sending it to the linkup server 9, and a content presentation part 805 for obtaining content and content information related to the content from the linkup server, and presents the content to the user by using a method specified by the presentation control information included in the content information.

The linkup server 9 includes a searching part 901 for determining one or more content identifier on the basis of the token obtained from the portable user terminal 8 by referring to the token table database 5, and for searching for content information corresponding to the content identifier, a content obtaining part 902 for obtaining content from the content server 20 by using a resource location included in the content information, and a sending part 903 for sending the content and the content information to the portable user terminal 8.

Figure 21:
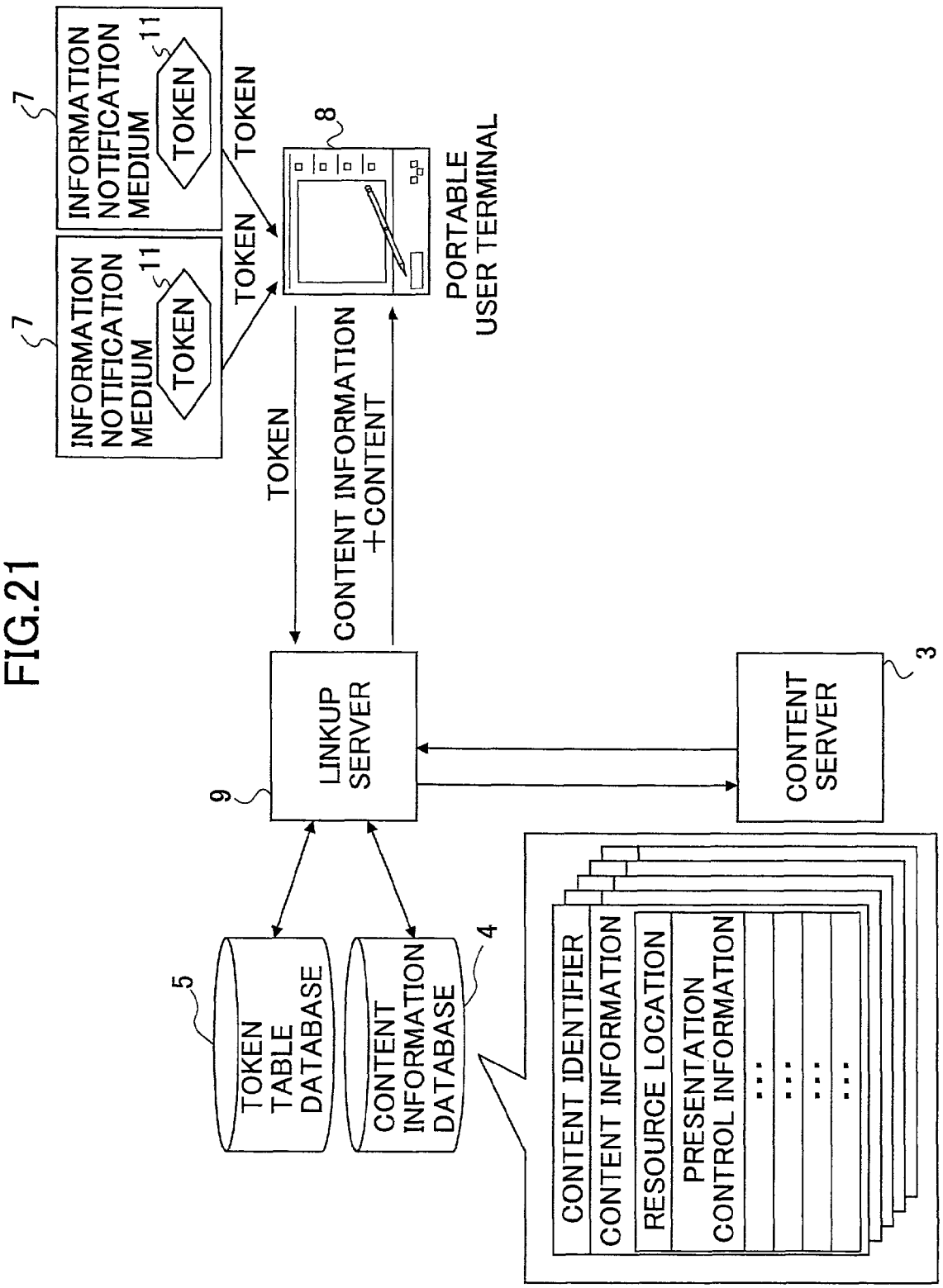
FIG. 21 is a schematic block diagram of the content providing system of the third embodiment.

In the following, an example will be described in which the content is presented to the user by a method specified by the presentation control information included in the content information with reference to FIG. 21. FIG. 21 shows only parts used for this embodiment in the token type content providing system shown in FIG. 1. Operations of each part shown in FIG. 21 are the same as those of the first embodiment.

Figure 22:
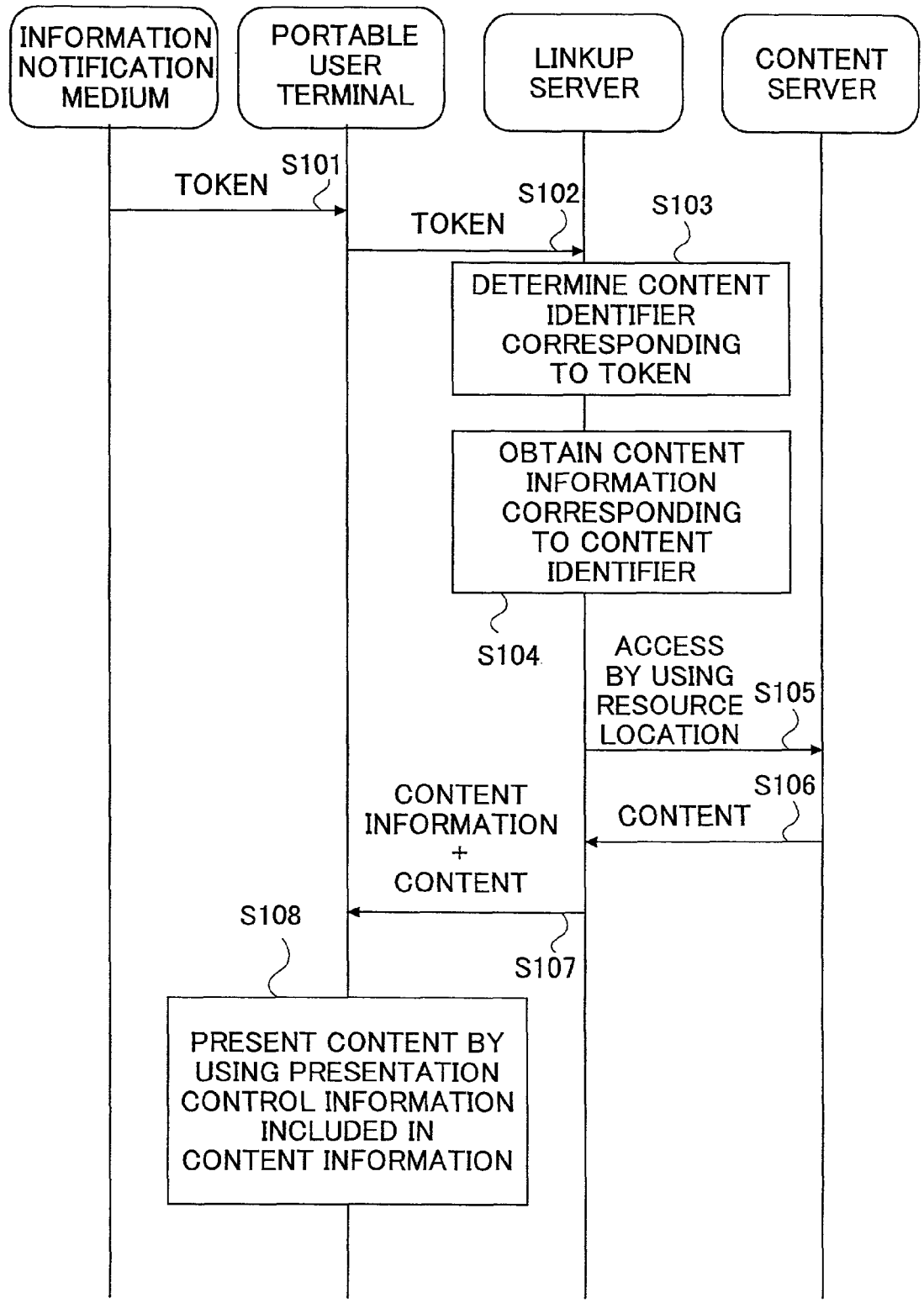
FIG. 22 is a sequence chart showing the operation of the content providing system in the third embodiment of the present invention.

FIG. 22 is a sequence chart showing the operation of the content providing system in the third embodiment of the present invention.

step 101) The portable user terminal 8 obtains a token from the information notification medium 7.

step 102) The portable user terminal 8 sends the obtained token to the linkup server 9 via a predetermined network.

step 103) The linkup server 9 determines one or more content identifier corresponding to the received token by referring to the token table database 5.

step 104) The linkup server 9 obtains each content information corresponding to one or more content identifier from the content information database 4.

step 105) The linkup server 9 accesses the content server 3 by using the resource location included in the content information.

step 106) The linkup server 9 obtains the content from the content server 3.

step 107) The linkup server 9 sends the content information and the content to the portable user terminal 8.

step 108) The portable user terminal 8 presents the content by using a method specified by the presentation control information included in the content information.

The presentation control information may includes a display position of the content in a display part, a display size, a display orientation, a display term, a display timing and the like. The presentation control information may include information which can be set for content presentation control in SMIL(Synchronized Multimedia Integration Language), and may be described as a subset of SMIL, in which the SMIL is a language for controlling synchronization display of Web content and for generating presentation of combination of Web content. The portable user terminal 8 presents content obtained by a corresponding token by using various presentation format.

The presentation control information may include presenting order of contents. The portable user terminal 8 presents contents in the order determined by using information on presentation order of contents included in the presentation control information. As a concrete example, the information of the order may be presentation priority values 0-255 of 256 stages, and the contents are presented in descending order of the priority.

In addition, the presentation control information may include a keyword indicating corresponding content or a genre identifier. The portable user terminal 8 determines presentation order of the contents, and determines whether it presents the content by using the keyword or the genre identifier on the corresponding content included in the presentation control information.

For example, the portable user terminal provides a means for setting a genre in which the user is interested. When the user sets an interested keyword or genre beforehand by using the means, and when the portable user terminal 8 obtains a plurality of contents, the portable user terminal 8 compares the keyword or genre identifier included in the presentation control information of the content information with the interested keyword or genre which has been set by the user. When they are the same, presentation priority of the corresponding content is raised so that the content is presented earlier than other content. If they are different, the corresponding content is not presented.

In the above-mentioned example, the user sets the interested keyword and the genre beforehand. Instead of this, it can be considered that the portable user terminal 8 may accumulate keywords included in the content information of content which the user has viewed so far, and selects a top predetermined number of keywords of high-incidence, and uses the selected keywords as the interested keywords.

[Modification 1 of the Third Embodiment]

In the modification 1 of the third embodiment, a case where the portable user terminal performs a process for obtaining content from the content server. The system configuration of this embodiment is the same as that shown in FIG. 21.

Figure 23:
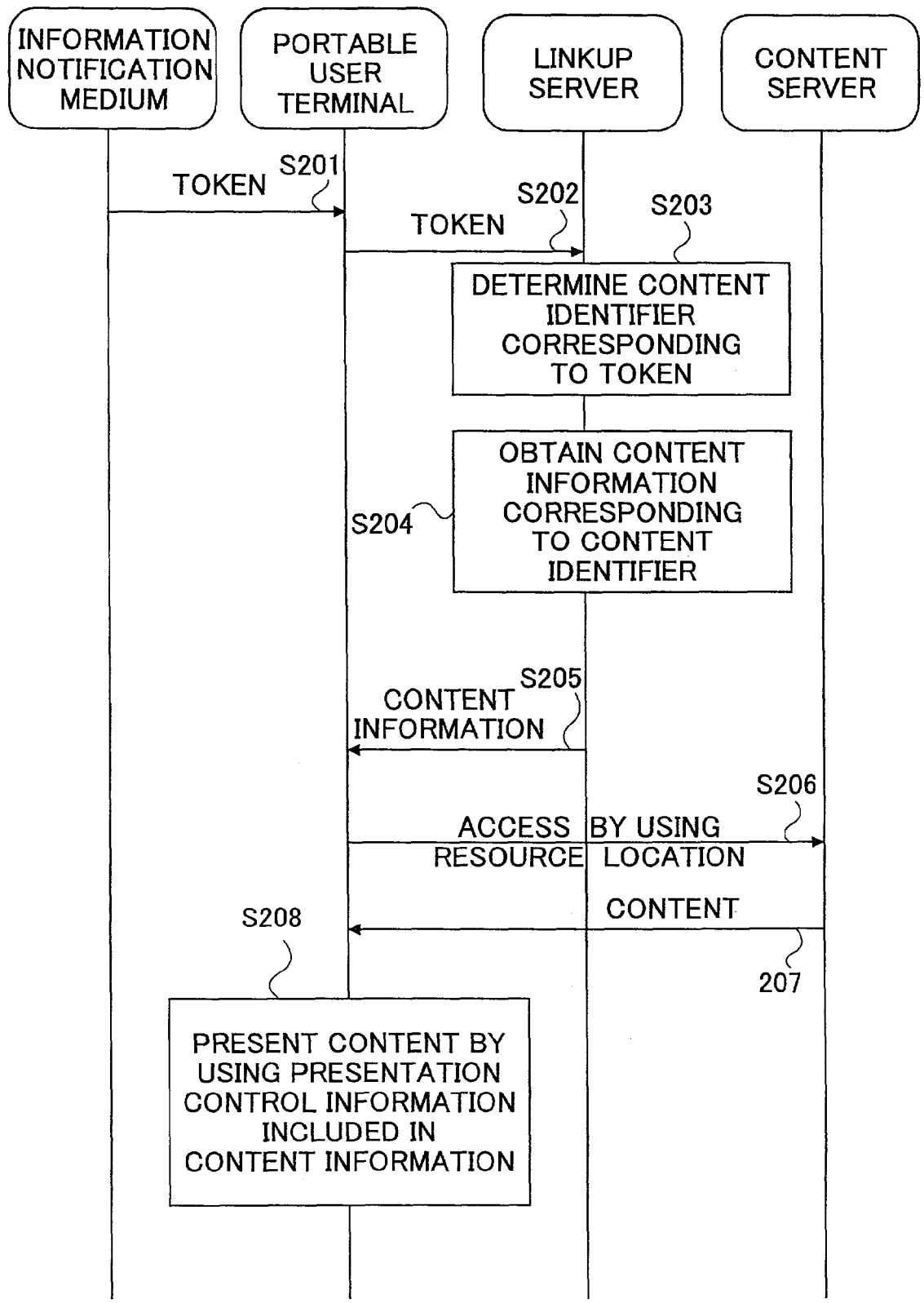
FIG. 23 is a sequence chart showing the operation of a modification 1 of the content providing system in the third embodiment of the present invention.

FIG. 23 is a sequence chart showing the operation of the content providing system in this embodiment of the present invention.

step 201) The portable user terminal 8 obtains a token from the information notification medium 7.

step 202) The portable user terminal 8 sends the obtained token to the linkup server 9 via a predetermined network.

step 203) The linkup server 9 determines one or more content identifier corresponding to the received token by referring to the token table database 5.

step 204) The linkup server 9 obtains each content information corresponding to one or more content identifier from the content information database 4.

step 205) The linkup server 9 sends the content information to the portable user terminal 8.

step 206) The portable user terminal 8 accesses the content server 3 by using the resource location included in the content information.

step 207) The portable user terminal 8 obtains the content from the content server 3.

step 208) The portable user terminal 8 presents the content by using a method specified by the presentation control information included in the content information obtained in step 205.

The portable control information of this embodiment includes the same information described in the third embodiment.

The process for obtaining content is performed by the linkup server 9 in the third embodiment, and the process is performed by the portable user terminal 8 in the modification 1. These are selected according to methods of implementation and the service.

[Modification 2 of the Third Embodiment]

As a business in the content providing system described in the third embodiment and the modification 1 of the third embodiment, a service of add an advertisement to providing related information can be considered.

For example, when a picture of a fine play in a yesterday's baseball game is contained in the sports section of a newspaper, a token is added to the picture, and video of the fine play can be viewed by using the token. At this time, by inserting a commercial in the last image of the scene, the video can be provided to the user at no charge, and advertisement rates can be obtained from the sponsor of the commercial.

In this embodiment, a business model in the content providing system of the third embodiment is considered.

Figure 24:
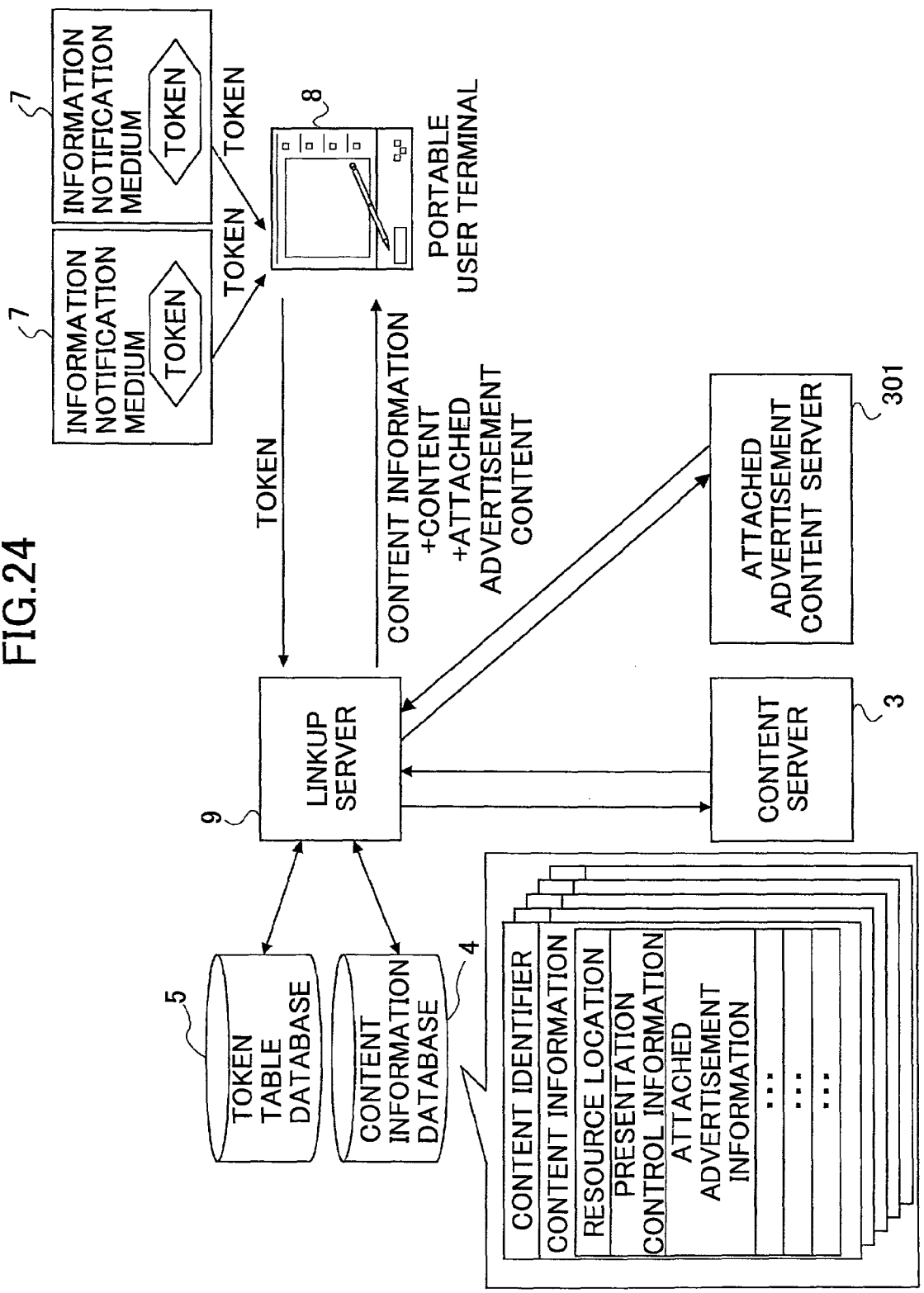
FIG. 24 is a block diagram of the content providing system of a modification 2 of the third embodiment.

FIG. 24 is a block diagram of the content providing system in the modification 2 of the third embodiment. In the figure, the same numeral is assigned to the same part as that in FIG. 21.

The system shown in FIG. 24 is configured such that an attached advertisement content server 301 is added to the system shown in FIG. 21.

In this embodiment, when the linkup server 9 accesses the attached advertisement content server 301, it uses attached advertisement information included in the content information.

Figure 25:
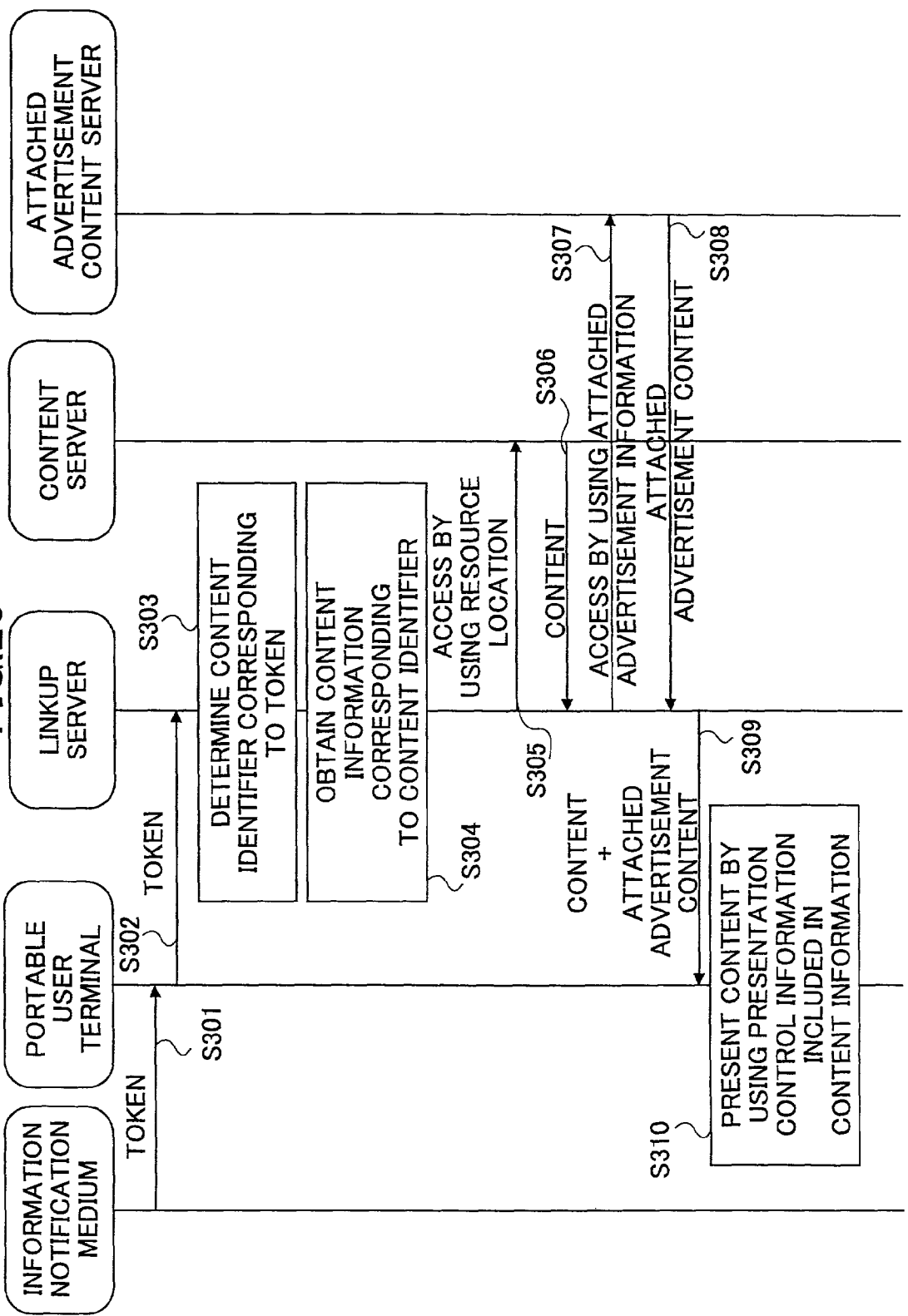
FIG. 25 is a sequence chart showing the operation of a modification 2 of the content providing system in the third embodiment of the present invention.

FIG. 25 is a sequence chart showing the operation of the content providing system in the modification 2 of the third embodiment of the present invention.

step 301) The portable user terminal 8 obtains a token from the information notification medium 7.

step 302) The portable user terminal 8 sends the obtained token to the linkup server 9 via a predetermined network.

step 303) The linkup server 9 determines one or more content identifier corresponding to the received token by referring to the token table database 5.

step 304) The linkup server 9 obtains each content information corresponding to one or more content identifier from the content information database 4.

step 305) The linkup server 9 accesses the content server 3 by using the resource location included in the content information.

step 306) The linkup server 9 obtains the content from the content server 3.

step 307) The linkup server 9 accesses the attached advertisement content server 301 by using the attached advertisement information included in the content information.

step 308) The linkup server 9 obtains attached advertisement content from the attached advertisement content server 301.

step 309) The linkup server 9 sends the content information, the content and the attached advertisement content to the portable user terminal 8.

step 310) The portable user terminal 8 presents the content and the attached advertisement content by using a method specified by the presentation control information included in the content information.

The presentation control information may includes a display position of the content in a display part, a display size, a display orientation, a display term, a display timing and the like. The presentation control information may include information which can be set for content presentation control in SMIL(Synchronized Multimedia Integration Language), and may be described as a subset of SMIL, in which the SMIL is a language for controlling synchronization display of Web content and for generating presentation of combination of Web contents. The portable user terminal 8 presents content obtained by a corresponding token by using various presentation format.

As a general example, the portable user terminal operates such that it displays the attached advertisement content after playback of video is completed when the content is video.

The presentation control information may include presenting order of contents. The portable user terminal 8 presents contents in the order determined by using information on presentation order of contents included in the presentation control information. As a concrete example, the information of the order may be presentation priority values 0-255 of 256 stages, and the contents are presented in descending order of the priority.

In addition, the presentation control information may include a keyword indicating corresponding content or a genre identifier. The portable user terminal 8 determines presentation order of the contents and the attached advertisement contents, and determines whether it presents the content and the attached advertisement content by using the keyword or the genre identifier on the corresponding content included in the presentation control information.

For example, the portable user terminal provides a means for setting a genre in which the user is interested. When the user sets an interested keyword or genre beforehand by using the means, and when the portable user terminal 8 obtains a plurality of contents and the attached advertisement contents, the portable user terminal 8 compares the keyword or genre identifier included in the presentation control information of the content information obtained at the same time with the interested keyword or genre which has been et by the user. When they are the same, presentation priority of the corresponding content is raised so that the content is presented earlier than other content. If they are different, the corresponding content is not presented.

In the above-mentioned example, the user sets the interested keyword and the genre beforehand. Instead of this, it can be considered that the portable user terminal 8 may accumulate keywords included in the content information of content which the user has viewed so far, and selects a top predetermined number of keywords of high-incidence, and uses the selected keywords as the interested keywords.

[Modification 3 of the Third Embodiment]

In the modification 2 of the third embodiment, an example was described in which the linkup server 9 obtains content from the content server and obtains the attached advertisement content from the attached advertisement content server 301. In the modification 3 of the third embodiment, a case where the portable user terminal performs a process for obtaining the content and the attached advertisement content. The system configuration of this embodiment, content information and presentation control information are the same as that shown in the third embodiment.

Figure 26:
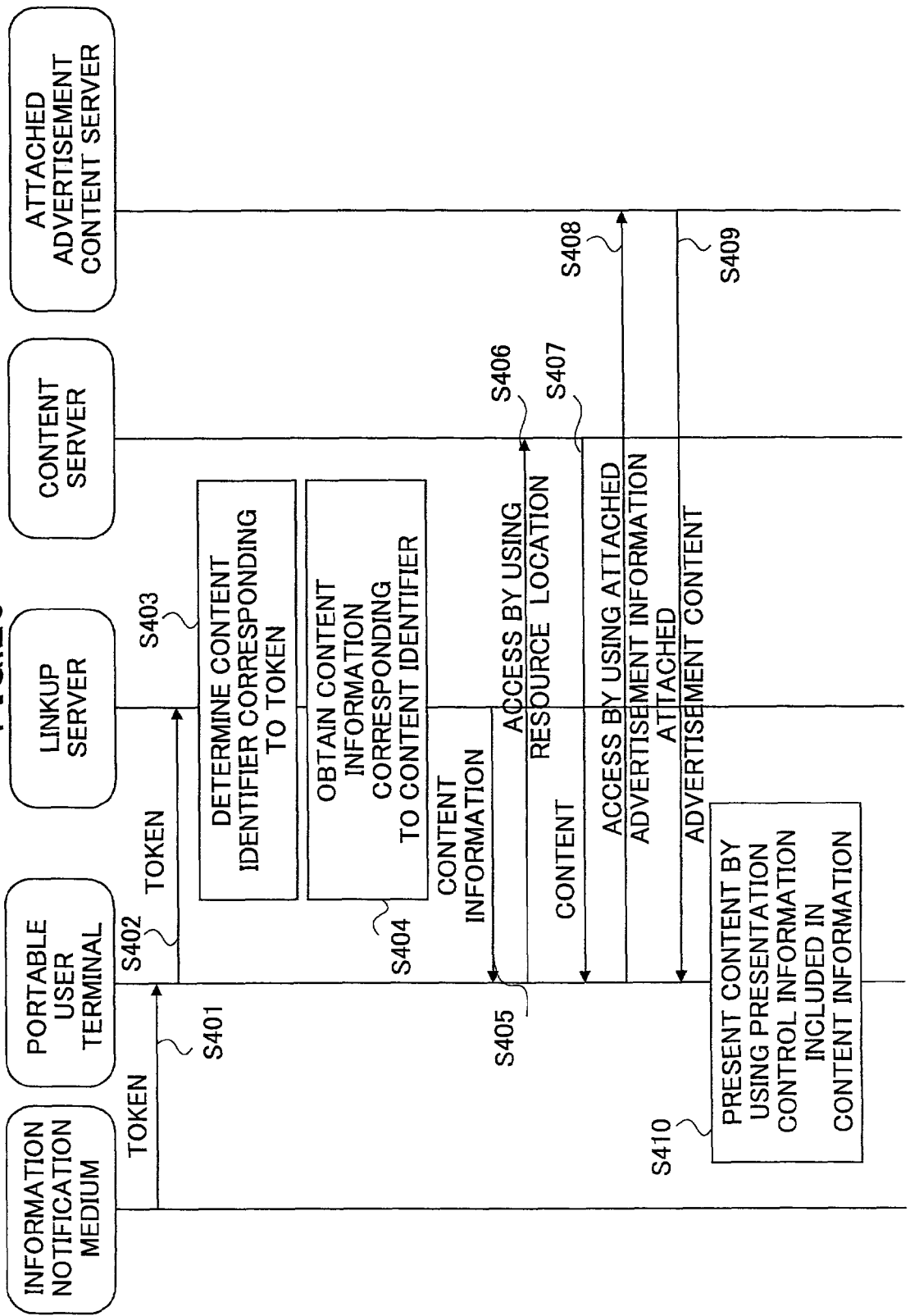
FIG. 26 is a sequence chart showing the operation of a modification 3 of the content providing system in the third embodiment of the present invention.

FIG. 26 is a sequence chart showing the operation of the content providing system in the modification 3 of the third embodiment of the present invention.

step 401) The portable user terminal 8 obtains a token from the information notification medium 7.

step 402) The portable user terminal 8 sends the obtained token to the linkup server 9 via a predetermined network.

step 403) The linkup server 9 determines one or more content identifier corresponding to the received token by referring to the token table database 5.

step 404) The linkup server 9 obtains each content information corresponding to one or more content identifier from the content information database 4.

step 405) The linkup server 9 sends the content information to the portable user terminal 8.

step 406) The portable user terminal 8 accesses the content server 3 by using the resource location included in the content information.

step 407) The portable user terminal 8 obtains the content from the content server 3.

step 408) The portable user terminal 8 accesses the attached advertisement content server 301 by using the attached advertisement information included in the content information.

step 409) The portable user terminal 8 obtains attached advertisement content from the attached advertisement content server 301.

step 410) The portable user terminal 8 presents the content and the attached advertisement content by using a method specified by the presentation control information included in the content information.

The modification 2 and the modification 3 of the third embodiment can be selected according to methods of implementation and services.

In the following, examples of the content providing system will be described with reference to figures.

EXAMPLE 3-1

The information notification medium 7 on which originating information related to the content is printed, described or displayed includes a newspaper, a magazine, a book, a strap advertisement, a handbill, a poster on the street, other printed matters, a bulletin board, a postcard, a printout of material, a map, Tv/radio programs, a photograph, a picture, a signboard and the like, or a push media display which originates advertisement information by using a liquid crystal display placed in a train and the like.

In the content providing system of the present invention, the token is provided to the information notification mediums. The user can obtain content related to the information notification medium via the predetermined network by obtaining the token by the portable user terminal 8.

The predetermined network is the Internet for example.

The token 11 which can be used may be barcode information or character/numeric string information which is printed, described or displayed on the information notification medium 7, watermark information embedded in the image, signal information stored in an electromagnetic recording medium or an IC chip in the information notification medium 7. A token obtaining part for obtaining the token 11 is provided in the portable user terminal 8.

Figure 27:
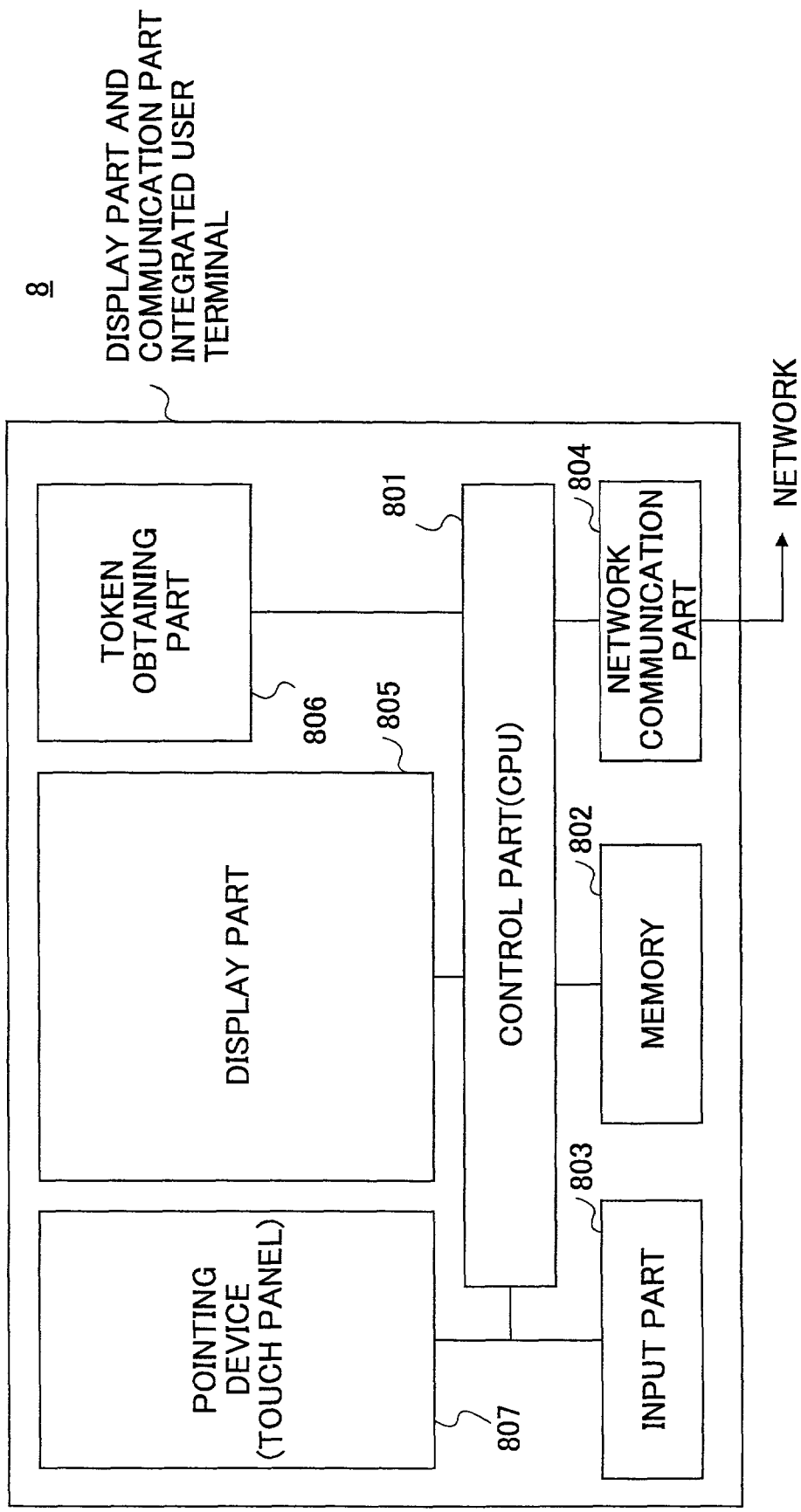
FIG. 27 is a block diagram (first example) of the portable user terminal of the embodiment 3-1 of the present invention.

FIG. 27 is a block diagram (first example) of the portable user terminal of the embodiment 3-1 of the present invention.

As shown in the figure, the portable user terminal includes a control part 802 which is a CPU, in input part 803, a network communication part 804, a display part 805, and a token obtaining part 806. In addition, a pointing device 807 may be provided.

The portable user terminal 8 shown in the figure is a terminal in which the display part and the communication part are integrated. It corresponds to a terminal such as PDA except that it includes the token obtaining part 806.

The input part 803 is buttons or a small keyboard of PDA, and the pointing device 807 can use a touch panel.

The display part 805 uses a liquid crystal display or organic EL display.

Accordingly, the portable user terminal can be formed as a thin shape and can be brought into intimate contact with the information notification medium 7 on which the originating information on the content is printed, described or displayed.

Figure 28:
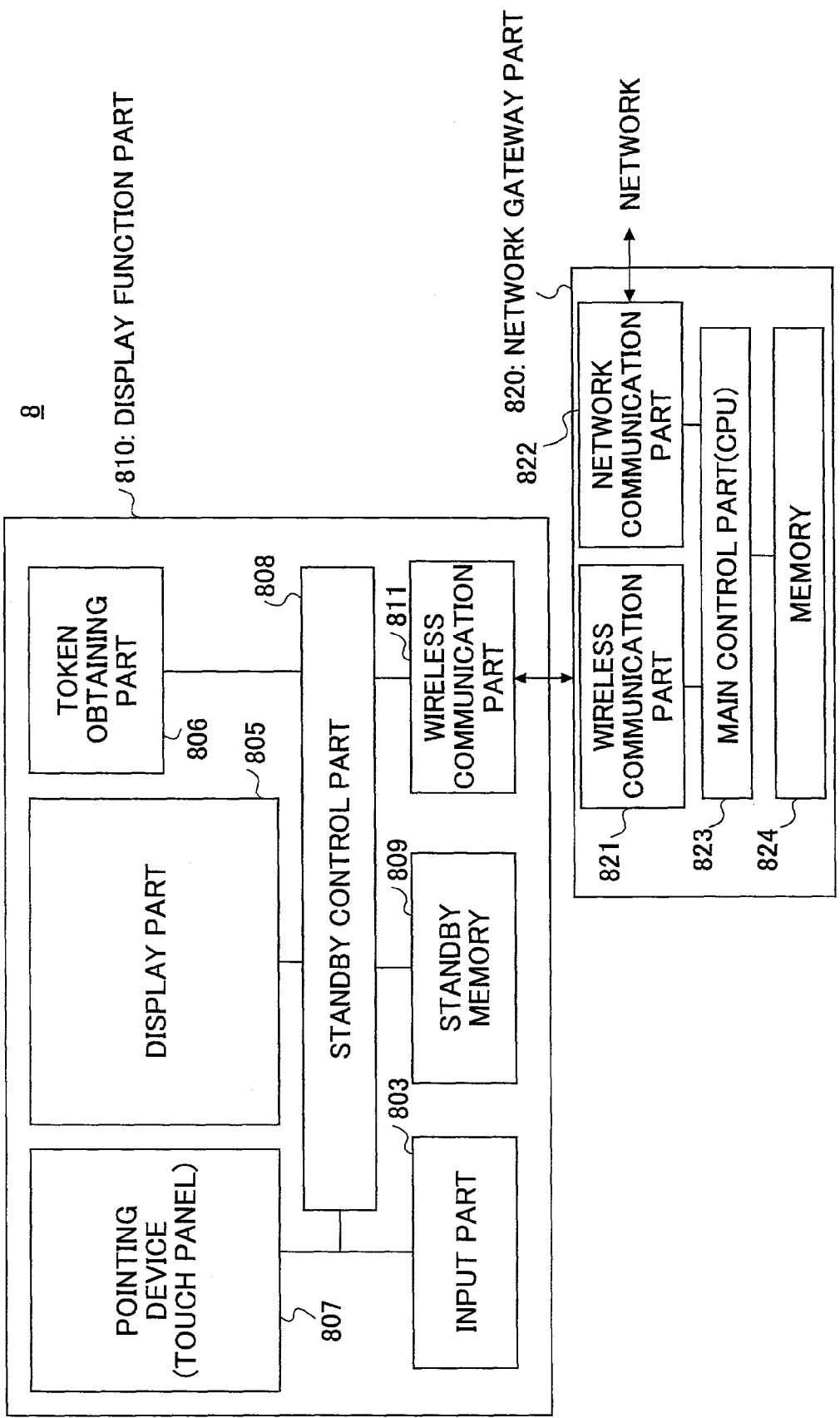
FIG. 28 is a block diagram (second example) of the portable user terminal of the embodiment 3-1 of the present invention.

FIG. 28 is a block diagram (second example) of the portable user terminal of the embodiment 3-1 of the present invention.

The portable user terminal 8 shown in the figure is configured such that a display function part 810 and a network gateway part 820 are separated, in which the display function part 810 includes the token obtaining part 806, a display part and a voice transmitting part, and the network gateway part 820 includes the network communication part 821. The display function part 810 and the network gateway part 820 communicate with each other by using wireless communication parts 811 and 821.

In addition, a permeable display can be used as a display part in the portable user terminal 8. More concretely, when using a liquid crystal display device, it is implemented by removing the backlight part. When using the permeable display part, content which is presented on this display part may be used by superimposing the originating information which is printed, described or displayed on the information notification medium 7. For example, when a crossword puzzle is printed on a paper, the terminal displays the answer by superimposing on the puzzle.

Next, an example of using the portable user terminal 8 will be described.

Figure 29:
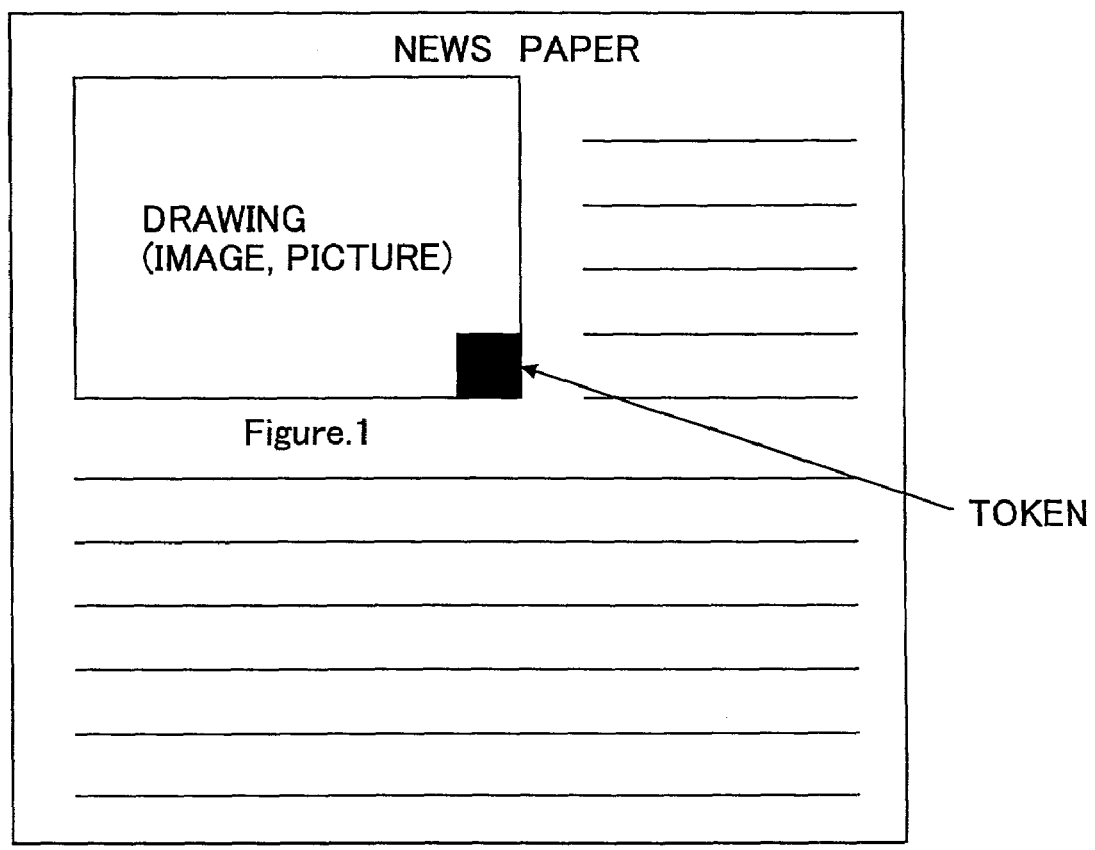
FIG. 29 is an example of a newspaper to which the token is added of an example 3-1 of the present invention.

FIG. 29 is an example of a newspaper of an embodiment of the present invention.

On the space of the newspaper, a drawing is printed. In addition, a token is provided at a predetermined position in the drawing . In this example, the newspaper is taken as an example. However, this invention can be applied to a newspaper, a magazine, a book, a strap advertisement, a handbill, a poster on the street, other printed matters, a bulletin board, a postcard, a printout of material, a map, Tv/radio programs, a photograph, a picture, a signboard and the like, or a push media display which originates advertisement information by using a liquid crystal display placed in a train and the like, which are examples of the information notification medium 7.

The token 11 which can be used may be barcode information or character/numeric string information which is printed, described or displayed on the information notification medium 7, watermark information embedded in the image, signal information stored in an electromagnetic recording medium or an IC chip in the information notification medium 7. In the example shown in FIG. 29, it is assumed that a thing like a barcode is used. The method for providing the token 11 varies according to the kind of token. In addition, the token 11 may be provided for each news story, or may be provided for each space.

Figure 30:
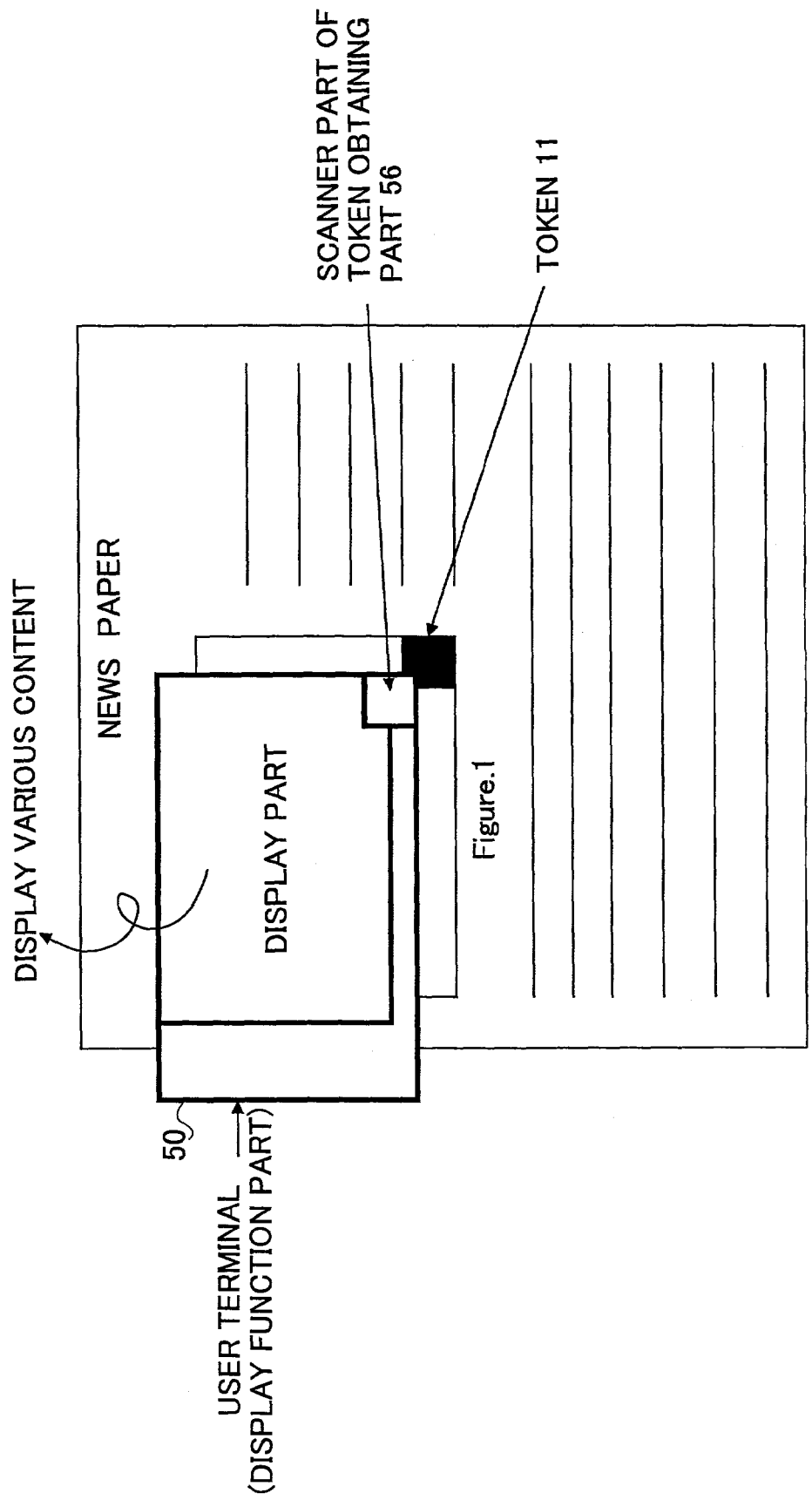
FIG. 30 is a figure for explaining an operation of the portable user terminal of the example 3-1 of the present invention.

The portable user terminal 8 is used for obtaining information on the drawing on the newspaper space shown in FIG. 29. The portable user terminal 8 is thin as shown in FIG. 30, and can be used by contacting with the drawing which is the subject from which the related information is obtained. In the examples shown in FIGS. 29 and 30, the token 11 is provided in the lower right corner of the drawing. In addition, as shown in FIG. 30, the token obtaining part 806 of the portable user terminal 8 is also placed in the lower right of the portable user terminal 8. Accordingly, by contacting the display part 805 of the portable user terminal 8 on the newspaper such that the display part 805 is overlaid on the drawing, the token is placed just below the scanner part of the token obtaining part 806. At this time, the token obtaining part 806 performs a process for obtaining the token automatically or when triggered by operation of the input part 803 (button) by the user.

The operation for obtaining the token is the same as that described before. As a result, the portable user terminal 8 can obtain various contents on the drawing, and the contents are displayed on the display part 805.

EXAMPLE 3-2

Next, a case in which video and voice associated with a printed matter is provided. Especially, video and voice in a live and other information are provided.

In this case, the content server includes a part for distributing video content and voice content, a part for relaying and distributing live video and live voice, and a part for providing video/voice content by associating with the information notification medium 7.

For example, when applying the third embodiment, the content server 3 has a function of obtaining and distributing live video input from a camera placed on a road, the portable user terminal 8 obtains a token provided at a predetermined position on a road map printed at a space, sends the obtained token to the linkup server 9 via a predetermined network. The linkup server 9 determines one or more content identifier corresponding to the received token by referring to the token table database 5. The linkup server 9 obtains each content information corresponding to one or more content identifier from the content information database 4, accesses the content server 3 by using the resource location included in the content information, obtains the content from the content server 3, and sends the content information and the content to the portable user terminal 8.

The portable user terminal 8 presents the live video at the predetermined position obtained as the content by using a method specified by the presentation control information included in the content information.

When applying the modification 1 of the third embodiment, the portable user terminal 8 obtains a token provided at a predetermined position on a road map printed on a space, sends the obtained token to the linkup server 9 via a predetermined network. The linkup server 9 determines one or more content identifier corresponding to the received token by referring to the token table database 5. The linkup server 9 obtains each content information corresponding to one or more content identifier from the content information database 4, sends the content information to the portable user terminal 8. The portable user terminal 8 accesses the content server 3 by using the resource location included in the content information, obtains the content from the content server 3.

The portable user terminal 8 presents the live video at the predetermined position obtained as the content by using a method specified by the presentation control information included in the content information.

The presentation control information includes playback start position information of the video/voice content, playback player control information for controlling a playback player information. For example, by using the playback start position information included in the presentation control information, the portable user terminal 8 can specify and playback a specific fine play scene in baseball game video content including a game from start to end of the game.

EXAMPLE 3-3

When receiving the content transmitting request, the content server 3 may provide state information of real world, weather information, weather forecast information, stock price information, game progress information, traffic information, reservation state information, sales state information, price information and the like, which are newest. The content obtained by the portable user terminal 8 is live video content which is state information of real world, weather information, weather forecast information, stock price information, game progress information, traffic information, reservation state information, sales state information, price information and the like, which are newest.

For example, when applying the third embodiment, the portable user terminal 8 obtains a token provided at a predetermined position on a road map printed on a space, sends the obtained token to the linkup server 9 via a predetermined network. The linkup server 9 determines one or more content identifier corresponding to the received token by referring to the token table database 5. The linkup server 9 obtains each content information corresponding to one or more content identifier from the content information database 4, accesses the content server 3 by using the resource location included in the content information, obtains the content from the content server 3, and sends the content information and the content to the portable user terminal 8.

The portable user terminal 8 presents the weather forecast and the like obtained as the content by using a method specified by the presentation control information included in the content information.

When applying the modification 1 of the third embodiment, the portable user terminal 8 obtains a token provided at a predetermined position on a road map printed on a space, sends the obtained token to the linkup server 9 via a predetermined network. The linkup server 9 determines one or more content identifier corresponding to the received token by referring to the token table database 5. The linkup server 9 obtains each content information corresponding to one or more content identifier from the content information database 4, sends the content information to the portable user terminal 8. The portable user terminal 8 accesses the content server 3 by using the resource location included in the content information, obtains the content from the content server 3.

The portable user terminal 8 presents the weather forecast and the like obtained as the content by using a method specified by the presentation control information included in the content information.

EXAMPLE 3-4

Next, a case in which the originating information printed, described or displayed on the information notification medium 7 includes a text, the text is translated into different language and the translated text is provided.

It is assumed that the content server 3 has a part for translates a text to different language.

The content obtained by the portable user terminal 8 is information to which a text included in the originating information printed, described or displayed on the information notification medium 7 is translated.

When applying the third embodiment, the portable user terminal 8 obtains a token provided at an English article printed on a space, sends the obtained token to the linkup server 9 via a predetermined network. The linkup server 9 determines one or more content identifier corresponding to the received token by referring to the token table database 5. The linkup server 9 obtains each content information corresponding to one or more content identifier from the content information database 4, accesses the content server 3 by using the resource location included in the content information, obtains the content from the content server 3, and sends the content information and the content to the portable user terminal 8.

The portable user terminal 8 presents the information translated to Japanese from the English article obtained as the content by using a method specified by the presentation control information included in the content information.

When applying the modification 1 of the third embodiment, the portable user terminal 8 obtains a token provided at an English article printed on a space, sends the obtained token to the linkup server 9 via a predetermined network. The linkup server 9 determines one or more content identifier corresponding to the received token by referring to the token table database 5. The linkup server 9 obtains each content information corresponding to one or more content identifier from the content information database 4, sends the content information to the portable user terminal 8. The portable user terminal 8 accesses the content server 3 by using the resource location included in the content information, obtains the content from the content server 3.

The portable user terminal 8 presents the information translated to Japanese from the English article obtained as the content by using a method specified by the presentation control information included in the content information.

EXAMPLE 3-5

Next, a case in which the content server provides voice content will be described. It is assumed that the content server 3 has a part for converting a text into voice and providing it as voice content when the originating information printed, described or displayed on the information notification medium 7 includes a text. The content obtained by the portable user terminal 8 is voice content to which a text included in the originating information printed, described or displayed on the information notification medium 7 is converted into voice.

When applying the third embodiment, the portable user terminal 8 obtains a token provided at a text article printed on a space, sends the obtained token to the linkup server 9 via a predetermined network. The linkup server 9 determines one or more content identifier corresponding to the received token by referring to the token table database 5. The linkup server 9 obtains each content information corresponding to one or more content identifier from the content information database 4, accesses the content server 3 by using the resource location included in the content information, obtains the content from the content server 3, and sends the content information and the content to the portable user terminal 8.

The portable user terminal 8 presents the voice content, by the voice origination part, converted from the text article obtained as the content by using a method specified by the presentation control information included in the content information.

When applying the modification 1 of the third embodiment, the portable user terminal 8 obtains a token provided at a text article printed on a space, sends the obtained token to the linkup server 9 via a predetermined network. The linkup server 9 determines one or more content identifier corresponding to the received token by referring to the token table database 5. The linkup server 9 obtains each content information corresponding to one or more content identifier from the content information database 4, sends the content information to the portable user terminal 8. The portable user terminal 8 accesses the content server 3 by using the resource location included in the content information, obtains the content from the content server 3.

The portable user terminal 8 presents the voice content, by the voice origination part, converted from the text article obtained as the content by using a method specified by the presentation control information included in the content information.

EXAMPLE 3-6

Next, a case where content obtained by the portable user terminal 8 from the content server 3 includes a plurality of selection means.

The content obtained by the portable user terminal 8 from the content server 3 includes a plurality of selection means, and when the user performs operation of the selection means, the portable user terminal 8 obtains new content, or, the content server 3 performs a predetermined process related to the selection means.

For example, in a quiz or an application article provided on a space of a newspaper, the portable user terminal 8 of the content providing system can perform answering process of the quiz or applying process.

When it is assumed that quiz information of answer selection type is printed on a space of a magazine and the like, when applying the third embodiment, the portable user terminal 8 obtains a token provided at a quiz information section printed on the space by overlaying the portable user terminal 8 on the quiz information section, sends the obtained token to the linkup server 9 via a predetermined network. The linkup server 9 determines one or more content identifier corresponding to the received token by referring to the token table database 5. The linkup server 9 obtains each content information corresponding to one or more content identifier from the content information database 4, accesses the content server 3 by using the resource location included in the content information, obtains the content from the content server 3, and sends the content information and the content to the portable user terminal 8. As a result, the content obtained by the portable user terminal 8 includes means for selecting an answer of the quiz information on the space. When the user selects an answer by using the selection means, the user can obtain content including information that the answer is wrong or correct. In addition, when the user selected the correct answer, for example, the linkup server 9 registers information of the user in a list of names for sending a prize for correct answer of the quiz. These processes can be realized by a technology such as CGI and the like.

When applying the modification 1 of the third embodiment, the portable user terminal 8 obtains a token provided at a quiz information section, sends the obtained token to the linkup server 9 via a predetermined network. The linkup server 9 determines one or more content identifier corresponding to the received token by referring to the token table database 5. The linkup server 9 obtains each content information corresponding to one or more content identifier from the content information database 4, sends the content information to the portable user terminal 8. The portable user terminal 8 accesses the content server 3 by using the resource location included in the content information, obtains the content from the content server 3. The content obtained by the portable user terminal 8 includes means for selecting an answer of the quiz information on the space. When the user selects an answer by using the selection means, the user can obtain content including information that the answer is wrong or correct. In addition, when the user selected the correct answer, for example, the linkup server 9 registers information of the user in a list of names for sending a prize for correct answer of the quiz. These processes can be realized by a technology such as CGI and the like.

In the above-mentioned example, the content including the selection means obtained by the portable user terminal 8 may be used by being overlaid on the quiz information section on the space. For example, when there are two answer selection spaces in the quiz information section, the selection means is presented on each answer selection space. Correspondence between the answer selection space and the answer can be judged by information printed on the paper.

EXAMPLE 3-7

Next, a case in which the content server 3 includes means for providing a program, and the content obtained by the portable user terminal 8 are a program, and the portable user terminal executes the obtained program will be described.

When applying the third embodiment, the portable user terminal 8 obtains a token provided at an article printed on a space, sends the obtained token to the linkup server 9 via a predetermined network. The linkup server 9 determines one or more content identifier corresponding to the received token by referring to the token table database 5. The linkup server 9 obtains each content information corresponding to one or more content identifier from the content information database 4, accesses the content server 3 by using the resource location included in the content information, obtains the content from the content server 3, and sends the content information and the content to the portable user terminal 8.

The content obtained by the portable user terminal 8 is a program such as JavaApplet and the like for example, and the portable user terminal 8 executes the program.

When applying the modification 1 of the third embodiment, the portable user terminal 8 obtains a token provided at an article printed on a space, sends the obtained token to the linkup server 9 via a predetermined network. The linkup server 9 determines one or more content identifier corresponding to the received token by referring to the token table database 5. The linkup server 9 obtains each content information corresponding to one or more content identifier from the content information database 4, sends the content information to the portable user terminal 8. The portable user terminal 8 accesses the content server 3 by using the resource location included in the content information, obtains the content from the content server 3.

The content obtained by the portable user terminal 8 is a program such as JavaApplet and the like for example, and the portable user terminal 8 executes the program.

In the example 3-7, an application called Coaster described in Sato, Akutsu, Tonomura "Coaster: time and space media interface by line slider", IPSJ, 98-HI-79-7, Vol.98,No.75, pp.37-42,1998, can be used as the JavaApplet program provided by the content server 3. Coaster is an interface for operating video image spatially. By overlaying Coaster on drawings or pictures on the paper, information providing operation environment can be realized just like changing the drawing or the picture on the paper by operating them. In addition, by providing a program for enlarging the displayed drawing, the portable user terminal 8 may enlarge map information and the like printed on a paper.

EXAMPLE 3-8

In the above example, the portable user terminal 8 obtains some contents instead of sending a token to the linkup server 9. In the following example, the portable user terminal 8 does not obtain content instead of sending a token to the linkup server 9.

For example, when the portable user terminal 8 performs an obtaining process of a token in a TV program section in a magazine, the linkup server performs reserving process for recording the program which is selected.

The system of this example includes, one or more content servers for providing the content via the network, a content information database 4 for managing content information for each content identifier which is uniquely set for each content, and a token table management database 5 for managing a token table including information on relationship between the token which is information which can specify content and the content identifier, the portable user terminal 8 for obtaining and sending a token, and obtaining and using content, and a linkup server 9 for sending content information to the portable user terminal 8 on the basis of the token received from the portable user terminal 8.

The portable user terminal 8 obtains a token from the information notification medium on which the originating information is printed, described or displayed, sends the obtained token to the linkup server 9 via a predetermined network. The linkup server 9 determines one or more content identifier corresponding to the received token by referring to the token table database 5. The linkup server 9 obtains each content information corresponding to one or more content identifier from the content information database 4, accesses the content server 3 by using the resource location included in the content information, obtains a program from the content server 3, and executes the program.

For example, the information notification medium 7 is a magazine, and the token is obtained by putting the portable user terminal 8 on a predetermined position of the TV program section. Then, above-mentioned process is performed, and the linkup server 9 performs the process for program reservation by using the program obtained from the content server 3.

EXAMPLE 3-9

In this example, as described by using FIG. 27, the portable user terminal includes a display part 805, a token obtaining part 806, a voice origination part and a network communication part 804. The display part 805 uses a liquid crystal display or organic EL display. Accordingly, the portable user terminal can be formed as a thin shape and can be brought into intimate contact with the information notification medium 7 on which the originating information on the content is printed, described or displayed. As described by using FIG. 27, the portable user terminal includes a control part 801, a memory 802, an input part 803, a network communication part 804, a display part 805, and a token obtaining part 806. In addition, a pointing device 807 may be provided.

The portable user terminal 8 shown in the figure is a terminal in which the display part and the communication part are integrated. It corresponds to a terminal such as PDA except that it includes the token obtaining part 806.

The input part 803 is buttons or a small keyboard of PDA, and the pointing device 807 can use a touch panel.

EXAMPLE 3-10

In this example, a case where the content information includes terminal environment information will be described.

When applying the third embodiment, the portable user terminal 8 obtains a token from the information notification medium 7, sends the obtained token and the terminal environment information to the linkup server 9 via a predetermined network. The linkup server 9 determines one or more content identifier corresponding to the received token by referring to the token table database 5. The linkup server 9 obtains each content information corresponding to one or more content identifier from the content information database 4, accesses the content server 3 by using the resource location included in the content information, obtains the content from the content server 3, converts the content by using the presentation control information included on the content information and the terminal environment information, and sends the content information and the converted content to the portable user terminal 8.

The portable user terminal 8 presents the content by using a method specified by the presentation control information included in the content information.

When applying the modification 1 of the third embodiment, the portable user terminal 8 obtains a token provided at a text article printed on a space, sends the obtained token to the linkup server 9 via a predetermined network. The linkup server 9 determines one or more content identifier corresponding to the received token by referring to the token table database 5. The linkup server 9 obtains each content information corresponding to one or more content identifier from the content information database 4, sends the content information to the portable user terminal 8. The portable user terminal 8 accesses the content server 3 by using the resource location included in the content information, obtains the content from the content server 3, converts the content by using the presentation control information included on the content information and the terminal environment information, and presents the content by using a method specified by the presentation control information included in the content information.

The terminal environment information includes relationship between position of information related to content printed, described or displayed on the information notification medium, and position of display means of the terminal. More concretely, the token provided in a printed matter is information of which up, down, left and right can be identified. The portable user terminal 8 may analyze images scanned from the token obtaining part, calculate attitude of the terminal with respect to the token, and obtain relationship between position of information related to displayed content and position of the display means. A method disclosed in Jun Rekimoto and Katashi Nagano, "The world through computer", Proceedings of the ACN Symposium on User Interface Software and Technology (UIST '95), pp.29-36, ACM Press, November 1995can be used as a method for obtaining position relationship between the token and the terminal by using a two dimensional barcode as the token.

In addition, the conversion performed on content by using the presentation control information and the terminal environment information is geometrical conversion for adjusting position relationship between the image of information related to the content printed, described or displayed on the information notification medium 7 and the image of content displayed on the display part 805 of the terminal 8 used by being overlaid on the information of the image. The geometrical conversion includes rotation, movement, enlargement of the part of the image.

In addition, the portable user terminal 8 may further converts the content and presents the content according to an operation by the user. For example, map information printed on a space is further enlarged by using the portable user terminal 8.

By providing these functions, when using the portable user terminal by overlaying it on originating information printed, described or displayed on the information notification medium, presentation of information closely related to information on a printed matter can be realized.

The processes of the portable user terminal, the linkup server, the content server, the attached advertisement content server can be realized by programs.

The present invention can be easily realized by installing the programs in computers used as the portable user terminal, the linkup server, the content server, the attached advertisement content server. Or, the programs may be stored in a transportable recording medium such as a floppy disk, CD-ROM and the like, and can be installed to the computers.

As mentioned above, according to this embodiment, in a case where a plurality of items of information are identified by an identifier (a token) such as a barcode, by including the presentation control information in the content information and by utilizing the presentation control information, how the plurality of items of information are presented to the user can be determined.

In addition, content to be presented can be selected on the basis of desired genre setting by the user in the portable user terminal.

In addition, the content server of the present invention includes a part for distributing video content and voice content, and a part for relaying and distributing live video and live voice. Therefore, video and voice, especially live video and voice and other information related to the printed matter can be provided. In addition, the content server includes a part for providing state information of real world, weather information, weather forecast information, stock price information, game progress information, traffic information, reservation state information, sales state information, price information and the like, which are newest at the time when receiving content transmission request. Accordingly, for example, by selecting a predetermined position on a road map printed on a space, video and voice or weather information indicating current state at the position can be obtained.

In addition, since the presentation control, information includes playback start position information of video, voice content, or playback player control information for control the playback player means, a mechanism for presenting the content from a predetermined position in the video and voice can be provided. In addition, a scene such a specific fine play can be presented by specifying an address and the playback start position of the video content.

In addition, a printed article can be translated and presented, the user can answer for a quiz in an article and obtain the result, necessary settings can be established in the server in the network by providing a program related to an article or by selecting an article.

In addition, according to the conventional system, there is a problem of liaison between the printed matter and a medium such as the PC for referring to the related information. On the other hand, according to the present invention, the portable user terminal is configured such that it is used by bringing it into intimate contact with a subject printed matter, so that an information presentation method in which the portable user terminal operates in close liaison with the information on the printed matter. Therefore, the portable user terminal includes a display part, a token obtaining part, a voice origination part and a network communication part. The display part uses a liquid crystal display or organic EL display. Accordingly, the portable user terminal can be formed as a thin shape and can be brought into intimate contact with a paper space and the like.

In addition, The portable user terminal is configured such that a display function part including the token obtaining part, the display part and the voice origination part, and a network gateway part including a network communication part are separated, in which the display function part and the network gateway part communicate with each other by using wireless communication parts. As a result, weight reduction of the information display part can be achieved.

In addition, in order to realize a presentation method of information closely related to information on a printed matter, a permeable display is used as the display part of the portable user terminal, the content presented on the display part can be used by being overlaid on the originating information printed, described or displayed on the information notification medium. In addition, conversion process is performed on the content for adjusting position as necessary. Accordingly, information liaison of media extension type which is different from both of hyperlink and hypermedia in WWW can be realized, and totally new information providing environment and information operation feeling can be provided to the user.

(Effect of the Present Invention)

As mentioned above, according to the configurations for achieving the first object of the present invention, an environment can be realized in which the user can easily access content on WWW related to information transmitted by various information notification mediums.

In addition, a system can be realized in which content information interested by the user or suitable for the user attributes can be provided in consideration of difference of points of interest for each user when obtaining WWW content by using the token. In addition, a system can be realized for providing content applicable for use by a portable user terminal in consideration of terminal information such as display ability, processing ability and the like of the portable user terminal.

According to the configurations for achieving the second object of the present invention, a function of a system in which the token can be used as a coupon is realized.

In addition, the coupon providing service and the content providing service provided by the token type content providing system can be provided simultaneously. That is, the coupon information and information of content explaining details of the coupon service can be provided simultaneously.

In addition, by authenticating coupon information, it is ensured that the provided coupon information corresponding to the token is applied to a target coupon service.

According to the configurations for achieving the third object of the present invention, it becomes possible to present obtained content by using a method specified by the presentation control information included in the content information. In addition, in a case where a plurality of items of information are identified by a token, by including presentation order of contents, keywords indicating content in the presentation control information, how the plurality of items of information are presented to the user can be determined. In addition, contents to be presented can be selected on the basis of desired genre setting by the user in the portable user terminal.

In addition, by providing an attached advertisement content server, the attached advertisement content can be obtained from the attached advertisement content server by using the attached advertisement information included in the content information, and the content and the attached advertisement content can be presented by a method specified by the presentation control information. As a result, it becomes possible to insert the attached advertisement content into the content, and present the content.

In addition, in order to determine whether the content and the attached advertisement content should be presented, the presentation control information including the keywords or genre identifiers indicating content is utilized. Thus, in a case where a plurality of contents and attached advertisement contents are obtained by the user, it becomes possible to determine how the plurality of items of information are presented to the user.

The present invention is not limited to the specifically disclosed embodiments, and variations and modifications may be made without departing from the scope of the invention.

What is claimed is:

1. A token type content providing method for providing content on a network in a token type content providing system having a user terminal and a linkup server, the method comprising:
   using the user terminal to perform the following:
      connecting to a network;
      obtaining code information printed on a paper, from the paper, which is used for specifying content;
      sending the code information to a linkup server via a network;
      receiving a URL which is obtained by the linkup server by using the code information via a network;
      receiving content corresponding to the URL; and
      displaying, on a permeable display part, the content that is received;
   wherein a token obtaining part of the user terminal includes a part for obtaining the code information which is printed on the paper, and obtaining terminal environment information including position relationship between an image of the code information which is printed on the paper and the permeable display part,
   wherein the linkup server performs geometrical conversion, on the content corresponding to the URL using the terminal environment information, for adjusting position relationship between the image of the code information and the image of content displayed on the permeable display part used by being overlaid on the image, and
   wherein the user terminal receives the geometrically converted content from the linkup server, and displays the geometrically converted content on the permeable display part.

2. A token type content providing method for providing content on a network in a token type content providing system having a user terminal and a linkup server, the method comprising:
   using the user terminal to perform the following:
      connecting to a network;
      managing user information on users;
      managing terminal information on user terminals;
      obtaining code information printed on a paper, from the paper, which is used for specifying content;
      sending the code information, the user information and the terminal information to a linkup server via a network;
      receiving a URL which is obtained by the linkup server by using the token, the user information and the terminal information via a network;
      receiving content corresponding to the URL; and
      displaying the content that is received on a permeable display part of the user terminal;
   wherein a token obtaining part of the user terminal includes obtaining the code information which is printed on the paper, and obtaining terminal environment information including position relationship between an image of the code information which is printed, on the paper and the permeable display part,
   wherein the linkup server performs geometrical conversion, on the content corresponding to the URL using the terminal environment information, for adjusting position relationship between the image of the code information and the image of content displayed on the permeable display part used by being overlaid on the image, and
   wherein the user terminal receives the geometrically converted content from the linkup server, and displays the geometrically converted content on the permeable display part.

3. A token type content providing method for providing content on a network in a token type content providing system having a user terminal and a linkup server, the method comprising:
   using the user terminal to perform the following:
      connecting to a network;
      obtaining code information printed on a paper, from the paper, which is used for specifying content;

sending the code information to a linkup server via a network;
receiving a URL which is obtained by the linkup server by using the code information via a network; and
receiving content corresponding to the URL; and
displaying the content that is received on a permeable display part of the user terminal;
wherein a token obtaining part of the user terminal includes a part for obtaining the code information which is printed on the paper, and obtaining terminal environment information including position relationship between an image of the code information which is printed, on the paper and the permeable display part, and
wherein the user terminal performs geometrical conversion, on the content that is received using the terminal environment information, for adjusting position relationship between the image of the code information and an image of content displayed on the permeable display part used by being overlaid on the image of the information, and displays the geometrically converted content on the permeable display part.

4. A token type content providing method for providing content on a network in a token type content providing system having a user terminal and a linkup server, the method comprising:
using the user terminal to perform the following:
connecting to a network;
managing user information on users;
managing terminal information on user terminals;
obtaining code information printed on a paper, from the paper, which is used for specifying content;
sending the code information, the user information and the terminal information to a linkup server via a network;
receiving a URL which is obtained by the linkup server by using the token, the user information and the terminal information via a network;
receiving content corresponding to the URL; and
displaying the content that is received on a permeable display part of the user terminal;
wherein a token obtaining part of the user terminal includes a part for obtaining the code information which is printed on the paper, and obtaining terminal environment information including position relationship between an image of the code information which is printed on the paper and the permeable display part, and
wherein the user terminal performs geometrical conversion, on the content that is received using the terminal environment information, for adjusting position relationship between the image of the code information and an image of content displayed on the permeable display part used by being overlaid on the image of the information, and displays the geometrically converted content on the permeable display part.

5. A token type content providing method for providing content on a network in a token type content providing system having a user terminal and a linkup server, the method comprising:
using the user terminal to perform the following:
connecting to a network;
obtaining code information printed on a paper, from the paper, which is used for specifying content;
sending the code information to a linkup server via a network; and
the linkup server performing the following:
receiving the code information via a network;
determining a content identifier corresponding to the code information by using a token table database which stores code information and content identifiers each corresponding to code information;
obtaining a URL corresponding to the content identifier by using a content information database which stores URLs and content identifiers each corresponding to a URL;
sending the URL to the user terminal;
receiving the URL at the user terminal;
receiving content corresponding to the URL; and
displaying the content that is received on a permeable display part of the user terminal;
wherein the user terminal obtains, in the obtaining of the code information which is printed on the paper, and obtains terminal environment information including position relationship between an image of the code information which is printed on the paper and the permeable display part, and
wherein the linkup server performs geometrical conversion, on the content corresponding to the URL using the terminal environment information, for adjusting position relationship between the image of the code information and an image of content displayed on the permeable display part used by being overlaid on the image of the information, and transmits the geometrically converted content to the user terminal.

6. A token type content providing method for providing content on a network in a token type content providing system having a user terminal and a linkup server, the method comprising:
using the user terminal to perform the following:
connecting to a network;
managing user information on users by using a user information management part;
managing terminal information on portable user terminals by using a terminal information management part;
obtaining code information printed on a paper, from the paper, which is information which may be used for specifying content;
sending the code information, the user information and the terminal information to a linkup server via a network; and
the linkup server performing the following:
receiving the code information, the user information and the terminal information via a network;
determining a content identifier corresponding to the code information by using a token table database which stores code information and content identifiers each corresponding to code information;
obtaining a URL corresponding to the content identifier by using a content information database which stores URLs and content identifiers each corresponding to a URL;
sending the URL to the user terminal;
receiving at the user terminal content which is obtained by the linkup server by using the URL via a network; and
displaying the content that is received on a permeable display part;
wherein the user terminal obtains, in the obtaining of the code information, the code information which is printed on the paper, and obtains terminal environment information including position relationship between an image of the code information which is printed on the paper and the permeable display part, and wherein the linkup server performs geometrical conversion, on the content corresponding to the URL using the terminal environment information, for adjusting position relationship between the image of the code information and an image of content displayed on the permeable display part used by being overlaid on the image of the information, and transmits the geometrically converted content to the user terminal.

7. A token type content providing method for providing content on a network in a token type content providing system having a user terminal and a linkup server, the method comprising:

using the user terminal to perform the following:
  connecting to a network;
  obtaining code information printed on a paper, from the paper, which is used for specifying content;
  sending the code information to a linkup server via a network; and
  the linkup server performing the following:
    receiving the code information via a network;
    determining a content identifier corresponding to the code information by using a token table database which stores code information and content identifiers each corresponding to code information;
    obtaining a URL corresponding to the content identifier by using a content information database which stores URLs and content identifiers each corresponding to a URL;
    sending the URL to the user terminal;
    receiving at the user terminal the URL, and receiving content corresponding to the URL; and
    displaying the content that is received on a permeable display part of the user terminal;

wherein the user terminal obtains, in the obtaining of the code information, the code information which is printed on the paper, and obtains terminal environment information including position relationship between an image of the code information which is printed on the paper and the permeable display part, and wherein the user terminal performs geometrical conversion, on the content that is received using the terminal environment information, for adjusting position relationship between the image of the code information which is printed on the paper and the permeable display part and an image of content displayed on the permeable display part used by being overlaid on the image of the information, and displays the geometrically converted content on the permeable display part.

8. A token type content providing method for providing content on a network in a token type content providing system having a user terminal and a linkup server, the method comprising:

using the user terminal to perform the following:
  connecting to a network;
  managing user information on users by using a user information management part;
  managing terminal information on portable user terminals by using a terminal information management part;
  obtaining code information printed on a paper, from the paper, which is used for specifying content;
  sending the code information, the user information and the terminal information to a linkup server via a network; and
  the linkup server performing the following:
    receiving the code information, the user information and the terminal information via a network;
    determining a content identifier corresponding to the code information by using a token table database which manages a token table which stores code information and content identifiers each corresponding to code information;
    obtaining a URL corresponding to the content identifier by using a content information database which stores URLs and content identifiers each corresponding to a URL;
    sending the URL to the user terminal;
    receiving at the user terminal content information which is obtained by the linkup server by using the URL via a network, and receiving content corresponding to the URL; and
    displaying the content that is received on a permeable display part of the user terminal;

wherein the user terminal obtains, in the obtaining of the code information, the code information which is printed on the paper, and obtains terminal environment information including position relationship between an image of the code information which is printed on the paper and the permeable display part, and wherein the user terminal performs geometrical conversion, on the content that is received using the terminal environment information, for adjusting position relationship between the image of the code information which is printed on the paper and an image of content displayed on the permeable display part used by being overlaid on the image of the information, and displays the geometrically converted content on the permeable display part.

9. A token type content providing system, comprising:
a linkup server; and
a user terminal, including:
  a part for connecting to a network;
  a token obtaining part for obtaining code information printed on a paper, from the paper, which is used for specifying content;
  a part for sending the code information to a linkup server via a network;
  a part for receiving a URL which is obtained by the linkup server by using the code information via a network; and
  a part for receiving content corresponding to the URL, the linkup server including:
    a part for receiving the code information via a network;
    a part for determining a content identifier corresponding to the code information by using a token table database which stores code information and content identifiers each corresponding to code information;
    a part for obtaining a URL corresponding to the content identifier by using a content information database which stores URLs and content identifiers each corresponding to a URL;
    a part for sending the URL to the user terminal;
wherein the user terminal further includes a permeable display part for displaying the content that is obtained, wherein the token obtaining part of the user terminal includes a part for obtaining the code information which is printed on the paper, and obtaining terminal environment information including position relationship between an image of the code information which is printed on the paper and the permeable display part, and wherein the linkup server performs geometrical conversion, on the content corresponding to the URL using the terminal environment information, for adjusting position relationship between the image of the code information and the image of content displayed on the permeable display part used by being overlaid on the image, and transmits the geometrically converted content to the user terminal.

10. A token type content providing system, comprising:

a linkup server; and a user terminal, including:

a part for connecting to a network;

a user information management part for managing user information on users;

a terminal information management part for managing terminal information on user terminals;

a token obtaining part for obtaining code information printed on a paper, from the paper, which is used for specifying content;

a part for sending the code information, the user information and the terminal information to a linkup server via a network;

a part for receiving a URL which is obtained by the linkup server by using the code information, the user information and the terminal information via a network; and a part for receiving content corresponding to the URL, the linkup server including:

a part for receiving the code information, the user information and the terminal information via a network;

a part for determining a content identifier corresponding to the code information by using a token table database which stores code information and content identifiers each corresponding to code information;

a part for obtaining a URL corresponding to the content identifier by using a content information database which stores URLs and content identifiers each corresponding to a URL;

a part for sending the URL to the user terminal;

wherein the user terminal further includes a permeable display part for displaying the content that is received, wherein the token obtaining part of the user terminal includes a part for obtaining the code information which is printed on the paper, and obtaining terminal environment information including position relationship between an image of the code information which is printed on the paper and the permeable display part, and wherein the linkup server performs geometrical conversion, on the content corresponding to the URL using the terminal environment information, for adjusting position relationship between the image of the code information and the image of content displayed on the permeable display part used by being overlaid on the image, and transmits the geometrically converted content to the user terminal.

11. A token type content providing system, comprising:

a linkup server; and a user terminal, including:

a part for connecting to a network;

a token obtaining part for obtaining code information printed on a paper, from the paper, which is used for specifying content;

a part for sending the code information to a linkup server via a network;

a part for receiving a URL which is obtained by the linkup server by using the code information via a network; and a part for receiving content corresponding to the URL, the linkup server including:

a part for receiving the code information via a network;

a part for determining a content identifier corresponding to the code information by using a token table database which stores code information and content identifiers each corresponding to code information;

a part for obtaining a URL corresponding to the content identifier by using a content information database which stores URLs and content identifiers each corresponding to a URL;

a part for sending the URL to the user terminal;

wherein the user terminal further includes a permeable display part for displaying the content that is received, wherein the token obtaining part of the user terminal includes a part for obtaining the code information which is printed on the paper, and obtaining terminal environment information including position relationship between an image of the code information which is printed on the paper and the permeable display part, and wherein the user terminal performs geometrical conversion, on the content that is received using the terminal environment information, for adjusting position relationship between the image of the code which is printed on the paper and an image of content displayed on the permeable display part used by being overlaid on the image of the information, and displays the geometrically converted content on the permeable display part.

12. A token type content providing system, comprising:

a linkup server; and a user terminal, including:

a part for connecting to a network;

a user information management part for managing user information on users;

a terminal information management part for managing terminal information on user terminals;

a token obtaining part for obtaining code information printed on a paper, from the paper, which is used for specifying content;

a part for sending the code information, the user information and the terminal information to a linkup server via a network;

a part for receiving a URL which is obtained by the linkup server by using the code information, the user information and the terminal information via a network; and a part for receiving content corresponding to the URL, the linkup server including:

a part for receiving the code information, the user information and the terminal information via a network;

a part for determining one or more content identifier corresponding to the code information by using a token table database which manages a token table which stores code information and content identifiers each corresponding to code information;

a part for obtaining a URL corresponding to the content identifier by using a content information database which stores URLs and content identifiers each corresponding to a URL;

a part for sending the URL to the user terminal;

wherein the user terminal further includes a permeable display part for displaying the content that is received, wherein the token obtaining part of the user terminal includes a part for obtaining the code information which is printed on the paper, and obtaining terminal environment information including position relationship between an image of the code information which is printed on the paper and the permeable display part, and wherein the user terminal performs geometrical conversion, on the content that is received using the terminal environment information, for adjusting position relationship between the image of the code information and an image of content displayed on the permeable display part used by being overlaid on the image of the information, and displays the geometrically converted content on the permeable display part.

13. A user terminal for a token type content providing system, having the user terminal and a linkup server, the user terminal comprising:

a part for connecting to a network;

a token obtaining part for obtaining code information printed on a paper, from the paper, which is used for specifying content;

a part for sending the code information to a linkup server via a network;

a part for receiving a URL which is obtained by the linkup server by using the code information via a network;

a part for receiving content corresponding to the URL; and a permeable display part for displaying the content that is received;

wherein the token obtaining part of the user terminal includes a part for obtaining the code information which is printed on the paper, and obtaining terminal environment information including position relationship between an image of the code information which is printed on the paper and the permeable display part, wherein the linkup server performs geometrical conversion, on the content corresponding to the URL using the terminal environment information, for adjusting position relationship between the image of the code information and the image of content displayed on the permeable display part used by being overlaid on the image, and wherein the user terminal receives the geometrically converted content from the linkup server, and displays the geometrically converted content on the permeable display part.

14. A user terminal for a token type content providing system, having the user terminal and a linkup server, the user terminal comprising:

a part for connecting to a network;

a user information management part for managing user information on users;

a terminal information management part for managing terminal information on user terminals;

a token obtaining part for obtaining code information printed on a paper, from the paper, which is used for specifying content;

a part for sending the code information, the user information and the terminal information to a linkup server via a network;

a part for receiving a URL which is obtained by the linkup server by using the code information, the user information and the terminal information via a network;

a part for receiving content corresponding to the URL; and a permeable display part for displaying the content that is received;

wherein the token obtaining part of the user terminal includes a part for obtaining the code information which is printed on the paper, and obtaining terminal environment information including position relationship between an image of the code information which is printed on the paper and the permeable display part, wherein the linkup server performs geometrical conversion, on the content corresponding to the URL using the terminal environment information, for adjusting position relationship between the image of the code information and the image of content displayed on the permeable display part used by being overlaid on the image, and wherein the user terminal receives the geometrically converted content from the linkup server, and displays the geometrically converted content on the permeable display part.

15. A user terminal used in a token type content providing system, having the user terminal and a linkup server, the user terminal comprising:

a part for connecting to a network;

a token obtaining part for obtaining code information printed on a paper, from the paper, which is used for specifying content;

a part for sending the code information to a linkup server via a network;

a part for receiving a URL which is obtained by the linkup server by using the code information via a network;

a part for receiving content corresponding to the URL; and a permeable display part for displaying the content that is received;

wherein the token obtaining part of the user terminal includes a part for obtaining the code information which is printed on the paper, and obtaining terminal environment information including position relationship between an image of the code information which is printed on the paper and the permeable display part, and wherein the user terminal performs geometrical conversion, on the content that is received using the terminal environment information, for adjusting position relationship between the image of the code information and an image of content displayed on the permeable display part used by being overlaid on the image of the information, and displays the geometrically converted content on the permeable display part.

16. A user terminal used in a token type content providing system, having the user terminal and a linkup server, the user terminal comprising:

a part for connecting to a network;

a user information management part for managing user information on users;

a terminal information management part for managing terminal information on user terminals;

a token obtaining part for code information printed on a paper, from the paper, which is used for specifying content;

a part for sending the code information, the user information and the terminal information to a linkup server via a network;

a part for receiving a URL which is obtained by the linkup server by using the code information, the user information and the terminal information via a network;

a part for receiving content corresponding to the URL; and a permeable display part for displaying the content that is received;

wherein the token obtaining part of the user terminal includes a part for obtaining the code information which is printed on the paper, and obtaining terminal environment information including position relationship between an image of the code information which is printed on the paper and the permeable display part, and wherein the user terminal performs geometrical conversion, on the content that is received using the terminal environment information, for adjusting position relationship between the image of the code information and an image of content displayed on the permeable display part used by being overlaid on the image of the information, and displays the geometrically converted content on the permeable display part.

* * * * *